(12) United States Patent
Ovalle

(10) Patent No.: US 12,154,413 B2
(45) Date of Patent: *Nov. 26, 2024

(54) SYSTEMS FOR MULTIPLE LEGAL GAME PROVIDERS WITH DIGITAL LEDGER

(71) Applicant: Lottery Now, Inc., San Francisco, CA (US)

(72) Inventor: Gregory Ovalle, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/124,901

(22) Filed: Mar. 22, 2023

(65) Prior Publication Data

US 2023/0230456 A1     Jul. 20, 2023

Related U.S. Application Data

(63) Continuation of application No. 17/339,557, filed on Jun. 4, 2021, now Pat. No. 11,615,677, which is a
(Continued)

(51) Int. Cl.
  *G07F 17/32* (2006.01)
  *G06F 21/64* (2013.01)
(Continued)

(52) U.S. Cl.
CPC .......... *G07F 17/329* (2013.01); *G06F 21/645* (2013.01); *G06Q 30/0635* (2013.01); *G07F 17/3204* (2013.01); *G07F 17/3209* (2013.01); *G07F 17/3223* (2013.01); *G07F 17/3227* (2013.01); *G07F 17/3241* (2013.01); *H04L 67/02* (2013.01); *H04L 67/56* (2022.05); *H04W 4/21* (2018.02); *H04W 4/60* (2018.02); *G06Q 50/34* (2013.01)

(58) Field of Classification Search
None
See application file for complete search history.

(56) References Cited

U.S. PATENT DOCUMENTS 6,323,846 B1    11/2001    Westerman et al.
6,570,557 B1    5/2003    Westerman et al.
(Continued)

*Primary Examiner* — Jason T Yen
(74) *Attorney, Agent, or Firm* — NEO IP

(57) ABSTRACT

A wireless communications system is provided that runs on a mobile device and includes a computer system run on at least one platform on which a plurality of different lottery transactions for different jurisdictions are supported and run from the at least one platform. A decentralized and distributed digital ledger is used to record transactions for the lottery transactions, where each of a lottery transaction can include a lottery element. At least one computer readable storage medium stores computer executable instructions that, when executed by the at least one network processor in the workflow server residing in the mobile communications network, implement components including: a workflow module comprising sets of workflow instructions for processing different types of lottery game packets from a plurality of different jurisdictions; and a deep packet inspection module for inspecting a received lottery game packet and providing information about the lottery game packet to the workflow module.

20 Claims, 33 Drawing Sheets

Related U.S. Application Data continuation of application No. 15/660,975, filed on Jul. 27, 2017, now Pat. No. 11,030,860, which is a continuation-in-part of application No. 15/658,385, filed on Jul. 24, 2017, now abandoned, which is a continuation of application No. 15/657,297, filed on Jul. 24, 2017, now abandoned, which is a continuation of application No. 15/626,213, filed on Jun. 19, 2017, now abandoned, which is a continuation of application No. 15/626,208, filed on Jun. 19, 2017, now abandoned, said application No. 15/618,139 is a continuation of application No. 15/618,138, filed on Jun. 9, 2017, now abandoned, said application No. 15/618,140 is a continuation of application No. 15/618,139, filed on Jun. 9, 2017, now abandoned, said application No. 15/626,208 is a continuation of application No. 15/618,140, filed on Jun. 9, 2017, now abandoned, said application No. 15/597,185 is a continuation of application No. 15/597,183, filed on May 17, 2017, now abandoned, said application No. 15/597,190 is a continuation of application No. 15/597,185, filed on May 17, 2017, now Pat. No. 10,475,290, said application No. 15/618,138 is a continuation of application No. 15/597,190, filed on May 17, 2017, now abandoned, said application No. 15/498,567 is a continuation of application No. 15/498,516, filed on Apr. 27, 2017, now abandoned, and a continuation of application No. 15/498,549, filed on Apr. 27, 2017, now abandoned, and a continuation of application No. 15/498,534, filed on Apr. 27, 2017, now abandoned, and a continuation of application No. 15/498,502, filed on Apr. 27, 2017, now abandoned, said application No. 15/597,183 is a continuation of application No. 15/498,567, filed on Apr. 27, 2017, now abandoned, which is a continuation of application No. 14/815,588, filed on Jul. 31, 2015, now Pat. No. 9,734,659, and a continuation of application No. 14/812,361, filed on Jul. 29, 2015, now Pat. No. 9,640,028, and a continuation of application No. 14/730,074, filed on Jun. 3, 2015, now Pat. No. 9,659,460.

(60) Provisional application No. 62/136,396, filed on Mar. 20, 2015, provisional application No. 62/136,399, filed on Mar. 20, 2015, provisional application No. 62/136,387, filed on Mar. 20, 2015, provisional application No. 62/039,754, filed on Aug. 20, 2014, provisional application No. 62/039,740, filed on Aug. 20, 2014, provisional application No. 62/034,530, filed on Aug. 7, 2014, provisional application No. 62/034,431, filed on Aug. 7, 2014, provisional application No. 62/034,545, filed on Aug. 7, 2014, provisional application No. 62/034,519, filed on Aug. 7, 2014, provisional application No. 62/034,447, filed on Aug. 7, 2014, provisional application No. 62/034,500, filed on Aug. 7, 2014, provisional application No. 62/034,437, filed on Aug. 7, 2014, provisional application No. 62/034,492, filed on Aug. 7, 2014, provisional application No. 62/034,512, filed on Aug. 7, 2014, provisional application No. 62/034,508, filed on Aug. 7, 2014, provisional application No. 62/034,466, filed on Aug. 7, 2014, provisional application No. 62/034,539, filed on Aug. 7, 2014, provisional application No. 62/034,559, filed on Aug. 7, 2014, provisional application No. 62/033,805, filed on Aug. 6, 2014, provisional application No. 62/033,799, filed on Aug. 6, 2014, provisional application No. 62/033,796, filed on Aug. 6, 2014, provisional application No. 62/033,783, filed on Aug. 6, 2014, provisional application No. 62/033,810, filed on Aug. 6, 2014, provisional application No. 62/033,817, filed on Aug. 6, 2014.

(51) Int. Cl.
| | | |
|---|---|---|
| *G06Q 30/0601* | (2023.01) | |
| *H04L 67/02* | (2022.01) | |
| *H04L 67/56* | (2022.01) | |
| *H04W 4/21* | (2018.01) | |
| *H04W 4/60* | (2018.01) | |
| *G06Q 50/34* | (2012.01) | |

(56) References Cited

U.S. PATENT DOCUMENTS

| | | |
|---|---|---|
| 6,677,932 B1 | 1/2004 | Westerman |
| 7,035,626 B1 | 4/2006 | Luciano, Jr. |
| 7,113,932 B2 | 9/2006 | Tayebnejad et al. |
| 7,366,707 B2 | 4/2008 | Lacharriere et al. |
| 7,614,008 B2 | 11/2009 | Ording |
| 7,633,076 B2 | 12/2009 | Huppi et al. |
| 7,663,607 B2 | 2/2010 | Hotelling et al. |
| 7,844,914 B2 | 11/2010 | Andre et al. |
| 8,006,002 B2 | 8/2011 | Kalayjian et al. |
| 8,279,180 B2 | 10/2012 | Hotelling et al. |
| 8,381,135 B2 | 2/2013 | Hotelling et al. |
| 8,600,430 B2 | 12/2013 | Herz et al. |
| 8,612,368 B2 | 12/2013 | Burdick et al. |
| 8,805,686 B2 | 8/2014 | Mohajer et al. |
| 9,251,663 B1 | 2/2016 | Sandvick |
| 9,640,028 B2 | 5/2017 | Ovalle |
| 9,659,460 B2 | 5/2017 | Ovalle |
| 9,734,659 B2 | 8/2017 | Ovalle |
| 10,475,290 B2 | 11/2019 | Valle |
| 2002/0073021 A1 | 6/2002 | Ginsberg et al. |
| 2003/0139212 A1* | 7/2003 | Fulton ............... G07F 17/329 463/17 |
| 2004/0192439 A1 | 9/2004 | Kula |
| 2004/0259626 A1 | 12/2004 | Akram et al. |
| 2004/0266533 A1* | 12/2004 | Gentles ............... G06F 21/32 463/42 |
| 2005/0153779 A1 | 7/2005 | Ziegler |
| 2006/0033724 A1 | 2/2006 | Chaudhri et al. |
| 2006/0197753 A1 | 9/2006 | Hotelling |
| 2008/0215610 A1 | 9/2008 | Lacharriere et al. |
| 2009/0143128 A1* | 6/2009 | Cautley ............... G07F 17/329 463/17 |
| 2010/0105462 A1 | 4/2010 | Walker et al. |
| 2010/0160022 A1 | 6/2010 | Oram |
| 2011/0105213 A1 | 5/2011 | Irwin et al. |
| 2011/0269436 A1 | 11/2011 | Porco |
| 2011/0295672 A1 | 12/2011 | Dimitriadis et al. |
| 2012/0088573 A1 | 4/2012 | Hedrick et al. |
| 2012/0225719 A1 | 9/2012 | Nowozin et al. |
| 2013/0072280 A1 | 3/2013 | Yacenda |
| 2013/0310130 A1 | 11/2013 | Asthana |
| 2014/0045582 A1 | 2/2014 | Lyons et al. |
| 2014/0045589 A1 | 2/2014 | Paradise et al. |
| 2014/0114800 A1 | 4/2014 | Levitt et al. |
| 2014/0214639 A1 | 7/2014 | Roach |
| 2014/0274341 A1 | 9/2014 | Janosov et al. |
| 2015/0126262 A1 | 5/2015 | Litos et al. |
| 2015/0206376 A1 | 7/2015 | Reid et al. |
| 2015/0227890 A1 | 8/2015 | Bednarek et al. |
| 2015/0310696 A1 | 10/2015 | Mound |
| 2015/0332540 A1 | 11/2015 | Roy et al. |
| 2016/0019749 A1* | 1/2016 | Irwin, Jr. ............... G06Q 20/20 463/17 |
| 2017/0323703 A1 | 11/2017 | Ovalle |
| 2018/0096752 A1 | 4/2018 | Ovalle |

(56) References Cited

U.S. PATENT DOCUMENTS

2019/0213831 A1\* 7/2019 Cage .................. G06Q 20/3274
2020/0126353 A1 4/2020 Ovalle
2021/0295637 A1 9/2021 Ovalle \* cited by examiner

SYSTEMS FOR MULTIPLE LEGAL GAME PROVIDERS WITH DIGITAL LEDGER

CROSS-REFERENCE TO RELATED APPLICATION(S)

This application is a continuation of U.S. patent application Ser. No. 15/660,975, filed Jul. 27, 2017, which is a continuation-in-part of U.S. patent application Ser. No. 15/658,385 filed Jul. 24, 2017, which is a continuation of U.S. patent application Ser. No. 15/657,297 filed Jul. 24, 2017, which is a continuation of U.S. patent application Ser. No. 15/626,213 filed Jun. 19, 2017, which is a continuation of U.S. patent application Ser. No. 15/626,208 filed Jun. 19, 2017, which is a continuation of U.S. patent application Ser. No. 15/618,140 filed Jun. 9, 2017, which is a continuation of U.S. patent application Ser. No. 15/618,139 filed Jun. 9, 2017, which is a continuation of U.S. patent application Ser. No. 15/618,138 filed Jun. 9, 2017, which is a continuation of U.S. patent application Ser. No. 15/597,190 filed May 17, 2017, which is a continuation of U.S. patent application Ser. No. 15/597,185 filed May 17, 2017, which is a continuation of U.S. patent application Ser. No. 15/597,183 filed May 17, 2017, which is a continuation of U.S. patent application Ser. No. 15/498,567 filed on Apr. 27, 2017. U.S. patent application Ser. No. 15/498,567 is a continuation of U.S. patent application Ser. No. 15/498,549, filed Apr. 27, 2017, is a Continuation of U.S. patent application Ser. No. 15/498,534, filed Apr. 27, 2017, a Continuation of U.S. patent application Ser. No. 15/498,516, filed Apr. 27, 2017, a Continuation of U.S. patent application Ser. No. 15/498,502, filed Apr. 27, 2017, a Continuation of U.S. patent application Ser. No. 14/730,074, filed on Jun. 3, 2015, a Continuation of U.S. patent application Ser. No. 14/812,361, filed on Jul. 29, 2015, and is a Continuation of U.S. patent application Ser. No. 14/815,588, filed on Jul. 31, 2015. U.S. patent application Ser. No. 14/815,588 claims priority to and the benefit of U.S. Provisional Patent Application No. 62/136,396, filed on Mar. 20, 2015, priority to and the benefit of U.S. Provisional Patent Application No. 62/136,387, filed on Mar. 20, 2015, priority to and the benefit of U.S. Provisional Patent Application No. 62/136,399, filed on Mar. 20, 2015, a priority to and the benefit of U.S. Provisional Patent Application No. 62/039,754, filed on Aug. 20, 2014, priority to and the benefit of U.S. Provisional Patent Application No. 62/039,740, filed on Aug. 20, 2014, priority to and the benefit of U.S. Provisional Patent Application No. 62/034,500, filed on Aug. 7, 2014, priority to and the benefit of U.S. Provisional Patent Application No. 62/034,559, filed on Aug. 7, 2014, priority to and the benefit of U.S. Provisional Patent Application No. 62/034,545, filed on Aug. 7, 2014, priority to and the benefit of U.S. Provisional Patent Application No. 62/034,539, filed on Aug. 7, 2014, priority to and the benefit of U.S. Provisional Patent Application No. 62/034,530, filed on Aug. 7, 2014, priority to and the benefit of U.S. Provisional Patent Application No. 62/034,519, filed on Aug. 7, 2014, priority to and the benefit of U.S. Provisional Patent Application No. 62/034,431, filed on Aug. 7, 2014, priority to and the benefit of U.S. Provisional Patent Application No. 62/034,437, filed on Aug. 7, 2014, priority to and the benefit of U.S. Provisional Patent Application No. 62/034,447, filed on Aug. 7, 2014, priority to and the benefit of U.S. Provisional Patent Application No. 62/034,466, filed on Aug. 7, 2014, priority to and the benefit of U.S. Provisional Patent Application No. 62/034,492, filed on Aug. 7, 2014, a U.S. Provisional Patent Application No. 62/034,508, filed on Aug. 7, 2014, priority to and the benefit of U.S. Provisional Patent Application No. 62/034,512, filed on Aug. 7, 2014, a U.S. Provisional Patent Application No. 62/033,805, filed on Aug. 6, 2014, priority to and the benefit of U.S. Provisional Patent Application No. 62/033,783, filed on Aug. 6, 2014, priority to and the benefit of U.S. Provisional Patent Application No. 62/033,796, filed on Aug. 6, 2014, priority to and the benefit of U.S. Provisional Patent Application No. 62/033,799, filed on Aug. 6, 2014, priority to and the benefit of U.S. Provisional Patent Application No. 62/033,810, filed on Aug. 6, 2014, and priority to and the benefit of U.S. Provisional Patent Application No. 62/033,817, filed on Aug. 6, 2014. Each of these applications is incorporated herein by reference in its entirety.

BACKGROUND

This invention relates generally to a lottery selling system for multiple jurisdictions with at least one platform, and more particularly to a lottery selling system for multiple legal game providers that provides one or more of an ability to run regional, global or multi jurisdictional lotteries with a decentralized and distributed digital ledger that is used to record transactions.

DESCRIPTION OF THE RELATED ART

Interactive lottery games are also known in the art wherein players interact with the gaming authority over Network System. For example, games have been proposed whereby a player may purchase a ticket directly from the gaming authority via the Internet and select certain criteria related to the game from a set of different options, such as the numbers the player wishes to play, or the specific drawing the ticket will be played.

Communications devices and other equivalent electronic client device, such as smart phones, PDAs, and personal computers are used to transmit messages and data having a wide range of informational content. Determining the location of the communications device during a transmission is sometimes determinable by means of a global position system ("GPS") located within the communications device. Alternatively the communications device may be geographically located by triangulation.

The geographic location of a human being/game client during the transmission or receipt of information, such as in a lottery ticket purchase, is in nearly all circumstances relevant to the legality of the act of communications. In particular, the purchase of lottery tickets are on occasion limited to transactions where the purchaser/game client is legally required to be located within a predetermined geography of a legal jurisdiction, for example, within state boundary lines by a governing or regulatory body. Still other practical examples of verifying the geographic location of a human being/game client during a transaction would be legally relevant would include the placing of a wager with legitimate casinos.

The methods of determining the location of a communications device having a GPS receiving circuit are well known in the art. In addition, methods of determining the location, or approximate location, of a wireless communications device by means of triangulation, and other suitable prior art methods, are well known in the art.

Statutes and laws in effect in certain jurisdictions by a governing or regulatory body have empowered electronic signatures. Certain statutes have authorized electronic signatures as valid to rely upon for confirming the age and identity of the signer. These electronic signature statues have increased the capability of communications devices and Network System as media for implementing and recording legally recognizable actions.

SUMMARY OF THE INVENTION

An object of the present invention is to provide systems for multiple legal game providers with at least one platform.

Another object of the present invention is to provide systems for multiple legal game providers with at least one platform and a digital ledger.

A further object of the present invention is to provide systems for multiple legal game providers with a least one platform and a digital ledger configured to use smart contracts.

Yet another object of the present invention is to provide systems for multiple legal game providers with a least one platform and a digital ledger configured to provide for at least one of: management, collection and distribution of payments and winnings clients, their assignees, and to lottery transaction winners.

Another object of the present invention is to provide systems for multiple legal game providers with a least one platform and a digital ledger configured to provide evidence of ownership of a lottery transaction.

A further object of the present invention is to provide systems for multiple legal game providers with a least one platform and a digital ledger configured to provide a record of a lottery transaction.

These and other objects of the present invention are provided in a wireless communications system that runs on a mobile device and includes a computer system run on at least one platform on which a plurality of different lottery transactions for different jurisdictions are supported and run from the at least one platform. A decentralized and distributed digital ledger is used to record transactions for the lottery transactions, where each of a lottery transaction can include a lottery element. At least one computer readable storage medium stores computer executable instructions that, when executed by the at least one network processor in the workflow server residing in the mobile communications network, implement components including: a workflow module comprising sets of workflow instructions for processing different types of lottery game packets from a plurality of different jurisdictions; and a deep packet inspection module for inspecting a received lottery game packet and providing information about the lottery game packet to the workflow module.

DETAILED DESCRIPTION

Definitions

Figure 1:
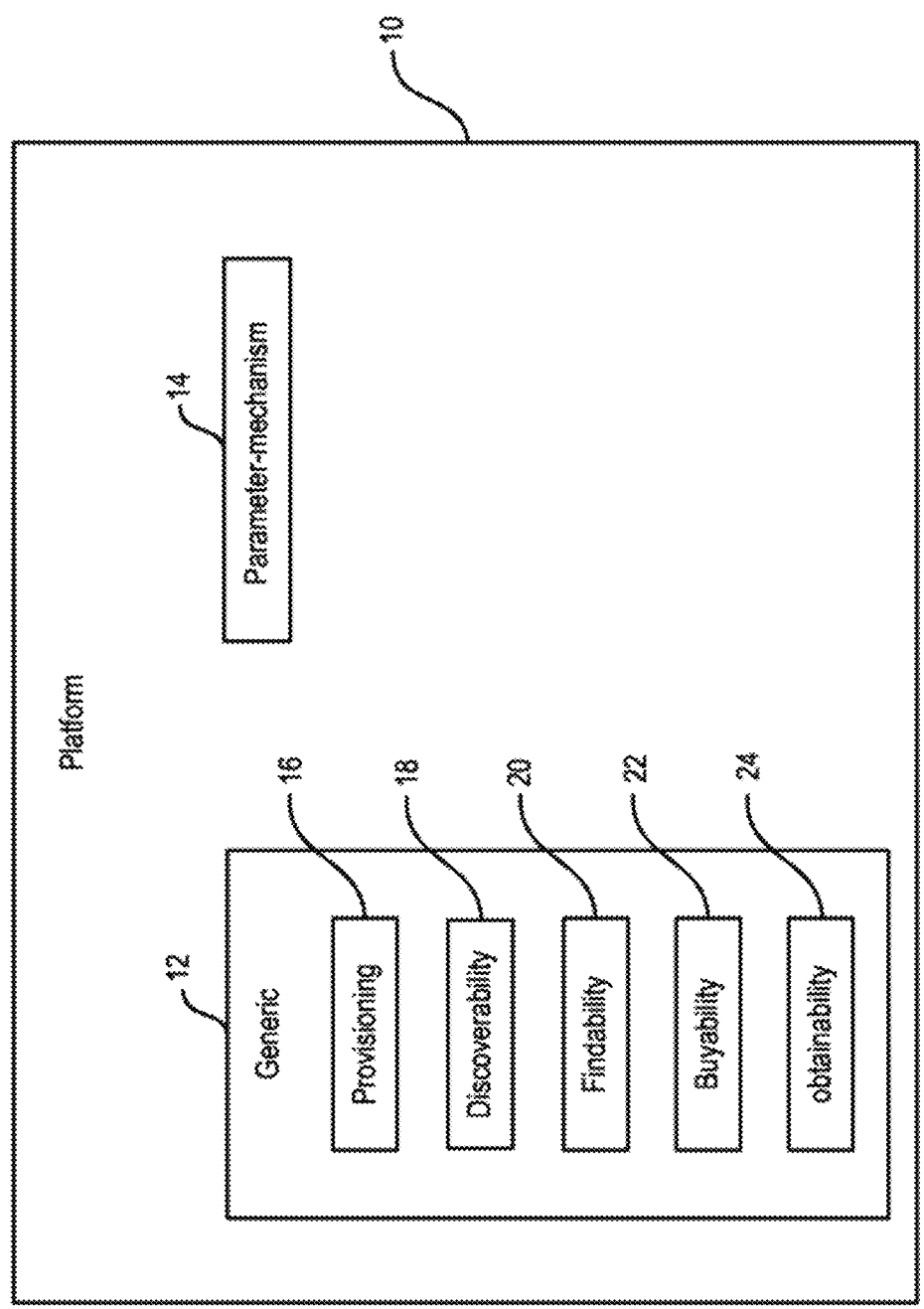
FIG. 1 is a simplified system level block diagram showing a lottery game platform in one embodiment of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a client device includes a client mobile device, computer, anything that the client can use to communicate with the single platform, including but not limited to a cell phone, such as Apple's iPhone®, other portable electronic devices, such as Apple's iPod Touches®, Apple's iPads®, and client device based on Google's Android® operating system, and any other portable electronic device that includes software, firmware, hardware, or a combination thereof that is capable of at least receiving a wireless signal, decoding if needed, web-based and non-based system, televisions with intelligence that can communicate wirelessly and through hard lines, and exchanging information with a server, API's and the like. In embodiment it can include components but not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "internet" is a global system of interconnected computer networks that use the standard web protocol suite (TCP/IP) to serve billions of lottery game clients worldwide. It is a network of networks that consists of millions of private, public, academic, business, and government networks, of local to global scope, that are linked by a broad array of electronic, wireless and optical networking technologies. The internet carries an extensive range of information resources and lottery services, such as the inter-linked hypertext documents of the World Wide Web (WWW) and the infrastructure to support email. The communications infrastructure of the internet consists of its hardware components and a system of software layers that control various aspects of the architecture.

As used herein, the term "extranet" is a computer network that allows controlled access from the outside. An extranet can be an extension of an organization's intranet that is extended to lottery game clients outside the organization in isolation from all other internet lottery game clients. An extranet can be an intranet mapped onto the public internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote lottery game clients using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Lottery services Provider (ISP).

For purposes of the present invention, the Internet, extranets and intranets collectively are referred to as ("Network Systems").

For purposes of the present invention, the term "Infrastructure" means, information technology, the physical hardware used to interconnect computers and lottery game clients, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

Java® is a known programming language developed by Sun Microsystems, a subsidiary of Oracle Corporation. Much of its syntax is derived from C and C++ but has a simpler object model and fewer low-level facilities.

As used herein "C" is a general purpose computer programming language that is widely used for developing portable application software.

As used herein "C++" is a popular programming language used for systems software, application software, device drivers, embedded software, high performance server and client application as well as entertainment software.

As used herein "OpenCV" refers to Open Source Computer Vision, a library of programming functions for real time computer vision.

As used herein "Cloud or Client device computing" refers to the delivery of computing as a lottery services rather than a product. Shared resources and information are provided to computers and other devices as a utility over a network, typically the Network Systems.

As used herein "C or Client device client" refers to computer hardware and/or software that rely on "cloud computing" for application delivery. This includes client device, tablets, other client device, desktops and Network System applications that are connectable to the Cloud or Client device for Cloud or Client device Computing. It includes any program that can interact with the platform, and in particular, the 3DoM Platform described below, which is hosted in the Cloud.

As used herein "Cloud or Client device application" refers to cloud or client device application lottery services or "software as a lottery services" (SaaS) which deliver software over the Network Systems eliminating the need to install and run the application on a device.

As used herein "Lottery" is an allotment by chance, bet, chance, draw, drawing, gamble, game of chance, lot, raffle, sors, sortitio, sweepstake, wager and the like. Lotteries can come in a variety of forms, including but not limited to: instant lotteries, general lotteries, and lotto. Lotteries can be a game of change operated by a legal jurisdiction, including but not limited to States, Countries, Counties, and the like.

As used herein "Jurisdiction" refers to a geographic area over which an authority extends, legal authority, the authority to hear and determine causes of action. Defines rules of law, and the like.

As used herein "Cloud or Client device Platform" refers to a cloud or client device platform lottery services or "platform as a lottery services" (PaaS) which deliver a computing platform and/or solution stack as a lottery services, and facilitates the deployment of applications without the cost and complexity of obtaining and managing the underlying hardware and software layers.

As used herein "Cloud Infrastructure" refers to cloud infrastructure lottery services or "infrastructure as a lottery services" (LAAS) which deliver computer infrastructure as a lottery services with raw block storage and networking.

For purposes of the present invention "System" is the combination of IP enable devices that includes and is not limited to PC, client device and tablets that present functionality to Lottery Participants that is enabled by the platform backend. The platform backend is designed to accept and present third party content and integrate with other external lottery or accounting systems.

For purposes of the present invention a "Lottery Participant" is a client who elects to use the platform to interact with and/or buy lottery games that are offered within the platform. Lottery game clients are individual account holders who fund their purchases through their individual wallets.

For purposes of the present invention a "Partner" is an entity that has entered into a partnership, reselling or licensing agreement with System that provides use of a subset of the platform for a specific region or territory that will be defined in an agreement between the parties.

For purposes of the present invention a retailer is a narrower subset of a partner and that operates a retail establishment that sells products and lottery services in addition to lottery products to the general public. Retailers would interact with the platform by accepting money from clients in person over the counter for the purchase of digital tickets or to load platform's wallet—both delivered to the mobile phone or IP device.

For purposes of the present invention a digital signature is a mathematical scheme for demonstrating the authenticity of digital messages, documents, and the like. A valid digital signature provides a recipient reason to believe that the message was created by a known sender (authentication), that the sender cannot deny having sent the message (non-repudiation), and that the message was not altered in transit (integrity).

For purposes of the present invention a blockchain is a private chain, side chain, distributed network or blockchain that provides a distributed activity ledger, asset ownership tracking and or smart contracts executed and run by pre-programmed logic run on network of computers. In one embodiment the blockchain is a type of distributed computing system. In one embodiment the blockchain is suitable for recording events, and other records, management activities, identity management, transaction processing, and documenting provenance relative to a lottery. As a non-limiting example the blockchain is a distributed database that supports smart contracts that self execute and handles the enforcement, management and performance and payment of transactions that can manage the operations of a lottery including collection of wager purchases, and payment and distributions of winnings based upon lottery outcomes. In one embodiment a blockchain is secure by design and can be a distributed computing system with a high Byzantine fault tolerance. In one embodiment decentralized consensus has achieved with a blockchain. As a non-limiting example a blockchain is suitable for the recording of a variety of different: events, medical records, other records management activities, identity management, transaction processing, documenting provenance and the like.

For purposes of the present invention a smart contract is one or more are computer protocols enabled by a blockchain that facilitate, verify, or enforce a negotiation or performance of a contract, or that make a contractual clause unnecessary. As a non-limiting example smart contracts emulate the logic of contractual clauses. In one embodiment smart contracts are partially or fully self-executing, self-enforcing, or both. In one embodiment a blockchain itself can also be programmed to trigger transactions automatically. As a non-limiting example a smart contract can self execute, and the smart contract handles the enforcement, the management, performance and payment. As a non-limiting example smart contracts manage transactions based upon outcomes. As a non-limiting example a smart contract can be a self-operating computer program that automatically executes when specific conditions are met. As a non-limiting example because smart contracts run on the blockchain they execute as programmed without censorship, downtime, fraud or third party interference.

Referring to FIG. 1 in one embodiment a single platform 10 is provided that supports a full range of multiple legal lottery games from different jurisdictions, thus making it easy to integrate the different lottery games from different jurisdictions using a single platform 10 in various methods.

The single platform 10 allows a range of different lottery games to be played for each jurisdiction that is defined from one platform 10. The result is a single platform 10 that supports a range of different lottery games for each jurisdiction.

There can be different jurisdictional requirements for playing lottery games, including but not limited to a client's age, location, spending controls including but not limited to limits, controls that allow clients to free spend for a defined period of time, self-administered controls, and the like. As a non-limiting example some lottery games can be different in different jurisdictions. In one embodiment the single platform allows a jurisdiction agent to execute configurable game creation. With the single platform 10, one or more lottery games can be created for one or more jurisdictions.

In one embodiment the single platform provides overall global functionality as well as an ability to manage and segregate information. Additionally the single platform provides accounting for multiple parties and states.

In one embodiment the single platform provides extensive rules and controls, via a platform dashboard, to enable and disable single platform functionality on an account or partner basis.

The single platform provides functionality that is extensible and can provide territory specific functionality that routes purchasing and finances to the appropriate and segregated and partitioned general ledger/account based the is mostly determined the end lottery participant's current location (determined via GPS and geo-fencing functionality within the platform).

In one embodiment, based on end lottery participant location, which can be via GPS and other means of triangulation, the single platform selectively presents or turns games off that are relevant for a specific jurisdiction, state or territory that a lottery participant is currently located. As a non-limiting example, if the single platform determines that a lottery participant is in California, then only California specific games and functionality may be presented to a California based lottery participant.

Based on the end lottery participant location, which again as a non-limiting example can be determined by GPS and other means of triangulation, the single platform can selectively enable or disable buying functionality for games for a specific jurisdiction, state or territory.

In response to an end lottery participant's location, again as a non-limiting example as determined by GPS and other means of triangulation, the single platform routes ticket purchase and e-commerce revenues to the appropriate platform partner's general ledger/account within the single platform. As a non-limiting example, if the single platform determines that a lottery participant is in California then a purchase from a California based lottery participant is directed and credited to the California lottery account maintained within the single platform. Conversely if a lottery participant is in New York the purchase from that lottery participant is directed and credited to a New York lottery account maintained at the single platform. This functionality is especially important for shared games that are played across multiple, states, territories, countries and jurisdictions.

In one embodiment the platform 10 includes lottery game parameters 12 of multiple legal lottery game providers. The platform 10 also has a parameter setting mechanism 14 for allowing a multiple lottery providers to have input respective single platform 10 provided lottery game defining parameters to the lottery game parameters, and thereby to implement a desired single platform 10 provided lottery game via the lottery game parameters. In one embodiment the single platform includes modules coupled to a server including but not limited to, provisioning 16, as more fully discussed hereafter; discoverability 18; findability 20; buyability 22; and obtainability 24.

The lottery game parameters include the following features that characterize a lottery game that can be executed for multiple jurisdictions over Network Systems which are shared between all multiple legal game providers.

It will be appreciated that using the single platform 10, enhancements can be made to the generic part of the different lottery games for each jurisdiction. Thus new features can be provided for a whole range of lottery games via a single modification carried out at platform level.

Figure 2:
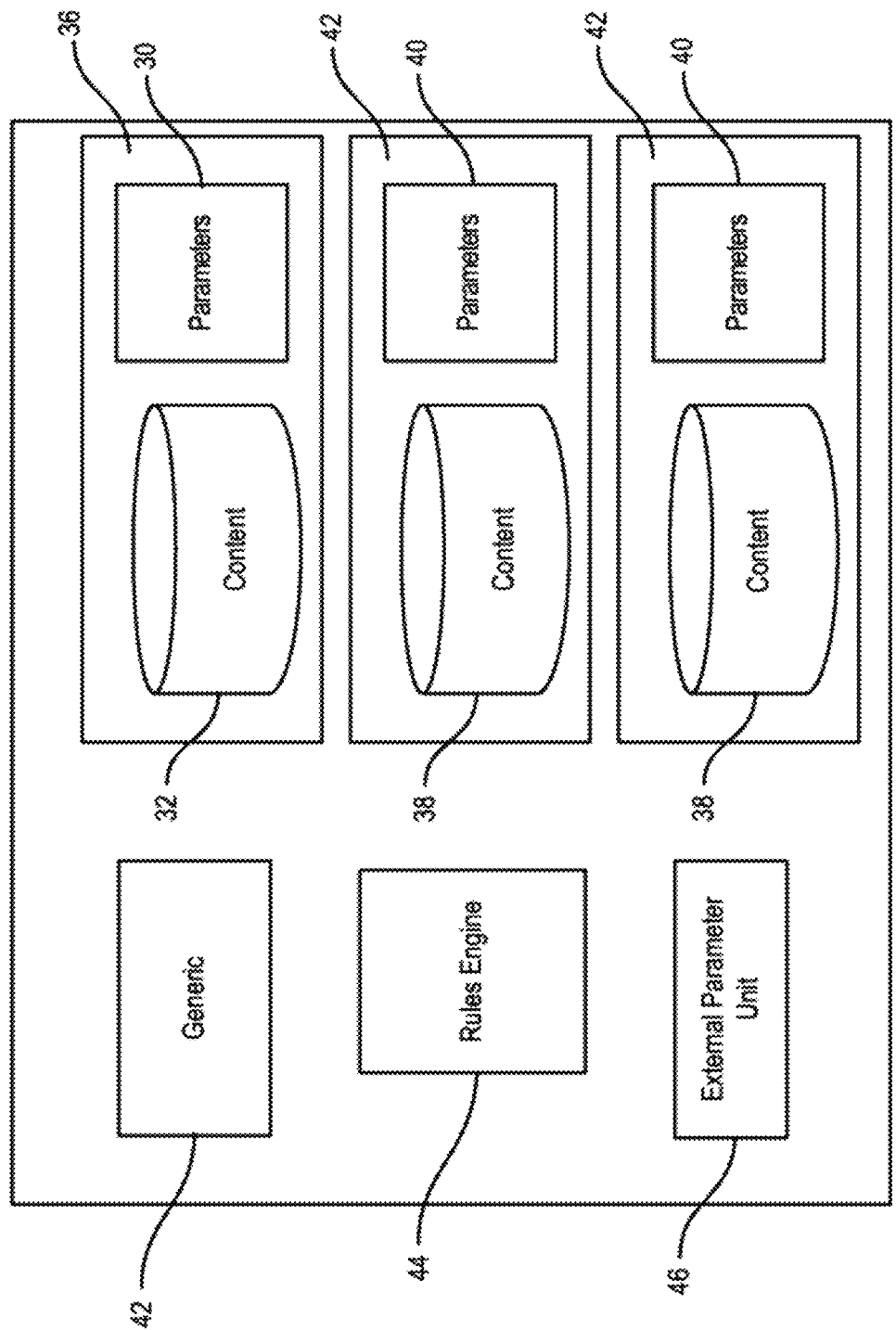
FIG. 2 is a simplified system level block diagram showing an alternative embodiment of the lottery game platform according to the embodiment of FIG. 1.

Reference is now made to FIG. 2, which is a block diagram of the FIG. 1 single platform 10. FIG. 2 illustrates lottery game parameters together with modules implementing individual lottery games for each jurisdiction, and with implementation features. The lottery game parameters 30 are used together with content 32 and other parameters to set up a first lottery game in a first lottery game module 36. A second lottery game can be set up using content 38 and parameters 40 in a second lottery game module 42. A third lottery game can be set up using content 38 and parameters 40 in a third lottery game module 42, and so on.

In one embodiment the single platform 10 includes a rules engine 44, which operates logic required for a desired lottery games for different jurisdictions by implementing defining parameters, including parameters which are themselves logical rules, or which form part of or implement logical rules.

In one embodiment an external parameter obtaining mechanism 46 to obtain external parameters for modifying application of a respective desired lottery game for a jurisdiction. As non-limiting examples, the basic jurisdiction requirements include but are not limited to age, location in the Jurisdiction, and the like.

As shown, the platform includes a plurality of modules, each module carrying a different arrangement of parameters and/or content, thereby to combine different lottery games and implementing the rules set forth by different jurisdictions within the platform.

The platform is able to support additional lottery games. That is to say, new lottery games are simply added to the single platform 10 by providing the relevant content and setting the parameters.

Figure 3:
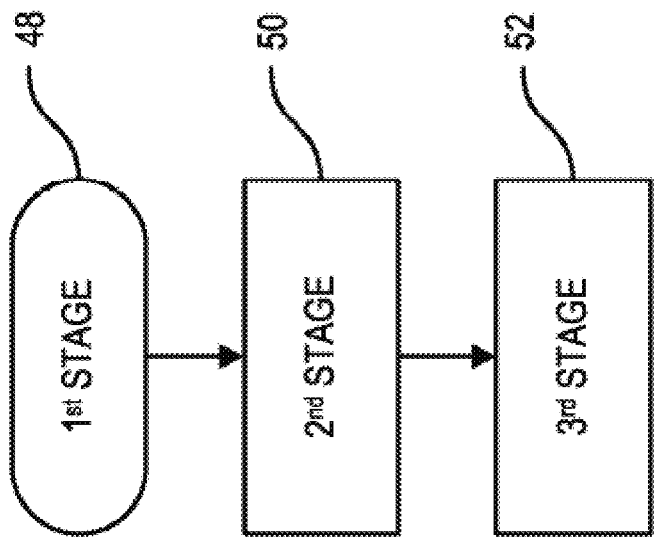
FIG. 3 is a simplified flow diagram illustrating the selection of a service from a plurality of games on the lottery game platform by a user in one embodiment of the present invention.

Reference is now made to FIG. 3, which is a simplified flow chart showing how the single platform 10 supports a plurality of lottery games, lottery services and different jurisdictions. The single platform 10 as implemented manages a content delivery between various lottery game providers and different client devices.

In one embodiment the delivery provision of lottery services via the platform fir different lottery games and for different jurisdictions includes the following stages: (i) a first stage 48 provide separate modules for the content delivery interface as described above, in which each module provides content as part of different jurisdictions. A second stage 50 selects an appropriate module for the content delivery interface according to a currently desired lottery game and/or jurisdiction. In a third stage 52 the selected module is added to the content delivery interface, to provide to the user the currently desired lottery game for the different available jurisdictions. In one embodiment there are different modules for different jurisdictions.

In one embodiment the client device is a GPS-enabled mobile device that is set up to report a geo-fence-crossing-event to the cloud infrastructure. This is utilized determine if a client is within a jurisdiction. In one embodiment when the client device crosses the geo-fence it sends a fence-crossing event communication to the single platform directly and via a server in the cloud. The single platform receives the fence-crossing communication. The single platform intercepts and responds to an advertising packet from the client device. The single platform communicates the client device to advertise with a desired interval. In one embodiment the single platform advertises within a selected time period in anticipation of a user with client device approaching a new jurisdiction. In this manner the single platform detects the advertising packet from the single platform faster. The single platform responds and normal communication is initiated. Authorization is then provided by the single platform to the user with the client device when the client is within a geo-fence that defines a new jurisdiction.

Figure 4:
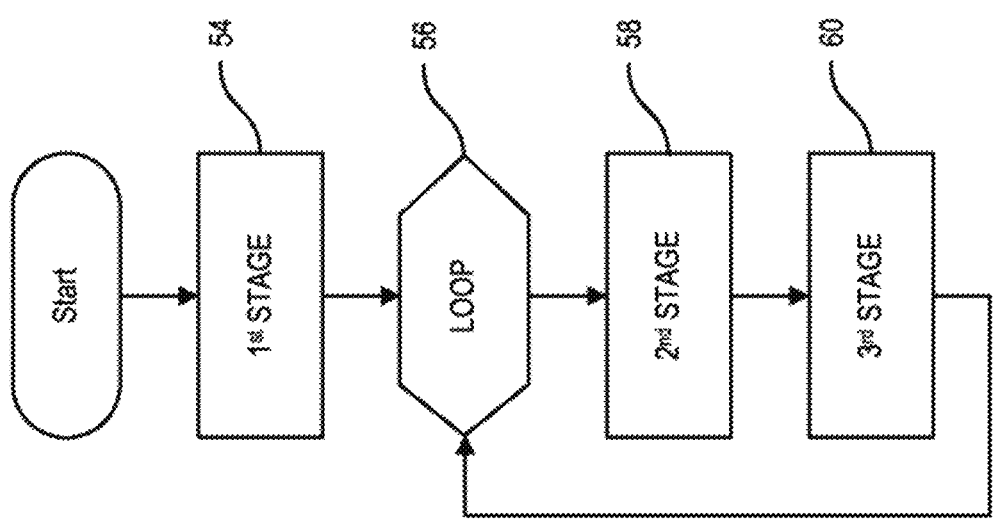
FIG. 4 is a simplified flow diagram illustrating the programming of the lottery game platform in one embodiment of the present invention.

Reference is now made to FIG. 4 which a simplified flow chart is illustrating the procedure for setting up the platform and then setting up the individual lottery services on the platform. The method comprises a first stage 54 of providing lottery game parameters of a multiple legal game providers. As explained above, the lottery game parameters comprises common features needed for the various lottery services. The lottery game parameters is able to take specific lottery game defining parameters, and to accept the specific content of the given lottery game and/or jurisdiction. In one embodiment for the plurality of offered lottery games a loop 56 is carried out. The loop can include a stage 58 of inputting respective lottery game defining parameters, and a stage 60 of adding lottery game and/or jurisdiction specific content. The loop can be carried out every time it is desired to add a new lottery game.

In one embodiment the single platform 10 is a carrier-to download lottery games and lottery services from the single platform 10. The single platform 10 facilitates the delivery of multiple content types to different client device including but not limited to different protocols. Content types can include applications, ring tones, icons, images, audio and the like. Because the generic part of the lottery services has already been predefined, the single platform 10 allows client device including but not limited to a client device to concentrate on the content part of their lottery services to match the lottery game rules, the different jurisdiction rules and the like. Through the single platform 10, a wide selection of billing models, subscription packages and lottery services bundles.

The single platform 10 is scalable, since a new lottery game lottery services is simply a matter of adding a new module, and robust, since the generic part of the general lottery games has been separately created and tested. In one embodiment The services uses reliable infrastructure components including application server, messaging server and database server and allows demand for new and increasingly complex data lottery services to be fulfilled in minimal time since it can be based on the existing lottery game parameters.

The single platform 10 can take into consideration the resource constraints of the different client device including but not limited to a client device thus saving the content provider the task. Clients can defining their interests and habits, again requiring very little effort on the part of the content provider since the single platform 10 takes care of these issues. The single platform 10 is able to provide the appropriate lottery game content menus, lottery services notifications and billing models that best fits the client's preferences.

The single platform 10 provides end-to-end support for lottery game and/or jurisdiction content aggregation workflow. The single platform 10 provides support for the workflow, by which downloadable content is introduced by lottery game providers and aggregated into a chargeable lottery services. The single platform 10 provides an interface for lottery game providers to submit multiple content items and assign billing models to them. It also provides tools for the lottery services administrator to manage the process of validating and publishing submitted lottery game content items, as well as that for the different jurisdictions, in order to make them available for clients. Such content validation processes are suitable for multiple different lottery games and internal policies of different jurisdictions.

The single platform 10's generic and extendible infrastructure is designed to support multiple types of lottery games, different jurisdictions content and multiple client devices. This allows a spectrum of lottery games and jurisdictions to provide integrated provisioning lottery services through a single platform 10 without the burden of dealing with the complexity of different underlying technologies. The different lottery games, jurisdictions, and client device including but not limited to a client device that is able to provide the client with a single access point to a comprehensive with and rich content.

The platform enables compliance with regulatory compliance with lottery from different jurisdictions.

In one embodiment the single platform 10 provides various tools that facilitate the quick marketing tools enable promotion campaigns of lottery games.

In one embodiment the single platform 10 is customizable, including features such as possible support for multiple languages, currencies, communication with social networks/media, fraud detection, group play both private and public with different amounts or the same amount for members of the group, lottery game attributes, collected statistical measurements, requested information from lottery game providers and clients, access control management, and more.

In one embodiment the single platform 10 features a rule engine, as explained above, that governs various policies in the system 10.

In one embodiment the single platform 10 is scalable design and can be expanded easily in order to provide additional system capacity. The platform solution is built of components, which can be expanded easily by adding more CPUs/RAM (Vertically) or by adding more components (Horizontally). The load is divided between the components using load balancers. In order to enhance system capacity, new components can be installed easily, and added to the platform cluster. Then, they are activated, by changing the settings of the router/load balancers.

In one embodiment the single platform 10 provides online measurements (e.g., number of downloads) and alerts (e.g., overloaded server) through an extendible management tool or through an SNMP based management system. In addition, the system generates reports based on statistical information, which is periodically gathered. These reports provide valuable information for fine-tuning the lottery services and matching it to client's habits and purchase patterns. Selective information can be provided to lottery game providers and/or jurisdictions.

In one embodiment the single platform 10 introduces a comprehensive security approach that includes enhanced fraud detection and digital right management. In one embodiment the various interfaces to the single platform 10 are secured both by a flexible access control mechanism that enables the lottery services provider to prevent unauthorized access, and by substantial mechanisms (e.g., SSL) that protect the system against various attacks, such as impersonation, eavesdropping and tampering of data.

Figure 5:
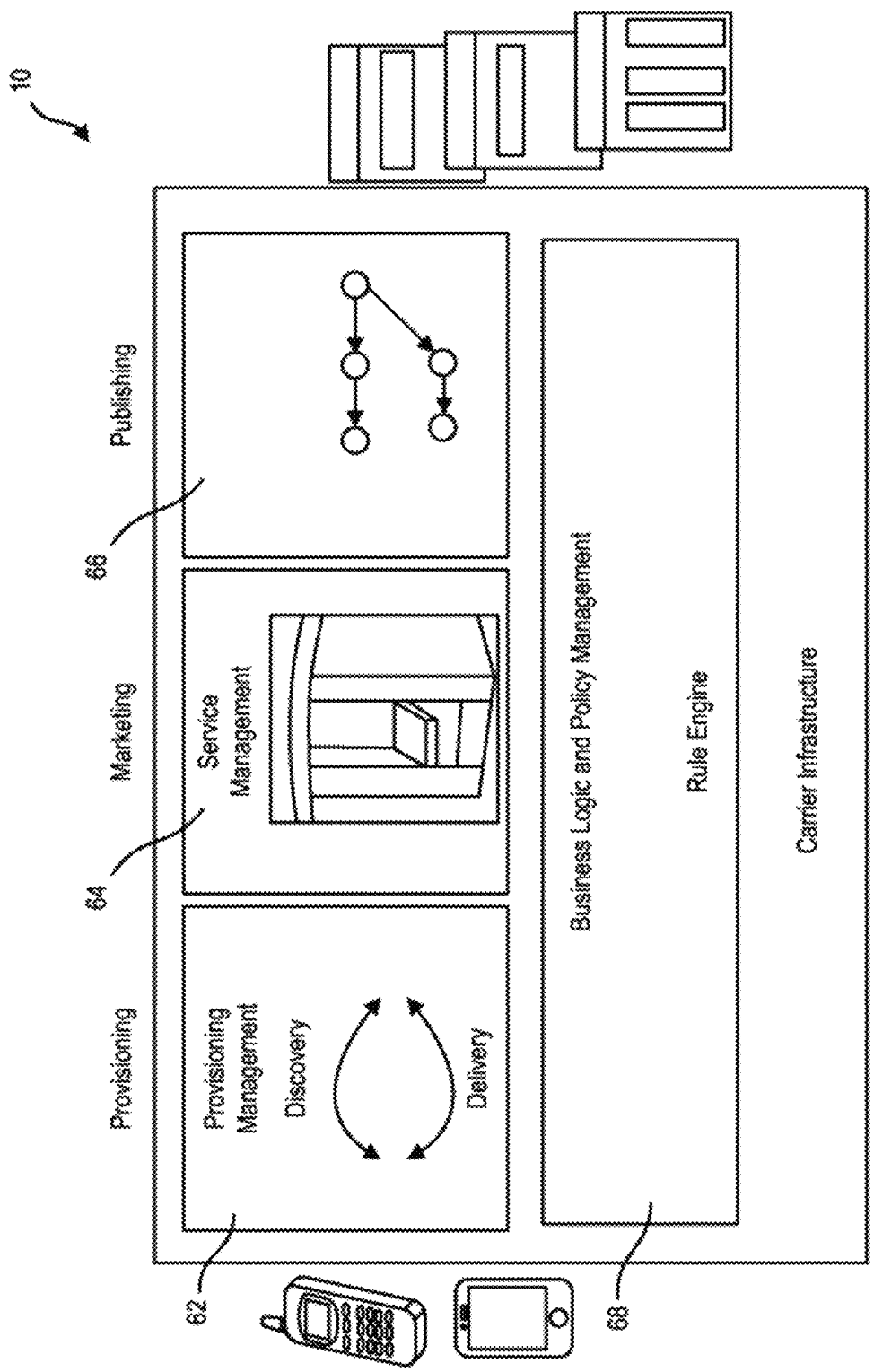
FIG. 5 is a simplified system block diagram illustrating the lottery game platform of FIG. 1 from a further aspect.

Referring now to FIG. 5, the platform 10 includes several functional units. A provisioning management unit 62 provides personalized lottery game discovery and over-the-air lottery game delivery lottery services for client device including but not limited to a client device.

In one embodiment a lottery services management unit 64 allows the platform to manage lottery games, clients, lottery game providers, devices, pricing and discounts, notifications, reports and the like.

In one embodiment an aggregation workflow unit 66 controls the process by which lottery games are submitted by lottery game providers, and verified, tested, approved and published.

In one embodiment business logic and policy management unit 68 is governed by the rule engine, and manages the various policies in the single platform 10 system.

Wireless Content Provisioning is the process by which content is discovered by mobile users and delivered over-the-air (OTA). In one embodiment the single platform 10 provides context-aware provisioning lottery services, which is dynamically adjusted to the context of a lottery game request. In one embodiment the single platform 10's content provisioning architecture utilizes extendible provisioning adapters in order to support multiple content types, protocols and devices.

In one embodiment the provisioning process includes at least some of the following stages:
  Authentication of the client.
  Discovery of lottery game content by the client through various methods.
  Purchase of lottery games.
  OTA Delivery of the lottery game.

In one embodiment the single platform 10 enables dynamic discovery and delivery of lottery games to clients. In one embodiment clients can browse through a lottery game directory, which is filtered by lottery services package and preferences. In one embodiment categories of lottery games are displayed as a menu or folder within the discovery application (DA), which can be either a micro-browser or a resident application written specifically for content discovery. The dynamically generated menus are formatted according the markup language used by the discovery application. The single platform 10 can be accessible from various types of browsers (e.g., WAP browser, Web browser) that support different markup languages, such as WML and HTML. The delivery lottery services automatically identify the browser based on the HTTP request header properties, such as User-Agent, and returns matching formatted menus.

In one embodiment the single platform 10 supports multiple methods of provisioning, that are initiated by different players, as follows:
  Client-initiated. Lottery game discovery and delivery is initiated by the client.
  Device-initiated. Lottery games are accessed through a discovery application, such as a WAP browser.
  Web-initiated. The client discovers and purchases lottery games through a Web browser.
  SMS-initiated. The client discovers and orders content items by sending SMS messages that include short codes.
  IVR-initiated. The client discovers and orders lottery games through an interactive voice response (IVR) interface.
  Server-initiated. Lottery games delivery is initiated by the platform, as a result of:
    New lottery games notifications. Publishing of new lottery games items triggers notifications that are sent to interested clients and allow them to download these items.
    Client care. A client care agent can push lottery games items to clients upon request.

The single platform 10 systems contain a flexible infrastructure for provisioning of various lottery games types. It is possible to define different provisioning adaptors for different lottery games types, protocols and devices. These provisioning adaptors are entered seamlessly into the provisioning flow. They define the protocol with the device (e.g., HTTP or SMS) for delivering the lottery games, and the processing that is performed on these lottery games before delivery.

As a non-limiting example, the Mobile Information Device Profile (MIDP) standard defines the protocol, by which Java 2 Micro Edition (J2ME) applications are delivered. According to this protocol, the interaction between the device and the download server, involves several HTTP requests. The first request is for the Java Application Descriptor (JAD), which describes the attributes of the application (name, version, size, etc.). The second request is for the application itself, which is provided in a Java Archive (JAR) file. Once the application is installed successfully, the device sends an install notification, as an HTTP post request to the URL, which is defined in the descriptor.

The need for provisioning adapters stems from the fact that there are multiple download protocols (MIDP OTA, OMA OTA, Nokia COD, etc.) and multiple variations for each protocol that are implemented by different devices. Thus, there is a need adjust the download protocol and its parameters to each device.

The platform lottery services delivery framework enables the construction and customization of Web-based interfaces that are provided by the single platform 10. The framework controls the flow, logic and presentation of user interfaces. It is applicable both for WAP-based user interfaces and for Web-based lottery services, and for other kinds of browsing including SMS browsing, IVR browsing, and video browsing.

Figure 6:
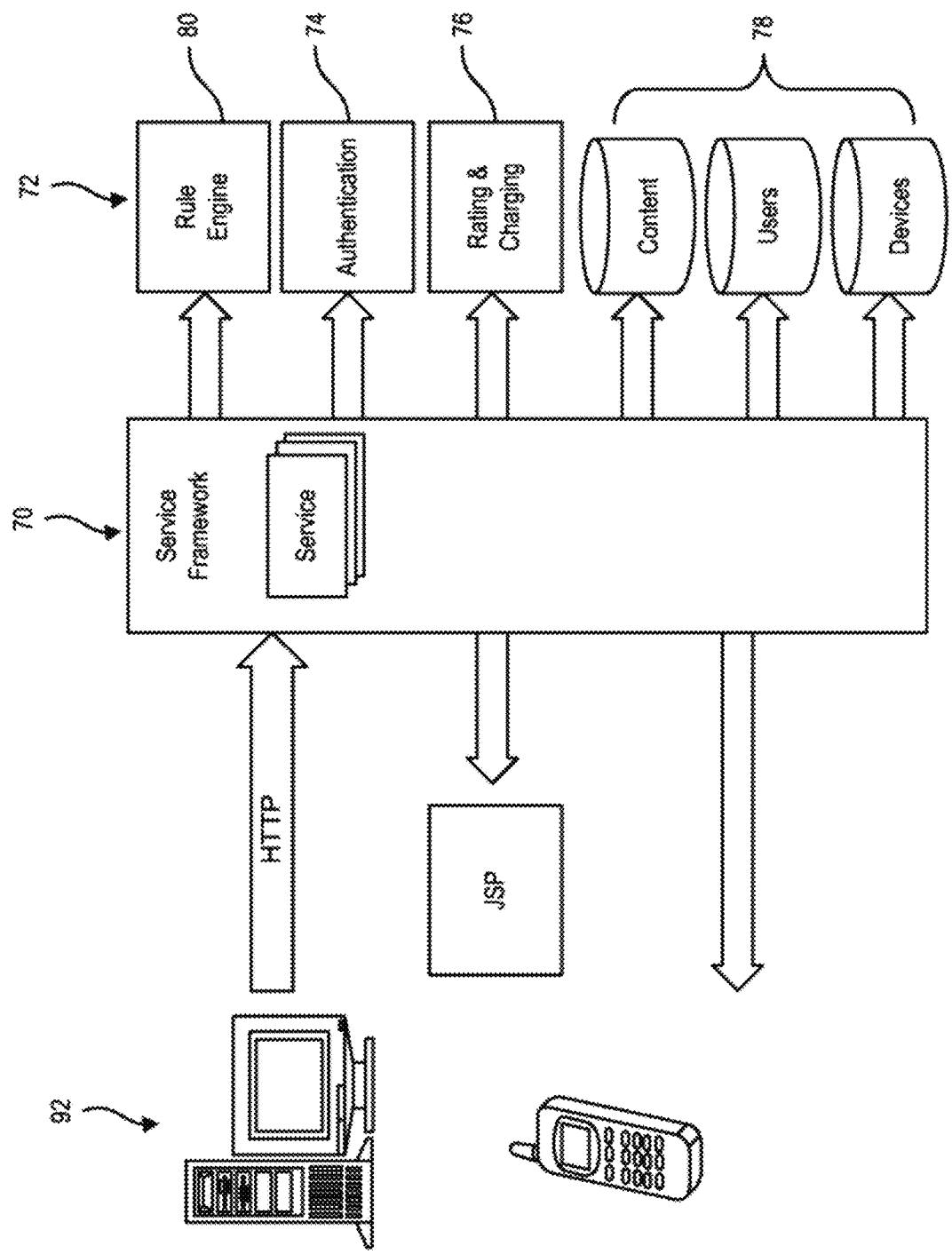
FIG. 6 is a simplified system block diagram showing the aspect of FIG. 5 in greater detail.

The high-level lottery services architecture is depicted in FIG. 6, to which reference is now made. A lottery services framework 70 mediates between client device 210 and the various engines and databases 72. Each incoming HTTP request is handled by the lottery services framework. The framework 70, which serves as a container of lottery games, allocates the appropriate lottery game for handling the request. The lottery game can use various components such as authentication 74, rating and charging 76, and access various repositories 78, in order to fulfill the request. The lottery services framework itself uses rule engine 80 in order to make some decisions regarding the flow between lottery services. Some of the lottery services can have presentation, which is rendered through JSP pages. Others can return a response directly to the client (e.g., when delivering a Java application).

Figure 7:
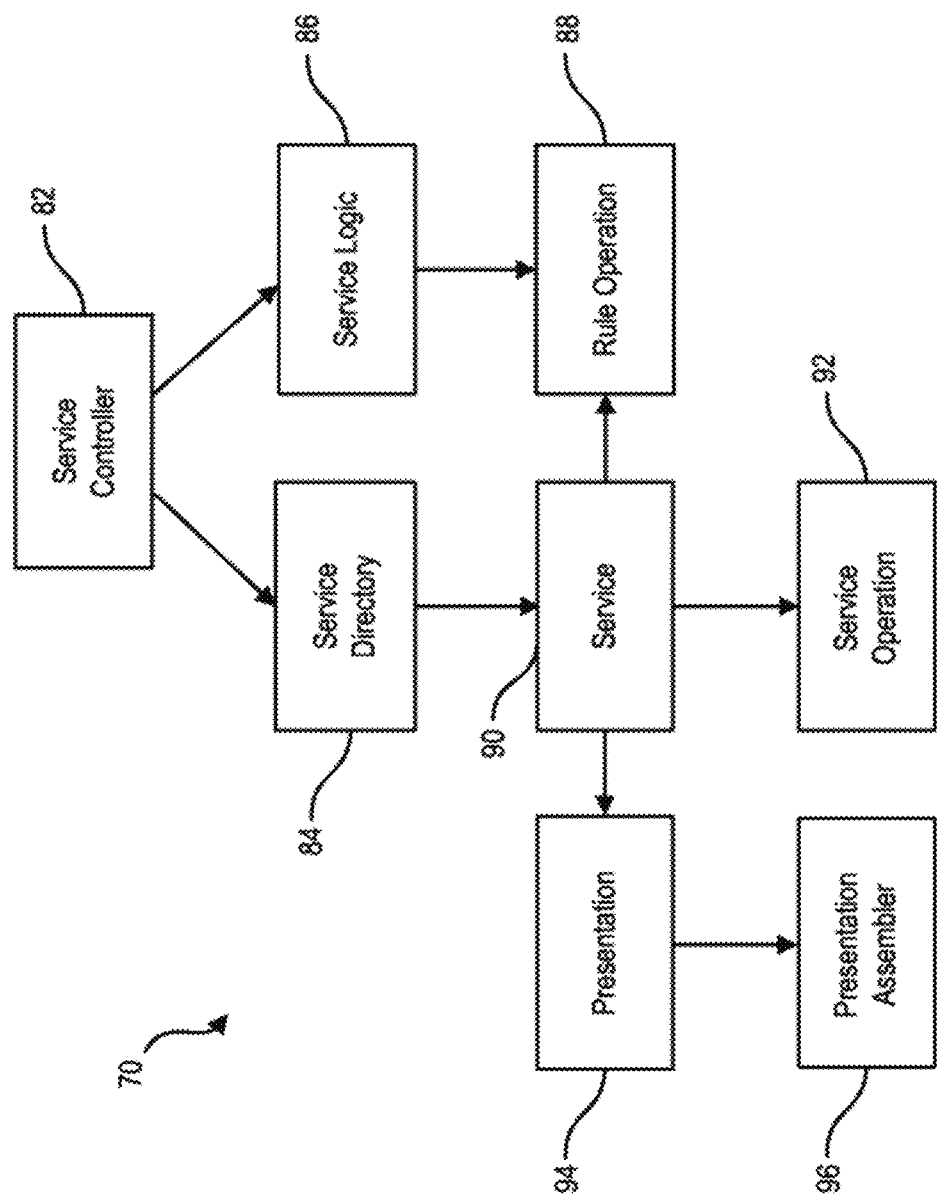
FIG. 7 is a simplified system block diagram showing in greater detail the features of FIG. 6.

Reference is now made to FIG. 7, which is a system-level block diagram which shows in greater detail the lottery services delivery framework 70.

In one embodiment the framework 70 includes the following:
  Lottery Game Controller 82—responsible for receiving incoming HTTP requests and routing them to appropriate lottery game.
  Lottery Game Directory 84—a registry for the entire lottery games in the framework.

Lottery Game Logic 86—controls the flow between lottery services, based on rules. It can decide to execute a requested lottery game or forward (logical) the request to another lottery game.

Rule operation 88—constructs the condition that is used in a rule.

Further components include a service module 90, service operation module 92, presentation 94 and a presentation assembler 96.

Figure 8:
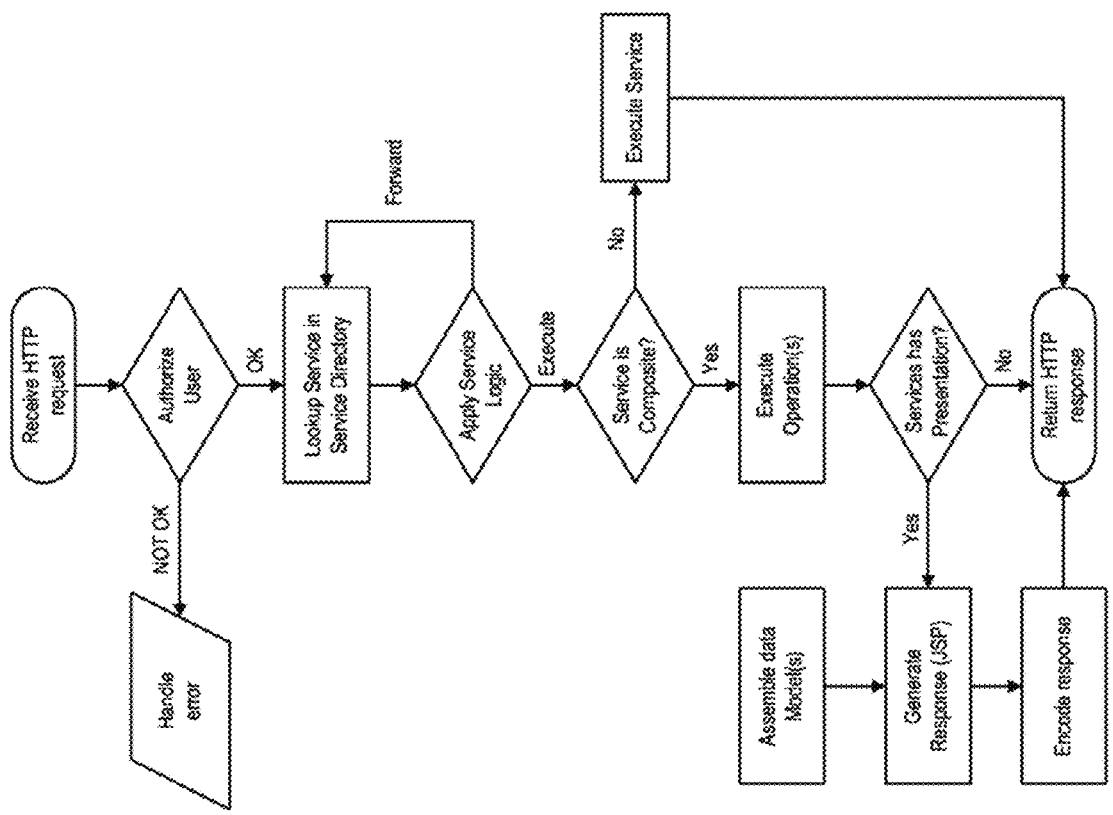
FIG. 8 is a simplified flow diagram illustrating the response of the lottery game platform in one embodiment of the present invention.

Reference is now made to FIG. 8, which is a simplified flow diagram illustrating the flow involved in serving an incoming request for a lottery game.

An incoming request preferably includes the name of the requested lottery game in the URL.

The single platform 10 authenticates the client who sent the request and checks whether he has a permission to use the requested lottery game.

If the user is authorized, the single platform 10 looks up the lottery game in the lottery game directory.

If the lottery game has logic, then the associated rules are applied through the rule engine. This logic determines if the request should be handled by the requested lottery game or forwarded (internally) to another lottery game. If there is no logic, the lottery game can be executed unconditionally.

A lottery services is a logical unit that handles an HTTP request. It is pointed out that the lottery services as described here within the lottery services flow is not the same as the overall lottery games lottery services which the user requests and which is provided, but here denotes an element of that lottery services. Each lottery services are responsible for a specific task such as displaying a menu, performing a search or delivering a lottery games item. The definition of a lottery services includes the following elements:

Lottery services parameters—a list of input and output parameters for the lottery services (see 0).

Lottery services patterns—a URL pattern that is used for accessing the lottery services. The URL pattern is added as a suffix to the URL of the main servlet. It can include the value of lottery services parameters, denoted by curly brackets (e.g., {node}).

Lottery services operations—a list of lottery services operations.

Presentation—There are 3 possible values for this parameter: the name of a presentation, empty value which means no presentation or @runtime@ which means that the presentation is determined during runtime based on the URL and the lottery services operations.

Attributes:
Name—the name of the lottery services.
Must have session—indicates if the lottery services can only be accessed with a valid session.
Need login—requires client authentication.
Entry point—an entry point to the system.
Permission—the name of the required permission for accessing this lottery services.
Has logic—denotes that the lottery services are associated with a rule in the lottery services logic.
Expired—denotes how much time the URL for the lottery services remains valid.
Put in back stack—indicates if this lottery services should be included in the back stack of the browser.
Reentry allowed—indicates if this lottery services can be reentered during the same sess10n.

Lottery Services Parameters
Lottery services parameters can be specified in the one of the following types:

Input parameter—a parameter that is provided as an input to the lottery services. Its attributes include:
Name—the name of the parameter
Source—the source of the parameter:
Configuration—read from system configuration
Post—passed as an HTTP Post parameter
Session—stored in the session
Const—a constant value that is specified in the lottery services directory
URL—encoded in the URL
Param—receives the value of another parameter.
Value—the value of the parameter. The value must be present if the parameter is constant or appears in the URL pattern.
Type—the data type of the parameter: Boolean, byte, date, double, file, float, integer, long, short, string, record, list or map.

Output parameter—a parameter that is generated as an output of the lottery services. Its attributes include:
Name—the name of the parameter.
Dest—the destination of the parameter:
Session—stored in the session.
Request—forwarded in the HTTP request to another lottery services.
Type—the data type of the parameter: Boolean, byte, double, float, integer, long, short, string or record.
Const—denotes that the value of the parameter is constant Cleanup parameter—a parameter that is removed from the session or the request by the lottery services. Its attributes include:
Name—the name of the parameter.
Dest—the location of the parameter:
Session—stored in the session.
Request—forwarded in the HTTP request to another lottery services.

Lottery Services Operation
Lottery services operations are the building blocks of lottery services in the platform. A lottery services can be composed of multiple operations, which are executed in a sequence. The definition of an operation includes the following elements:
Operation Name
Operation parameters—parameters that are provided for the operation.
Operation Parameters
Each operation can have input and output parameters. Output parameters are passed as input parameters to the next operation in the chain. In addition, the operation has access to the parameters of the lottery services in which it is included.
The attributes of each explicit input parameter include:
Name—the name of the parameter.
Value—the value of the parameter.
Type—the data type of the parameter: Boolean, byte, double, float, integer, long, short, string or record.
Presentation.
The presentation is optionally associated with a lottery services. It defines how the output of the lottery services is presented to the user. The definition of a presentation includes the following elements:
Presentation parameters—a list of parameters that are provided for the presentation.
Presentation headers—HTTP headers that are generated in the response.
Presentation Assemblers.
Attributes:
Name—the name of the operation.

JSP Name—the name of the JSP that is associated with the presentation.

Encoder—the name of the encoder that is applied on the result of the JSP.

Print response—denotes if the response should be written to the debug log.

Presentation Parameters

Presentation parameters are provided as an input to the presentation. The attributes of each parameter include:

Name—the name of the parameter

Value—the value of the parameter (if it is static).

Type—the data type of the parameter: Boolean, byte, date, double, file, float, integer, long, short, string or record.

Source—the source of the parameter:

Configuration—read from system configuration.

Const—specified in the lottery services directory file as a constant.

URL—encoded in the URL.

Presentation Headers

The presentation headers define the HTTP headers that are included in the HTTP response. A presentation header includes a name and a value. The following HTTP header types are supported:

Lottery games Length—the value is automatically calculated by the system.

String—a header with a string value (e.g., Lottery games-Type).

Date—a header with a date value.

Presentation Assemblers

Presentation assemblers are responsible for collecting data into a Page Model that is used by the JSP. The presentation assembler has a name and can receive parameters that have the following attributes:

Name—the name of the parameter.

Value—the value of the parameter.

Type—the type of the parameter: Boolean, byte, double, float, integer, long, short or string.

In addition, the assembler has access to the parameters of the presentation and the parameters of the lottery services in which it is included.

The output of the presentation assembler is a Page Model. The page model can include the following elements:

Field

Table

Tree

Each of these elements is associated with a name.

Lottery Services Logic

The lottery services logic contains ECA rules that control some of the transitions between lottery services. Each rule in the lottery services logic is defined by the following elements:

Event—the name of the event is identical to name of the lottery services that triggers the rule. This is applicable to lottery services which are defined as "has logic".

Condition—the condition (optional) can be composed of lottery services operations and other expressions. The condition returns a Boolean result that determines which action to execute.

Action—the action can be one of the followings:

Execute Lottery services—execute the current lottery services

Forward to Lottery services—forward to another lottery services, where the target lottery services name is provided as a parameter.

Rule Operation

A rule operation is a component that can be used in lottery services logic rules. Each rule operation checks a certain condition that allows the lottery services logic to make a decision about the next lottery services to call. Each rule operation can require input parameters and provide output parameters. The input parameters that a rule operation receives are a subset of the input parameters of the lottery services that triggered the rule. The output parameters are available for the lottery services that are called as a result of the rule.

Figure 9:
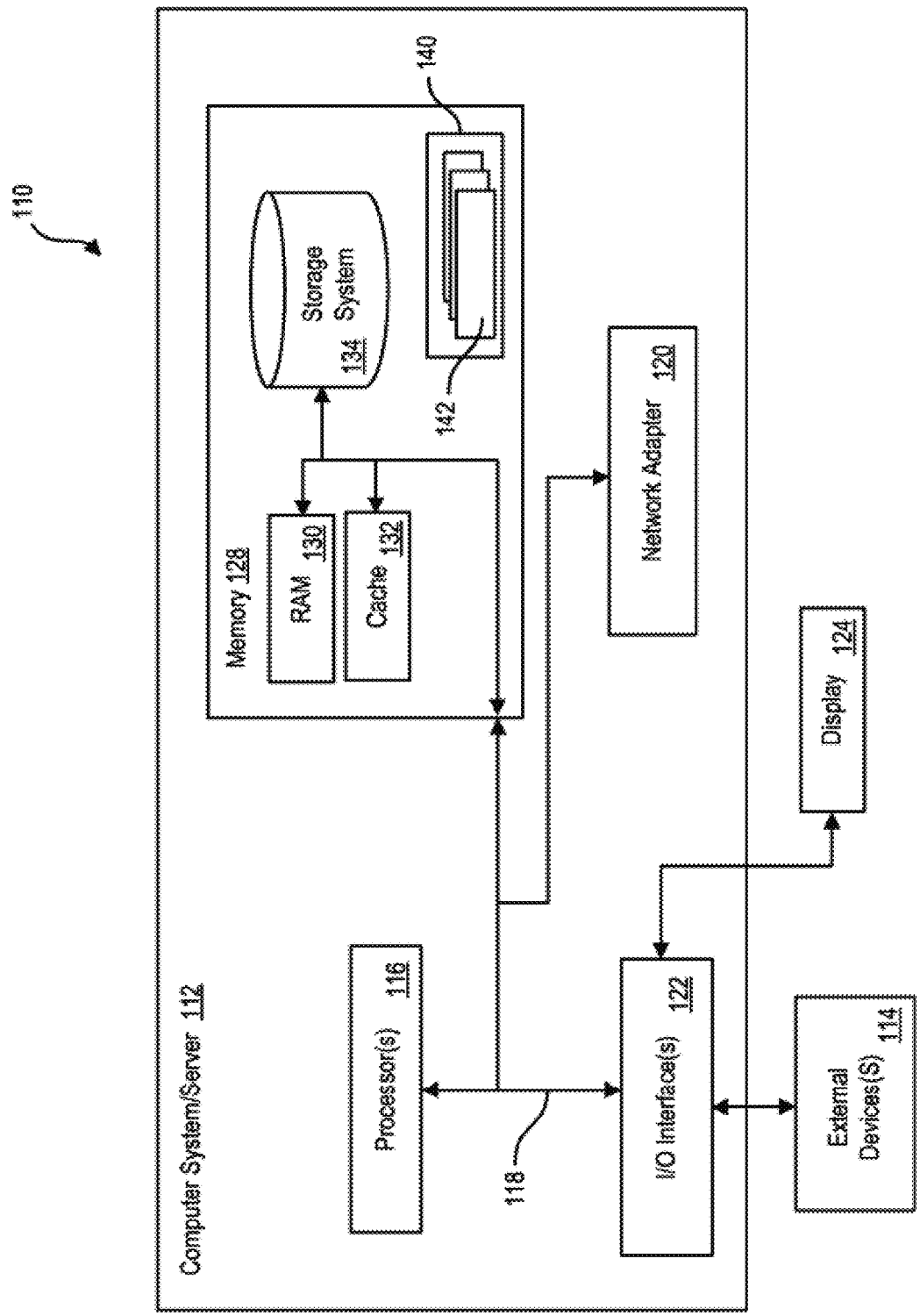
FIG. 9 illustrates a relevant portion of an exemplary cloud computing node that is configured according to an embodiment of the present embodiment.

With reference to FIG. 9 one embodiment of a cloud computing node 110 is shown. Cloud computing node 110 is only one example of a suitable cloud computing node and is not intended to suggest any limitation as to the scope of use or functionality of embodiments described herein. Regardless, cloud computing node 110 is capable of being implemented and/or performing any of the functionality set forth herein. Cloud computing node 110 includes a computer system/server 112, which is operational with numerous other general purpose or special purpose computing system environments or configurations. Examples of well-known computing systems, environments, and/or configurations that can be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, Network System PCs, minicomputer systems, mainframe computer systems, and distributed cloud computing environments that include any of the above systems or devices, and the like.

Computer system/server 112 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 112 can be practiced in distributed cloud computing environments where tasks are performed by remote processing devices that are linked through Network System. In a distributed cloud computing environment, program modules can be located in both local and remote computer system storage media including memory storage devices.

As shown in FIG. 1, computer system/server 112 (in cloud computing node 110) is illustrated in the form of a general-purpose computing device. The components of computer system/server 112 can include, but are not limited to, one or more processors or processing units (including one or more processor cores) 116, a system memory 128, and a bus 118 that couples various system components (including system memory 128) to processors 116. Bus 118 represents one or more of any of several types of bus 118 structures, including a memory bus 118 or memory controller bus 118, a peripheral bus 118, an accelerated graphics port, and a processor or local bus 118 using any of a variety of bus 118 architectures. By way of example, and not limitation, such architectures include the industry standard architecture (ISA) bus 118; the micro channel architecture (MCA) bus 118, the enhanced ISA (EISA) bus 118, the video electronics standards association (VESA) local bus 118, and the peripheral components interconnect (PCI) bus 118.

Computer system/server 112 typically includes a variety of computer system readable media. Such media can be any available media that is accessible by computer system/server 112, and includes both volatile and non-volatile media, removable and non-removable media. System memory 128 can include computer system readable media in the form of volatile memory, such as random access memory (RAM) 130 and/or cache memory 132.

Computer system/server 112 can further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces.

As will be further depicted and described herein, memory 128 can include at least one program product having a set (e.g., at least one) of program modules that are configured to carry out the functions of various disclosed embodiments. Program/utility 140, having a set (at least one) of program modules 142, can be stored in memory 128 by way of example, and not limitation, as well as an operating system, one or more application programs, other program modules, and program data. Each of the operating system, one or more application programs, other program modules, and program data or some combination thereof, can include an implementation of a networking environment. Program modules 142 generally carry out the functions and/or methodologies of embodiments of the invention as described herein.

Computer system/server 112 communicates with one or more external devices 114, including but not limited to client device 210 that enable a client to interact with computer system/server 112, and/or any devices (e.g., network card, modem, etc.) that enable computer system/server 112 to communicate with one or more other computing devices. Such communication can occur via Input/Output (I/O) interfaces 122. Still yet, computer system/server 112 can communicate with Network System.

In one embodiment, network adapter 120 communicates with the other components of computer system/server 112 via bus 118. It should be understood that although not shown, other hardware and/or software components can be used in conjunction with computer system/server 112. Examples, include, but are not limited to: microcode, device drivers, redundant processing units, external disk drive arrays, redundant array of inexpensive disk (RAID) systems, tape drives, and data archival storage systems, and the like.

Figure 10:
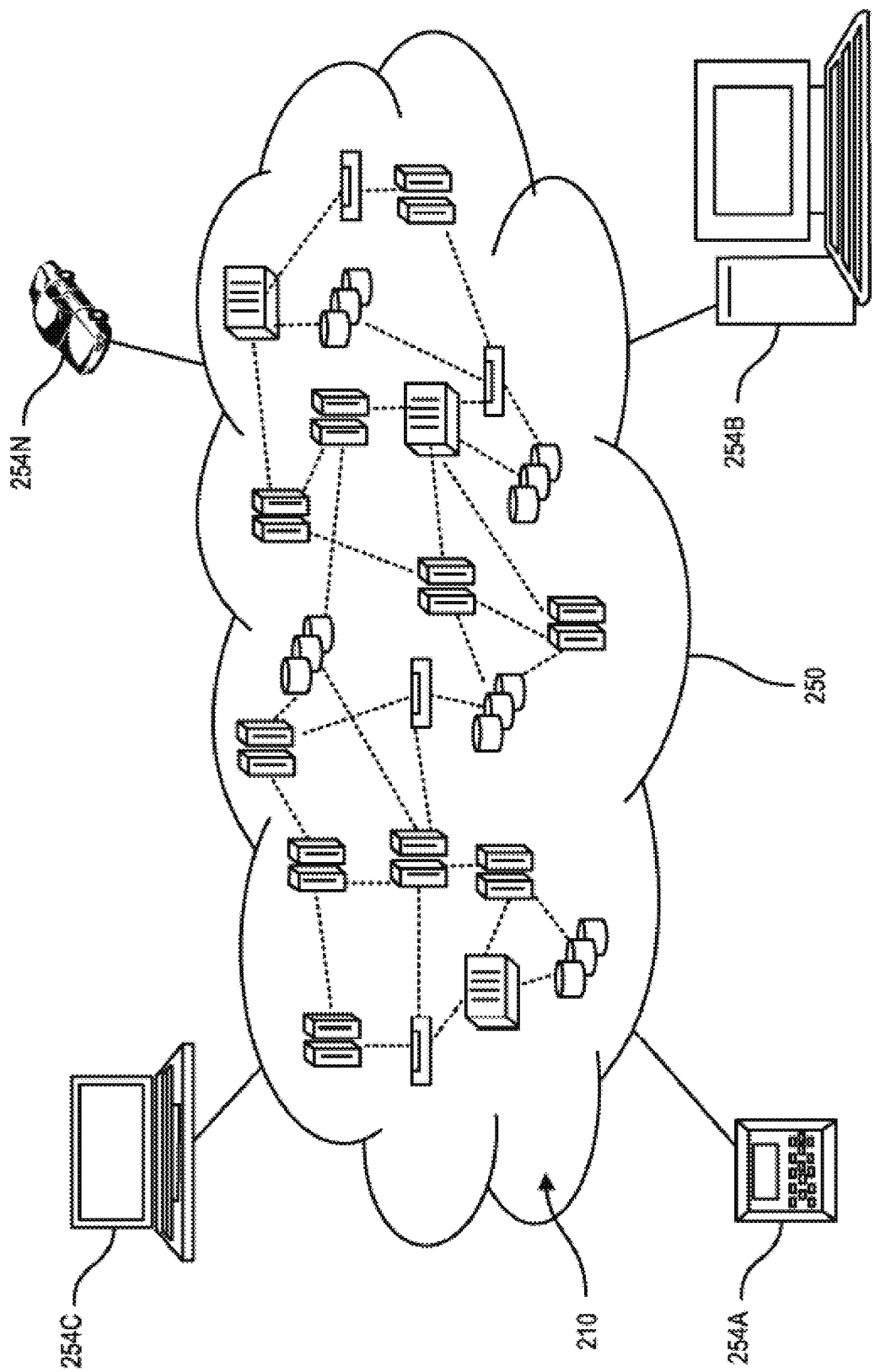
FIG. 10 illustrates a relevant portion of an exemplary cloud computing environment that is configured according to an embodiment of the present embodiment.

FIG. 10 illustrates one embodiment of a cloud computing environment 50, as more fully described below and hereafter. In one embodiment the cloud computing environment 250 comprises one or more cloud computing nodes 10 with which client devices 210 may communicate. Nodes 210 may communicate with one another and may be grouped (not shown) physically or virtually, in one or more networks, such as private, community, public, or hybrid clouds as described herein, or a combination thereof. In this manner, cloud computing environment 250 can offer infrastructure, platforms and/or software as services for which a cloud consumer does not need to maintain resources on a local computing device.

Figure 11:
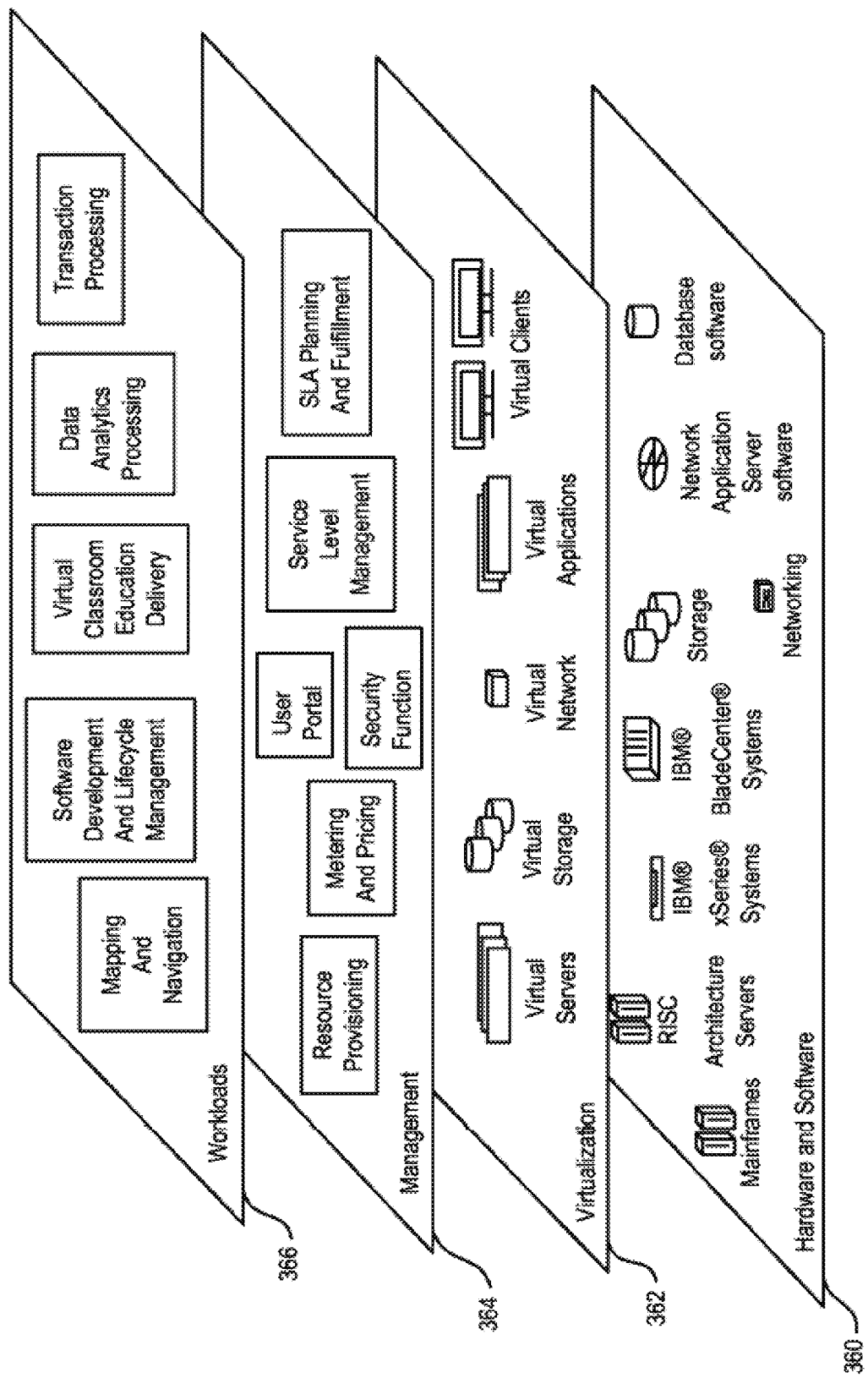
FIG. 11 illustrates exemplary abstraction model layers of a cloud computing environment configured according to an embodiment of the present embodiment.

With reference to FIG. 11, one embodiment is illustrated of a set of functional abstraction layers provided by the cloud 250. It should be understood that the components, layers, and functions shown in FIG. 11 are intended to be illustrative only and embodiments of the invention are not limited thereto. As depicted in FIG. 11, cloud computing environment 250 includes a hardware and software layer 360, a virtualization layer 362, a management layer 364, and a workloads layer 366.

Hardware and software layer 360 includes various hardware and software components. Virtualization layer 362 provides an abstraction layer in which virtual entities (e.g., virtual servers, virtual storage, virtual networks of Network System (including virtual private networks), virtual applications and operating systems, and virtual clients are included. As previously discussed, these virtual entities can be accessed by clients of cloud computing environment 250 on-demand. The virtual entities are controlled by one or more virtual machine monitors (VMMs) that can, for example, be implemented in hardware and software layer 360, virtualization layer 362, or management layer 364.

Management layer 364 provides various functions (e.g., resource provisioning, metering, security, user portal, lottery services level management, and SLA planning and fulfillment). The resource provisioning function provides dynamic procurement of computing resources and other resources that are utilized to perform tasks within the cloud computing environment. The metering and pricing function provides cost tracking (as resources are utilized within the cloud computing environment).

The security function provides identity verification for clients as well as protection for data and other resources. The user portal function provides access to the cloud computing environment for clients. The lottery services level management function provides cloud computing resource allocation and management such that required lottery services levels are met.

Workloads layer 366 provides examples of functionality for which the cloud computing environment can be utilized. In one embodiment the monitoring agent and the provisioning manager can be, for example, implemented in hardware and software layer 360, virtualization layer 362, or management layer 364 of cloud computing environment 250. The provisioning manager can, for example, take the form of a virtual machine monitor (VMM).

As non-limiting examples a time of day and a geographical location of clients, geographical origin of an item and the location of the item, and a subject matter and language of an item can be used as factors in determining resources required to lottery services clients.

Figure 12:
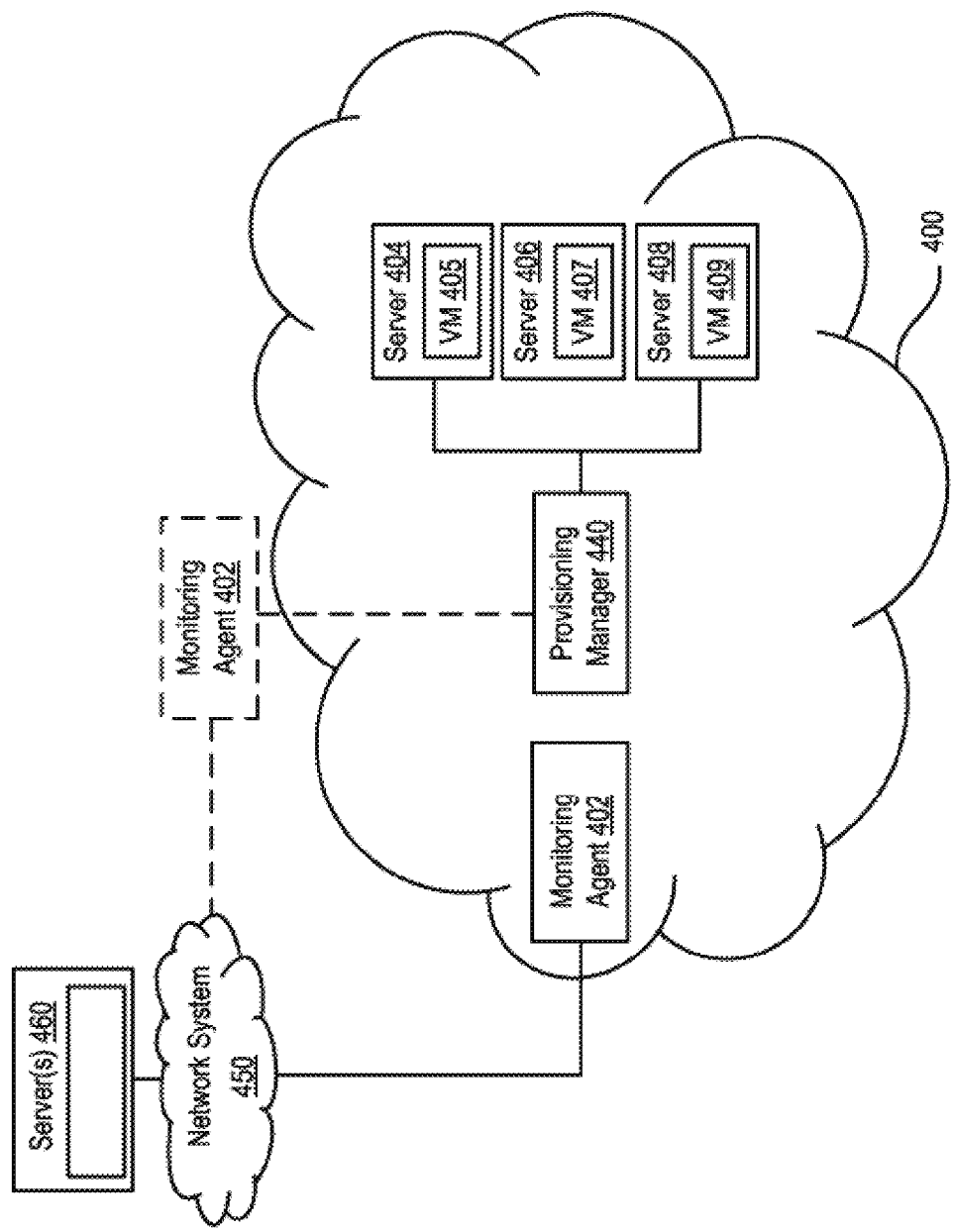
FIG. 12 is a diagram of a relevant portion of an exemplary cloud computing environment that includes a monitoring agent (executing on a data processing system) configured in accordance with various embodiments of the present embodiment to provision cloud computing environment resources.

In one embodiment, illustrated in FIG. 12, the cloud 400 includes a monitoring agent 402 for handling a plurality of clients via client devices including but not limited to client device 210. In one embodiment monitoring agent 402 is in communication (e.g., via provisioning manager 440) with servers 404, 406, and 408 located within cloud computing environment 400. As is illustrated, servers 404, 406, and 408 execute virtual machines (VMs) 405, 407, and 409, respectively. In one or more embodiments, VMs 405, 407, and 409 are configured to communicate with client devices.

As a non-limiting example \while only three servers 404, 406, and 408 are illustrated in cloud computing environment 400, it should be appreciated that more or less than three servers can be implemented within a cloud computing environment for single platform 10. In various embodiments, monitoring agent 402, provisioning manager 440, and servers 404, 406, and 408 execute on single platform 10 that can be configured in a similar manner as computer system/server 112 of FIG. 9.

Servers 404, 406, and 408 can be in different geographical locations or a same geographical location (e.g., within a same building or within different buildings in a same city). Similarly, monitoring agent 402 and provisioning manager 440 can be deployed in a same geographical location as servers 404, 406, and 408 or in a different geographical location.

Monitoring agent 402 is also configured to initiate allocation of resources associated with the second website to lottery services the anticipated flash crowd. As one example, when a hyperlink for the second website hits the front page of the first website, monitoring agent 402 can initiate creation of additional resources for the second website or notify provisioning manager 440.

Figure 13:
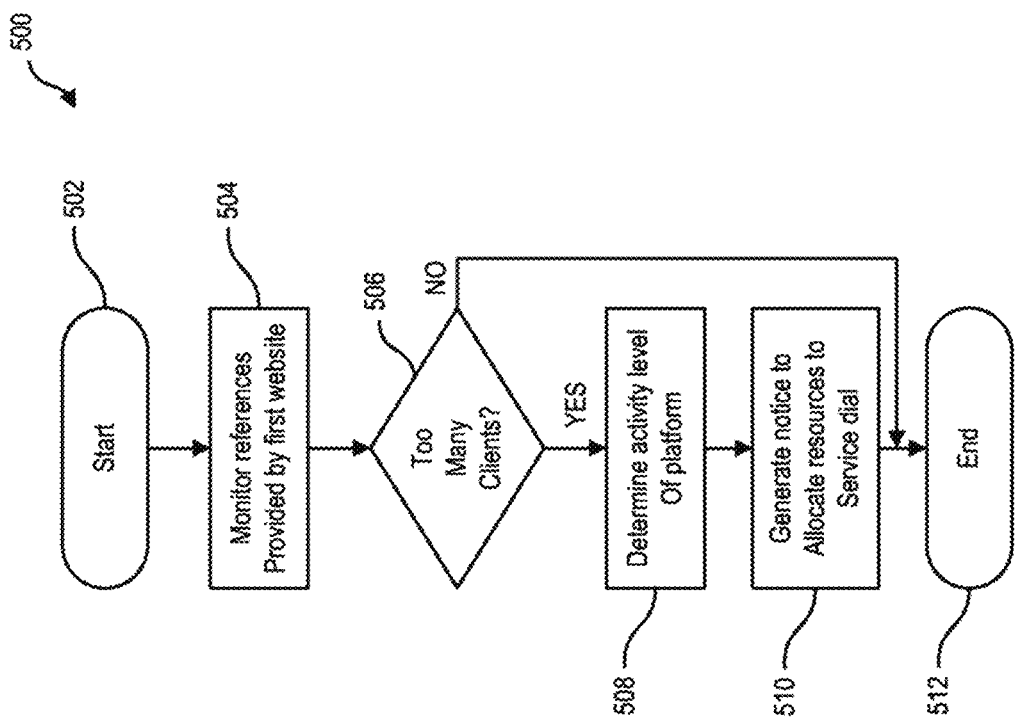
FIG. 13 is a flow chart for an exemplary process that implements techniques for provisioning cloud computing environment resources according to various embodiments of the present embodiment.

In one embodiment, illustrated in FIG. 13, a flow chart illustrates a computing environment resource provisioning process 500. (For ease of understanding, process 500 is described in conjunction with cloud computing environment 400 of FIG. 12 In various embodiments, process 500 is implemented by monitoring agent 402, which can execute on a data processing system that is located inside or outside of cloud 31 computing environment 400. Process 500 begins (e.g., in response to a request by a client at block 502, at which point control transfers to block 504. In block 504, monitoring agent 402 initiates monitoring references.

Next, in decision block 506, monitoring agent 402 determines the number of clients.

Depending on the level of activity via platform 10 in block 506, control transfers to block 512 where process 500 ends and control returns to a calling process. When a flash crowd is indicated in block 506, control transfers to block 508. In In one embodiment allocated additional resources can correspond to, for example, additional application instances, additional client instances, additional load balancing servers, additional content instances, and/or additional related content instances (e.g., deployed on one or more of servers 404, 406, and 408).

Next, in block 510, monitoring agent 402 generates a notice (to provisioning manager 440 which is responsible for allocating resources. In one embodiment provisioning manager 440 can allocate resources based on the recommendation provided by the monitoring agent 402 or can determine how many resources to allocate based on the activity level of single platform 10.

Figure 14:
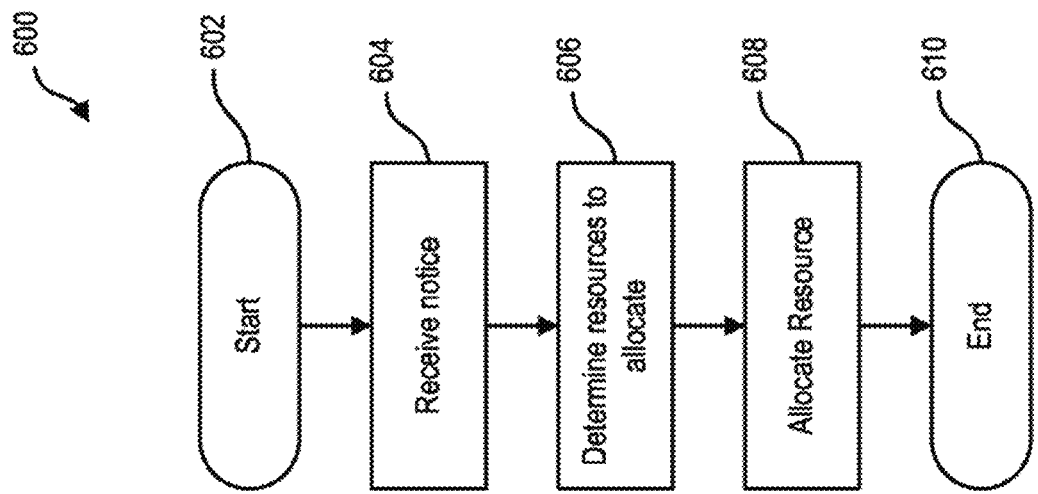
FIG. 14 is a flow chart for an exemplary process that implements techniques for provisioning cloud computing environment resources to other various embodiments of the present embodiment.

In one embodiment, illustrated in FIG. 14, a resource provisioning process 600 is depicted. For ease of understanding, process 600 is described in conjunction with cloud computing environment 400 of FIG. 12. In various embodiments, process 600 is implemented within provisioning manager 440, which can execute on a data processing system that is located inside or outside of cloud computing environment 400. Process 600 begins (e.g., in response to a monitoring lottery services request) at block 602, at which point control transfers to block 604. In block 604, provisioning manager 440 receives a notice (from monitoring agent 402) of single platform 10 activity.

Next, in block 606, provisioning manager 440 determines the number of additional resources to allocate if required. As noted above, the provisioning manager function can be implemented within monitoring agent 402 or within a server. In block 608, provisioning manager 440 allocates resources to lottery services the single platform 10. Following block 608, control transfers to block 610 where process 600 ends and control returns to a calling process.

In the flow chart above, the method depicted in FIGS. 13 and 14 can be embodied in a computer-readable medium containing computer-readable code such that a series of steps are performed when the computer-readable code is executed on a computing device. In some implementations, certain steps of the methods can be combined, performed simultaneously or in a different order, or perhaps omitted, without deviating from the spirit and scope of the invention. The method steps are described and illustrated in a particular sequence, use of a specific sequence of steps is not meant to imply any limitations on single platform 10.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to Network System.

Aspects of the single platform 10 are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
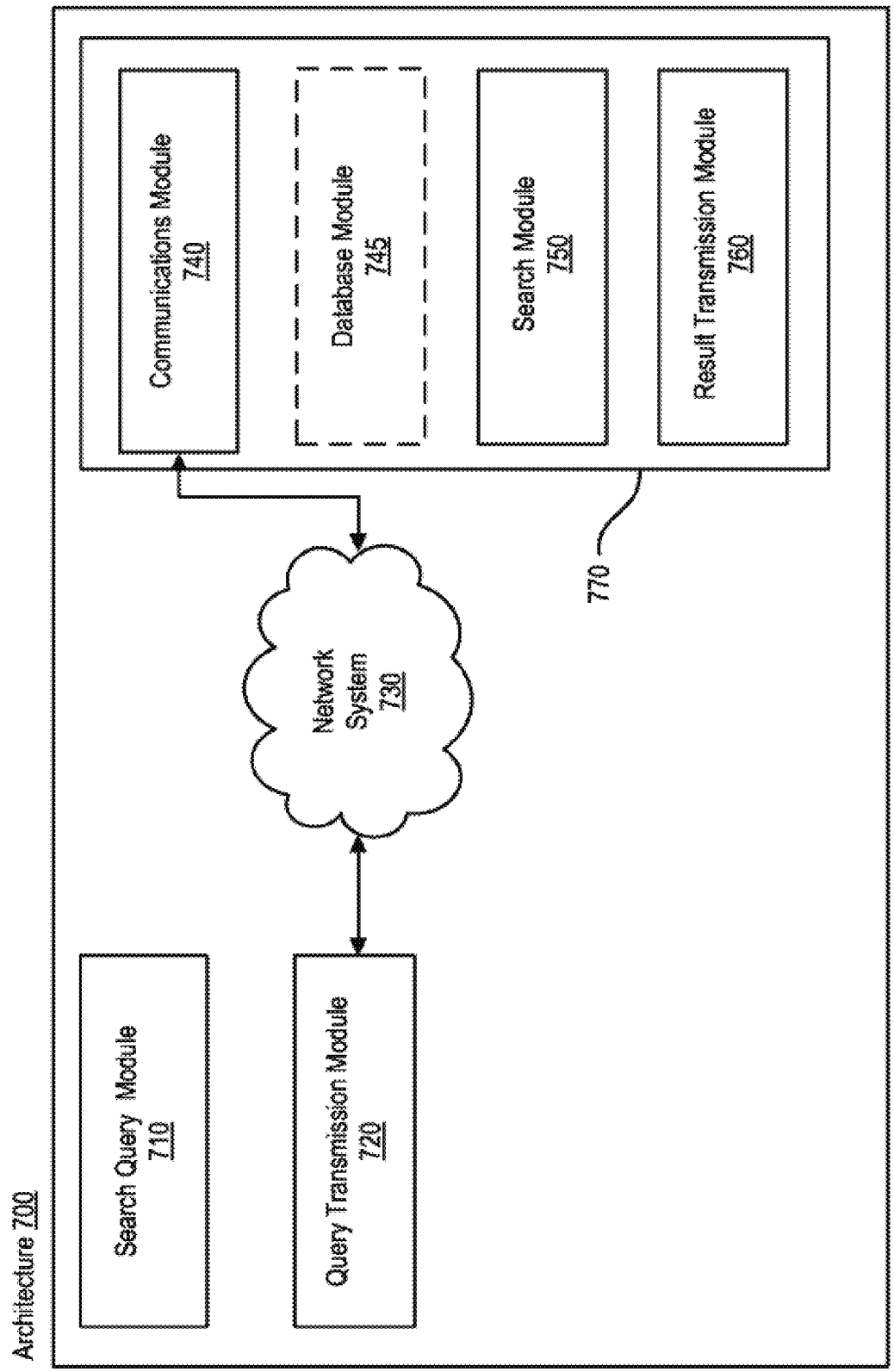
FIG. 15 is a block diagram of an exemplary system for searching one or more databases in accordance with various embodiments of the present invention.

FIG. 15 illustrates one embodiment of an architecture 700 that is utilized by single platform 10 to perform searching with a search server 770. The architecture 700 includes a search query module 710, a query transmission module 720, Network System 730, a communications module 740, a search module 750, and a result transmission module 760. Alternative embodiments can comprise more, less, or functionally equivalent modules. Although various modules can be configured to perform some or all of the various steps described herein, fewer or more modules can be provided and still fall within the scope of various embodiments.

The search query module 710 can receive a search query from client via single platform 10. A client can provide the search query via single platform 10 using the search module 750. Furthermore, the client receives search results provided by the search server 770 via the Network System 730 and single platform 10 after a search has been performed by search module 750.

The search query can include a client's request for information of a database on the search server 770. The search query can be received in any suitable form. As a non-limiting example a client using single platform 10 can furnish the search query or a portion of the search using a microphone of a client device, including but not limited to a client device 210, to capture sound data. Furthermore, a client using single platform 10 can use a camera or similar recording device of a client device, including but not limited to a client device 210 to include an image in the search query. The contents of the search query can include sound data, text, spoken words, image, other data, or any combination thereof. In some embodiments, the search query module 710 can provide one or more client interfaces on the client device to input the search query (e.g., a button on a display screen, or a plurality of buttons on the display screen, which can be used to specify a lottery services provider).

After the search query module 710 receives the search query, the search query can be provided to the query transmission module 720, which can transmit the search query to the communications module 740 via the Network System 730. The Network System 730 can be any suitable computer network or plurality of networks permitting communication between a lottery services provider and/or a client using single platform 10 and the search server 770. The network 730 can include any type and number of databases, servers, a client using single platform 10, computing devices, and policy engines.

In some embodiments, the query transmission module 720 can perform a step of dividing the search query into one or more query chunks. A query chunk can be a predetermined fragment or a portion of the search query. A query chunk can be of any size. For example, if the search query includes spoken words, the query chunks can include words or phrases from the words spoken by the client using single platform 10. In one embodiment if the search query includes text and sound data, then the text can be divided into a separate chunk from the sound data. Because the search query can include large amounts of data, dividing the search query into chunks can advantageously increase the speed at which the search request is received and processed in some embodiments. The increase in speed can be derived from reductions in transmission delay and the effects of Network System latency due to transmission of smaller query chunks instead of an entire search query.

The communications module 740, the database module 745, the search module 750 and the result transmission module 760 can be considered to constitute a search server 770. The communications module 740 can perform a step of receiving one or more databases from a lottery services provider (such as the step 810 of the method 800. The one or more databases can be stored on the search server 770, in the database module 745, for example, and can be transmitted to the search module 750 for processing as described below.

The communications module 740 can perform a step of receiving a search query (such as the step 330 of the method 300). The search query can then be transmitted to the search module 750 for purpose of performing a search, as described below.

The database module 745 can store the one or more databases received from the lottery services provider. The one or more databases can be stored prior to processing by the search module 750 and/or after the processing has taken place. If the database module 745 has not yet received a database from one or more lottery game providers then the database module cannot contain any databases. By storing one or more databases on the database module 745, and processing and searching of the one or more databases can advantageously are performed outside of the infrastructure of the lottery services provider.

The search module 750 can perform the steps of processing the one or more records of the database. In one embodiment, the search module 750 can optionally determine search parameters of the search query, although in other embodiments the search parameters can be received with the search query by the communications module 740. The search module 750 can also perform the step of determining one or more search results in the processed database (such as the step 340 of the method 300 described below in relation to FIG. 3). The aforementioned steps can be performed by separate modules, or by the same module (as shown in FIG. 15) according to various embodiments.

The result transmission module 760 can perform a step of transmitting one or more search results for display to a client using single platform 10 via the Network System 730 (such as the step 850 of the method 800 described below in relation to FIG. 16). The search results can be transmitted to a lottery services provider and relayed to a client using single platform 10 for display. The search results can alternatively be transmitted to a client using single platform 10 for display directly on the client device. It will be appreciated by one skilled in the art that the system in FIG. 15 can be merged with or used in conjunction with any of the other exemplary systems described herein.

Figure 16:
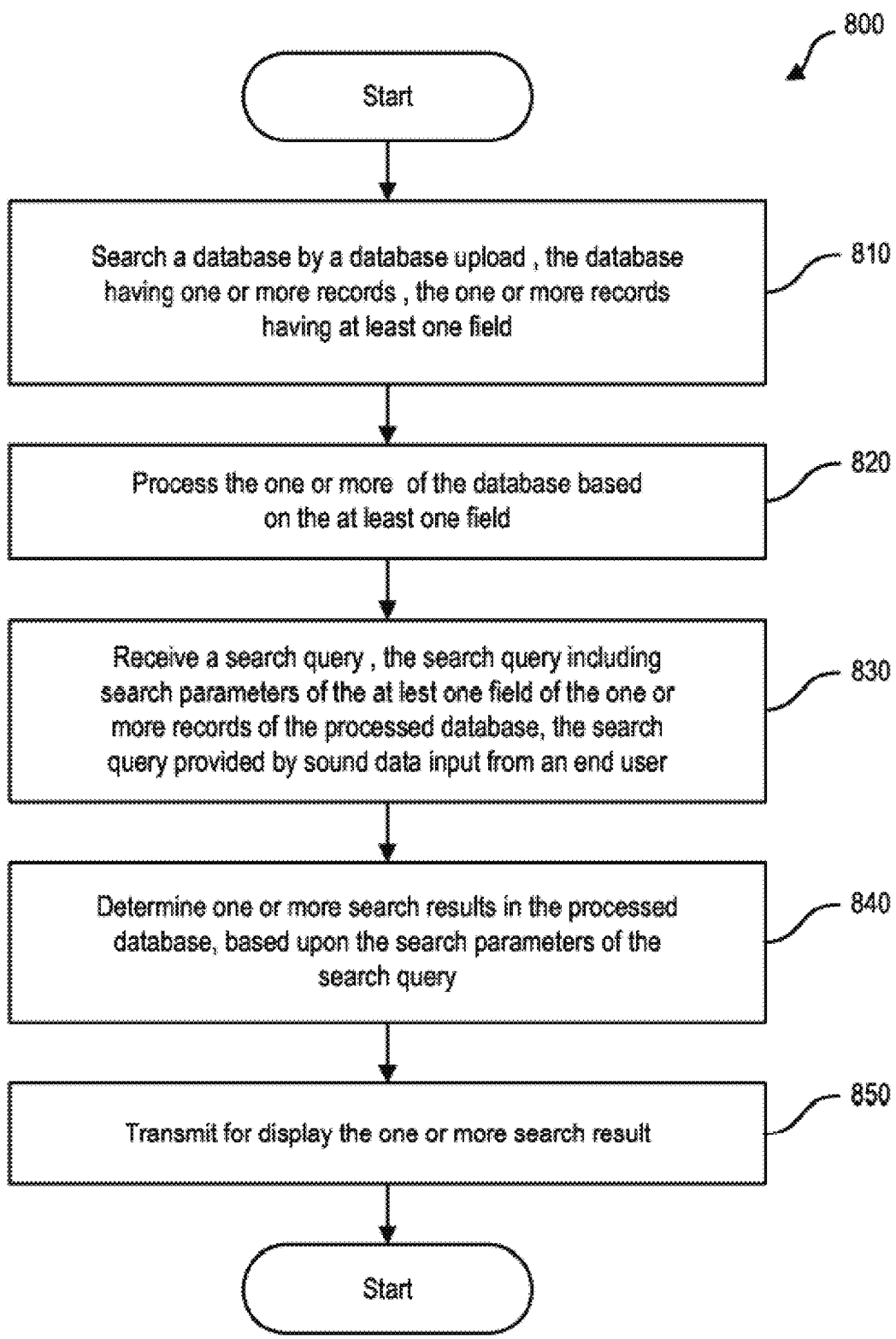
FIG. 16 is a block diagram of an exemplary system for searching one or more databases in accordance with various embodiments of the present invention.

FIG. 16 is a flowchart of one embodiment of a method 800 for searching a database. At step 810 of the method 800, one or more databases can be received from a lottery services provider by a database upload via Network System, where the database has one or more records and the one or more records include at least one field. When the lottery services provider provides a web lottery services, for example, a record can correspond to one or more web pages that include Internet content. In exemplary embodiments, the at least one field can include content associated with the one or more web pages, such as text that appears on the one or more pages, as well as images and other audiovisual content associated with the one or more web pages.

In certain embodiments, a record can have fields that include at least one of a destination web address field, a record description field, a record image field, and a record rich content field, or any combination thereof. The destination web address field can provide a location of the web page. The record description field can include a brief description of the Internet content associated with the web page. The record image field can include one or more images located on the web page or associated with the web page. The record rich content field can include any suitable audiovisual content associated with the web page, including, but not limited to, sound data, video data, image data, visual effects, and the like.

The record rich content field can be populated with data that can be presented when the web page is accessed, or can be presented when the record is a part of a search result. Each field can be populated as desired by the lottery services provider, thereby giving the lottery services provider the ability to control what records in the database are provided in response to a search query while utilizing the cloud computing network. Furthermore, by providing rich content in a field associated with a record in the database, the lottery services provider can affect how search results are presented or otherwise rendered on a client device.

In an optional step of the method 800, account information can be received from the lottery services provider. The account information can include authentication information, billing information and contact information. The account information can be received to create an account on the search server 180, thereby allowing the lottery services provider to utilize the search functionality described herein. Authentication information can include a name and password that provide the lottery services provider the ability to access the appropriate account.

Billing information and contact information for the lottery services provider can be provided as well, to facilitate receiving compensation in exchange for the search functionality or search results provided by the search server 710. Further details regarding compensation and/or sales revenue related to search functionality or search results are provided later herein.

Having an account on the search server 710 can allow a lottery services provider to submit one or more customized databases to search server 710, and make changes to such databases when desired by the search provider. Data can be received from the lottery services provider to add, delete, or otherwise modify the one or more records in the database, thereby providing the lottery services provider with flexibility in managing and editing the database even after the database has been received, such as by a search server. This modification can also be automated using an authenticated script in some embodiments.

At step 820 of the method 800, the one or more records of the database can be processed based on the at least one field. The processing of the database provides information regarding one or more fields that can allow the search server to compare the information for each record to search parameters of the search query. According to various embodiments, the search server can determine if there is a match, relevancy, relatedness, association or a certain type of relationship between a record and the search parameters of the search query, thereby warranting the inclusion of the record in a listing of search results returned to a client using single platform 10.

As a non-limiting example when the search query includes sound data, processing the database based on the at least one field can further include processing the database to produce a phonetic data for each of the one or more records of the database. The phonetic data can include variations of spoken forms of text data in the at least one field. In exemplary embodiments, the database can be processed to produce phonetic data as described in U.S. Patent Application Publication No. 2010/0121643, filed on Nov. 2, 2009, entitled "Melodis Crystal Decoder Method and Device" to Keyvan Mohajer et al., which is hereby incorporated by reference in its entirety. In such embodiments, the lottery services providers can receive the benefit of a speech recognition search engine without having to develop the necessary technology and infrastructure independently.

In one embodiment when the search parameters include text data, processing the database can include identifying keywords from the one or more fields. Furthermore, when the search parameters include image data, processing the database can include scanning one or more fields containing record image data to identify facets of the record image data for comparison with the search parameters relative to lottery games.

In an optional step, the processed database can be stored, on a search server. Such an embodiment can be advantageous because the search server will not be required to reprocess the database each time a search query is received, thereby potentially saving time and providing a quicker response to the search originator.

At step 830 of the method 800, a search query can be received via the Network System, where the search query includes search parameters of the at least one field of the one or more records of the processed database. Furthermore, the search query can be provided by sound data input from the client. The search parameters can be facets or features of the search query. Such facets can be compared to the standardized information produced for each record when the database is processed to determine relevance of a record in the database. Search parameters relative to lottery games can include a portion of the search query or the entirety of the search query (e.g., when the search query is text, the search parameters can be words or combinations of words within the search query). Search parameters can also be derived from the search query in some embodiments. For example, when the search query includes sound data, the search parameters can include phonetic facets of the sound data, either in numeric or graphical form.

At step 840 of the method 800, one or more search results can be determined in the processed database, based upon the search parameters of the search query. The determining one or more search results in the processed database can be performed by matching the search parameters with the at least one field of the one or more records of the database, for example, or by comparing the search parameters to the information produced when the one or more databases are processed. Search results can be identified by determining which records include information that most closely resembles the search parameters. The matching can be based on similarity between the search parameters and the one or more fields. In various exemplary embodiments of the technology, search parameters can be compared against the information produced when the one or more databases are processed to identify records that are relevant, related, associated or have a certain type of relationship to that of the search parameters.

In certain embodiments, when the search parameters are compared with the information for a record in the database relative to one or more lottery games, a score can be assigned to the record based upon how similar the information is to the search parameters. The search results can then include records having the greatest degree of similarity to the search parameters (i.e., records with a similarity score that is highest or lowest, depending on how the scoring is performed).

As a non-limiting example if the processed database includes phonetic data for each record, the matching can be performed by comparing the search parameters (e.g., phonetic facets of the sound data) of the search query with the phonetic data for each record to determine matches that fall within a predetermined tolerance. If the matching record has greater than the predetermined tolerance of similarity to the search query, then the matching record can be included within the search results.

In various embodiments, the search query can also include a command. The method can further include the optional step of performing a search action of the database based upon the command. The command can provide a way for a client to further customize and/or narrow search results. The command can take the same form as the search query (e.g., spoken words, text, etc.), or can take a different form. For example, the command can include restricting the search results to the ten most similar records in the one or more databases, or can include restricting search results to a specific geographic location. The search server can recognize the command as an additional search parameter, and implement the command by performing the specified action in various exemplary embodiments.

At step 850 of the method 800, the one or more search results relative to lottery games can be transmitted for display to a client using single platform 10 via the Network System. As stated hereinabove, the one or more search results can be transmitted to the lottery services provider, or can be provided to a client using single platform 10 on a client device. The search results can be provided in a list form, or any other suitable form, and can be rendered together or one-by-one on a display for a client using single platform 10. Also, the fields of the records included within the search results can also be transmitted for display to a client using single platform 10. For example, search results can include thumbnail images for each record displayed, where the thumbnail images are stored in a field in the database for each record.

Various methods can be utilized to organize the one or more search results for when the search results are displayed to a client using single platform 10. For example, the at least one field for each record can include ranking priority. The ranking priority can be assigned by the lottery services provider, and can be based on a desired search result order. The one or more search results can then be organized based upon the ranking priority.

In one embodiment ranking priority can be advantageous because the lottery services provider can then be able to present search results in a desired order by merely providing a ranking priority in the one or more databases to be searched. For example, if the database includes names of actors as records, it is likely that multiple actors can have the same name. By using a ranking priority field, the lottery services provider can indicate that more popular actors having a given name is provided to a client before lesser known actors having the same name. By assigning the highest ranking priority to the most popular actor, the lottery services provider can affect the search results while utilizing the cloud computing network for searching the one or more databases.

In one embodiment method 800 allows lottery game providers to utilize the cloud computing network to provide search functionality for one or more databases. That is, the technology allows for the delivery of search and monetization functionalities to lottery services providers, including software developers. To facilitate utilization of the search server, application programming interfaces ("APIs") and software development kits ("SDKs") can be provided to lottery services providers. Furthermore, by allowing lottery services providers to index and organize the one or more databases in the computing cloud, the method 800 can provide search functionality without having to create an index to the one or more databases independently. Furthermore, in exemplary embodiments, by allowing lottery services providers to index their data in the exemplary cloud systems presented herein and by utilizing this technology to search by voice, database search results will be transmitted faster and more accurately than a conventional two-step process of voice to text conversion followed by a text search.

In addition to providing search functionality for databases provided by lottery services providers, a search server (such as the exemplary search server described herein) can provide standalone search engine capability. To do so, the databases that are accessible by the search server and the information produced when the one or more databases (or indices) are processed can be aggregated to produce an aggregated processed database. A client can then use a search engine client interface to provide a search query to the aggregated processed database. The search engine client interface can use any suitable interface. In various embodiments of the present technology, the search engine client interface can be actuated using a single button in various embodiments. As a result of client input via a search engine client interface, the aggregated processed database can be searched and search results can be transmitted for display to a client using single platform 10. One exemplary method for searching the aggregated proceeded database is provided herein in the method 800.

FIG. 9 is a flowchart of one embodiment of a method 900 for providing search results. At step 910 of the method 900, a search query can be received via Network System and single platform 10k. The search query can include one or more query chunks, as described above, and the search query can be provided by sound data input from a client using single platform 10. The search query can be divided into query chunks before being received by the search server in some embodiments (e.g., the search query can be divided by the client, and/or by the lottery game provider). However, the search query can also be divided into chunks by the search server when received, and the present technology is not limited in this regard. In one embodiment the query chunks can be sent over a two-way connection between the search server and the search originator. Such a two-way connection can be advantageous because the search query can be sent to the search server in one or more query chunks in real time as the search query is collected from a client using single platform 10.

The one or more query chunks can include at least one field of the one or more records of a processed database, where the database can be processed as described above. In one embodiment by including at least one field the search process can be expedited. As a non-limiting example, text data from the search query can be transmitted in a query chunk before chunks related to sound and/or image content, which can allow the search server to process and return results for the text data portions of the search query before or while the sound and/or image content are being received and/or compared to records in the database. Such embodiments can increase search speed and enhance a client using single platform 10 experience by reducing the effects of Network System latency and transmission delay.

In one embodiment when the search query includes sound and/or image data, dividing the search query into query chunks can further expedite the search process. The query chunks can be of substantially equal size, or can be of varying sizes depending upon the requirements and preferences of the search provider. Dividing the search query into chunks can allow the search server to process received query chunks and provide search results without having to wait for the entire search query to be received. Such embodiments can enhance a client using single platform 10's search experience, particularly when the search query includes large amounts of sound and/or image data.

Figure 17:
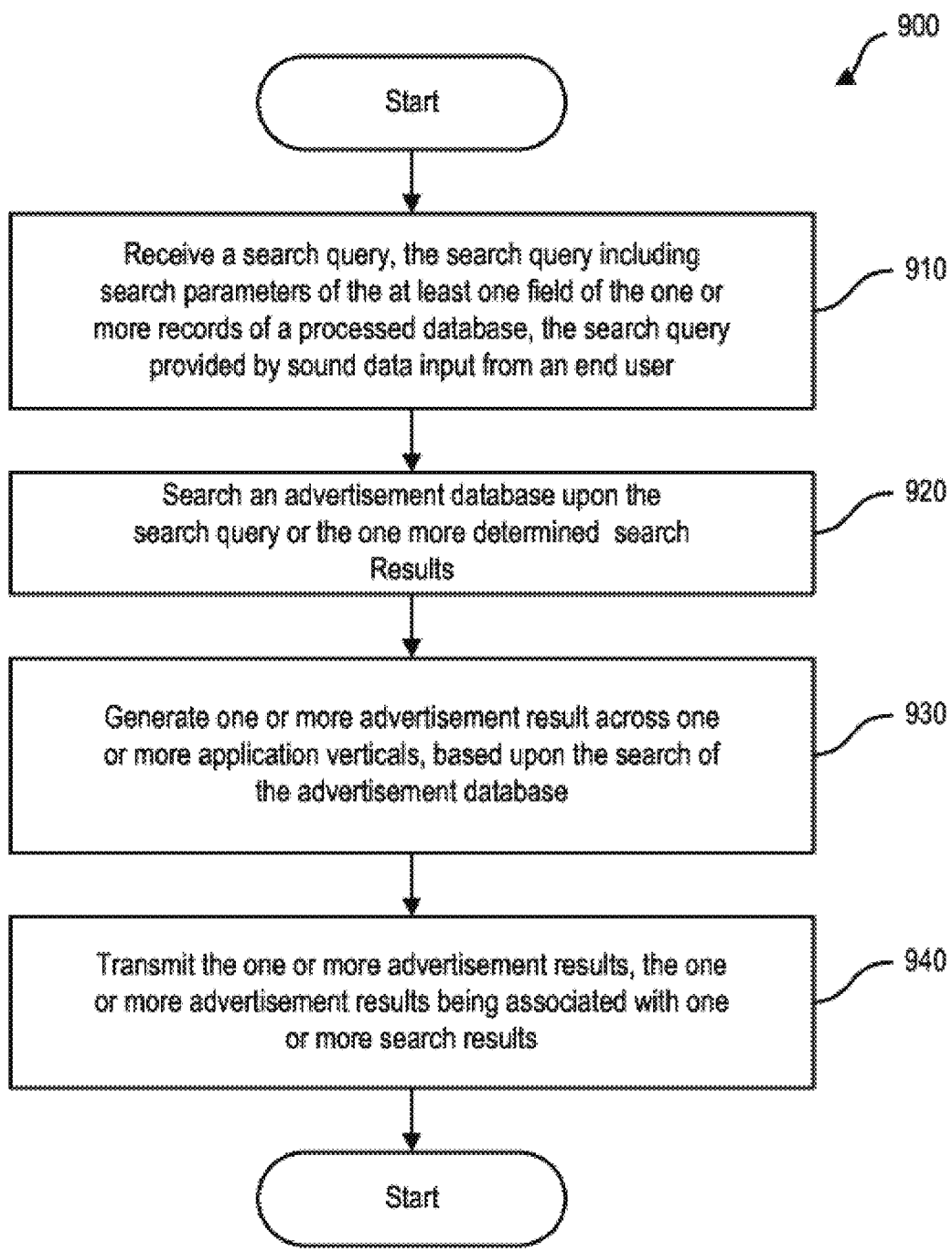
FIG. 17 is a flow chart of an exemplary method for searching a database in accordance with various embodiments of the present invention.

In FIG. 17 at step 920 of the one method embodiment 900, the one or more search results can be determined in the processed database, based upon the one or more query chunks of the search query. The one or more search results can be determined using received query chunks, which as described above can lead to increased search efficiency since the search server does not need to wait until the entire search query has been received before determining search results.

Search parameters can be derived and/or extracted from the query chunks and compared to information from records in the processed database.

As described above, search results can be determined based upon the search parameters of the query chunks. In various embodiments, the search results can be refined as subsequent query chunks are received by the search server. For example, a list of search results can be determined using a first query chunk. The list of search results can be reordered when a second query chunk is received by searching the search results using search parameters from the second query chunk. Such an embodiment can provide a search result list more efficiently by not requiring searching the entire database using each query chunk.

At step 930 of the method 900, one or more fields of the one or search results can be selectively transmitted for display in real time to a client using single platform 10 via Network System. Each field of a record can include a different type of data, such as text data, sound data, and rich content, as described above. The selective transmission of one or more fields can take place by, for example, selecting fields that are relatively smaller in size compared to other fields. By selectively transmitting one or more fields of records within the search results, the search server can transmit fields containing data that is relatively smaller in size compared to data in additional fields. Fields containing relatively smaller data, such as text data, can be transmitted across the Network System more efficiently than if data in additional fields were transmitted. By providing search results more rapidly, the client search experience can be enhanced.

As a non-limiting example the selectively transmitted field or fields of the one or more search results can include text, which can provide a client with search results more rapidly than if the client were required to wait for additional fields (such as image and sound data) to be loaded before receiving the search results on a display. The one or more search results can be organized in a search result list, which can be presented to a client using single platform 10 so that a client using single platform 10 can have multiple results to select from. Each of the one or more search results can be rendered to a client using single platform 10 one by one, to further expedite the receiving of search results, rather than waiting for all search results to be received before rendering to the client via a client device such as a mobile device.

At step 940 of the method 900, one or more additional fields of the one or more search results can be selectively transmitted for display in real time to a client using single platform 10. The additional field or fields of the one or more search results can include one or more images, and/or rich content in various embodiments. The additional fields can enhance the search experience by providing audiovisual content that stimulates the client and makes the search experience more rewarding.

Rich content can be used to enhance the presentation of the search results and/or search result list. Rich content can be provided for each record by the lottery game provider, or can automatically be provided by the search server. Examples of rich content can include sound and/or visual effects, images, animation, video content or any combination thereof. There are numerous ways that the rich content can be used to enhance the client experience. For example, search results can be presented with audio brackets that cause sound effects to be played when actuated by a client. Sound effects can be utilized while loading rich content and/or loading a list of search results. The rich content can also be used to assist in the presentation of search results, by using a transparent overlay, or by using futuristic graphics and/or graphical effects to accompany the presentation of one or more records within the search results. For some client devices (such as the iPad), convenient applications or applets can be presented on a first portion of the display (such as the left hand side of the display), while a list of search results can be presented on a second portion of the display (such as the right hand side of the display).

The rich content of the one or more search results can be transmitted and/or downloaded in the background (such that the rich content is not displayed to a client using single platform 10), while the selectively transmitted field or fields of the one or more search results are displayed to a client using single platform 10, thereby allowing a client using single platform 10 to view the search results while the rich content is being loaded. Additional rich content, such as video animations can be played for a client using single platform 10 while search results and/or the rich content are being loaded to further entertain and engage a client using single platform 10. After the selectively transmitted field or fields of the one or more search results has been displayed to a client using single platform 10, the rich content of the one or more search results can then be displayed to a client using single platform 10.

Figure 18:
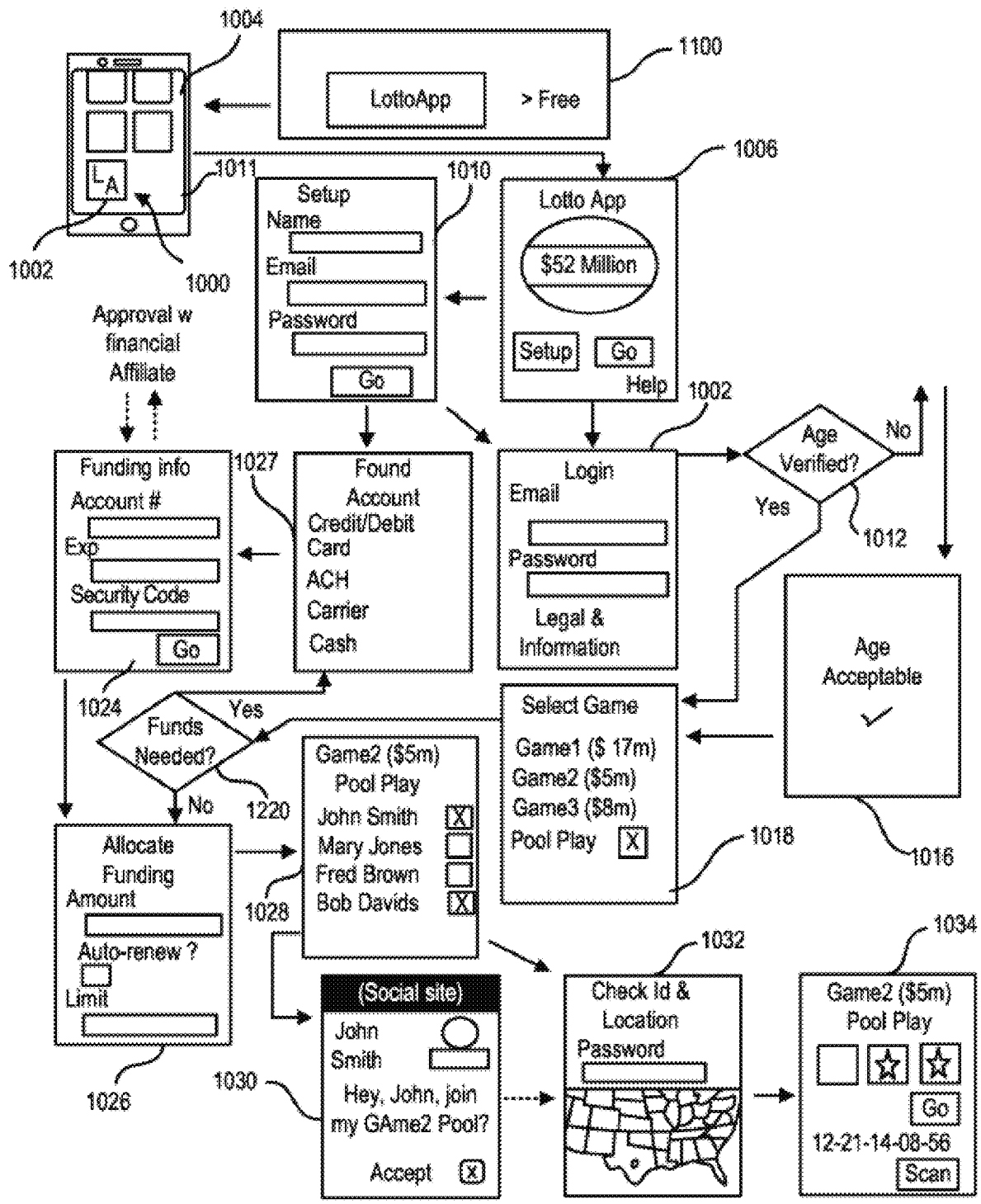
FIG. 18 is a flow chart of an exemplary method for providing search results in accordance with various embodiments of the present invention.
Figure 19:
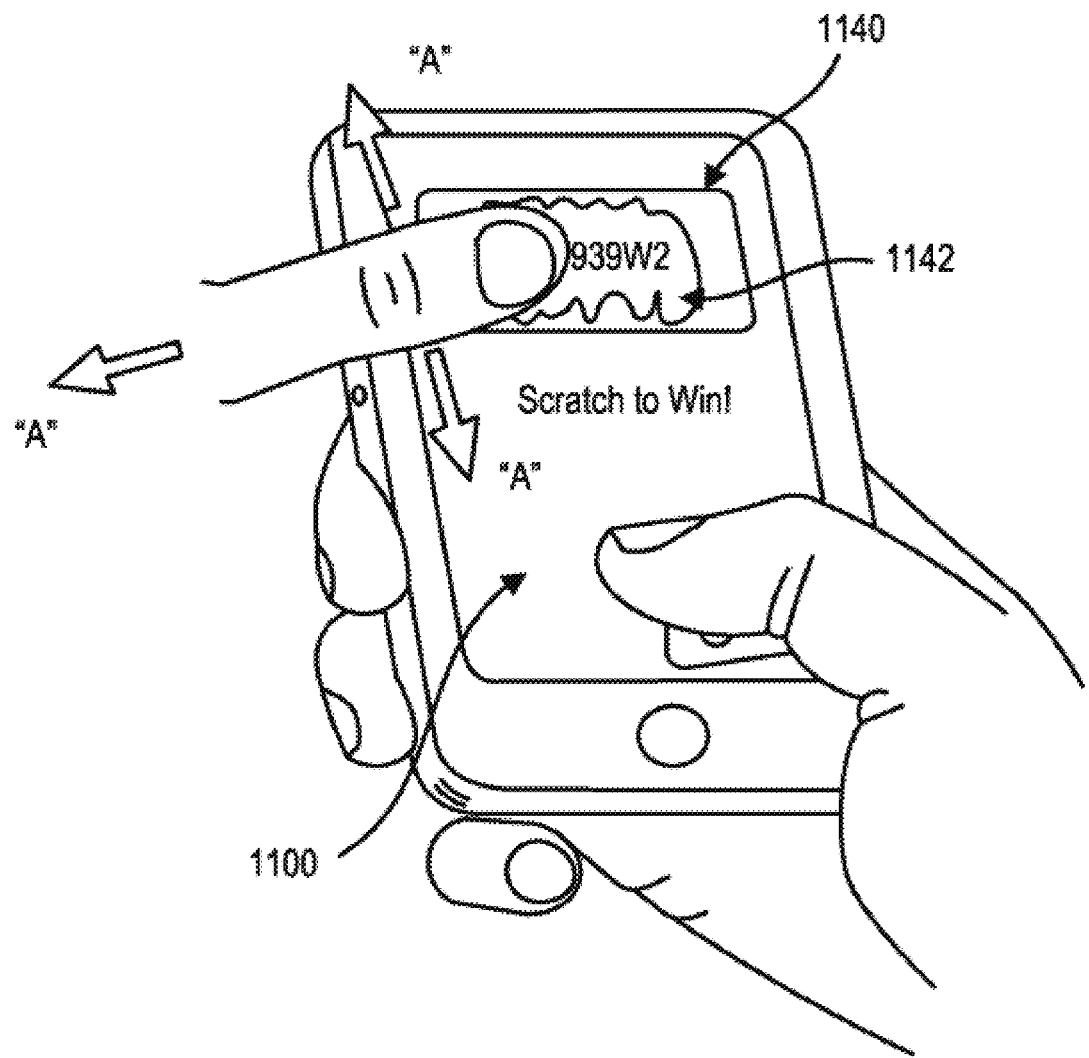
FIG. 19 is a flow chart of an exemplary method for providing advertising in accordance with various embodiments of the present invention.

Referring now to FIG. 18, in one embodiment one or more servers of the single platform 10 include an application 1000 configured to be in communication with the client's device 210, commuting device, and the like. Application 1000 can be used to collect data relating to the client and selected lottery games. Information pertaining to client transfer of funds, and payment to the client from the single platform 10 to communicate information to entities associated with lottery games, and to confirm compliance with lottery game playing with different jurisdictions, including but not limited to: client age verification, geolocation of the client.

In one embodiment the application 1000 is used with a client account.

In one embodiment, pooled winnings are distributed to clients in the pool, for example using a pro rata distribution or any other distribution agreed to by the clients.

Alternatively, a player may invite pool game clients by providing an email address for the invitee. Application 1000 may then cause an email to be sent to the invitee containing a link that when clicked, begins a download and installation of application 1000, if it's not already installed. The relevant pool game is advantageously presented after an account and funding are established, and possibly after age and or geographical location are also established, as required within the applicable jurisdiction.

Advantages of the pool include simplified management, a clear payment arrangement, facilitated payment, and the reduction of disputes relating to any of the foregoing.

While a login screen at 1008 is shown, an authentication may be accomplished, if required, by other methods, including as examples a fingerprint scanner, or a connected hardware security device. Once a client is authenticated, it may be a requirement of the jurisdiction that the client's age is established, at least once, before the client's first lottery game play, and possibly at other times. In one embodiment application 1000 determines if the client's age needs to be verified (screen 1012). In one embodiment a camera, integrated within computing device 100 or attached to it, is used in screen 1012 to photograph a 2D bar code or other recognizable indicia appearing upon a client's identification card. If the ID card is a U.S. driver's license, a barcode is provided upon the back of the ID containing information pertaining to the driver's birth date. Before capturing such information, the client can be prompted to approve use of the information to be captured.

Software associated with application 1000, or provided by the client's device or third party software, may be used to interpret the bar code or other indicia (e.g. a printed birthdate) to extract the client's birth date for the use of application 1000. In one embodiment the client is advised by application 1000 to align the barcode within guide lines displayed upon the screen, at which point the client may activate the electronic shutter by pressing a button or speaking a command, for example, or application 1000 may sense that a barcode is within a designated frame by analyzing the view within the frame, and may trigger the electronic shutter automatically to capture an image of the barcode.

In one embodiment, a data query algorithm, executing as part of application 1000 or an associated server, is used to determine an age of the client. The algorithm prompts the client with one or more questions, in order to obtain information which may be used in a subsequent process to determine or verify a minimum age. As a non-limiting example personal identifiers such as a social security number (including a portion of the social security number), address, or driver's license number may be compared against semi-public or otherwise accessible records. These identifiers, including other qualifiers such as an IP address of the client device may be used to determine an approximation of identity, including age, as well as to generate an estimate of an approximate current location.

If the data query algorithm indicates that the client falls within an acceptable range for verification, access is granted and the client can play the lottery game or, for example, purchase a lottery ticket using application 1000. If the data falls outside of the acceptable range, additional questions may be asked, or access to the game may be denied. Some of these questions may be used subsequently to verify that a current client is the same as the age authenticated client. Examples may include questions such as "What is your mother's maiden name?", or other questions that only the client, or a small number of people, might know. If the data continues to fall outside of this range, the client is prevented from playing the game or purchasing a lottery or gaming ticket. Identifying information may be passed to a third party vendor who provides age or identification validation, typically using an API of the vendor, and advantageously using a secure protocol.

Once the birth date is established, application 1000 compares the date with a minimum age for gaming within the one or more jurisdictions for which application 1000 supports gaming, typically at least 18 years of age. If the age is sufficient, the client may be notified (screen 1016). Application 1000 may also match information provided by indicia on the card with information provided during a setup stage (1010), ascertaining that the ID corresponds to the client. Other aspects of the ID may be examined by application 1000 to determine that the ID is authentic and valid. Application 1000 may also use one or more communication protocols of client device to contact an issuer of the ID to validate information obtained from the ID.

In one embodiment information from the ID, including an age validation state of the client may be stored on the client device, or in a database associated with the application for storing data pertaining to all clients preferably in the cloud. In this manner, it may be determined that a client has already validated their age, or it may be determined if an ID has been misused to enable unlawful play by others.

In screen 1018, a client may select a lottery game to play, if more than one lottery game is available. In the example shown, several lottery games are illustrated, together with additional information pertaining to each lottery game, including a winning payout for each. A client may select the lottery game to be played by, for example, clicking, tapping, or otherwise submitting a gesture to device 100, indicative of the desired lottery game. The example shown additionally provides a "Pool Play" option which may be selected, together with the desired lottery game. Pool play, or any designation representing such an option, indicates that one or more additional clients may play the lottery game together with the client. In one embodiment, each of those other clients are using application 1000, and each have each undergone setup and authentication steps, as described herein. In another embodiment, the other clients have authenticated in some other way, for example in person at a gaming facility or kiosk.

Once a lottery game has been selected, application 1000 determines if funds are available 1020 or allocated to the client for the selected lottery game. It should be understood, however, that a checking of funds may be undertaken by application 1000 at any point, for example when setting up an account. However, it is advantageous to check for funds after selecting a lottery game, because once a lottery game is selected, additional information is known regarding an amount that may be necessary for play. If additional funds are needed, a manner of providing funds is selected in screen 1022. Four methods are indicated, credit card or debit card, ACH automatic bank account withdrawal, a charge to the client's phone carrier account, or a submission of cash, e.g. to an authorized agent at a retail location. Other mechanisms for payment are possible, including for example lottery services such as PayPal (a trademark of PayPal, Inc., San Jose, CA), wire transfer lottery services, or a third party account. Application 1000, in one embodiment, only enables funding methods which are acceptable to the gaming host, or which are permissible by the applicable legal jurisdiction, which may exclude, for example, the use of credit cards. If credit cards are permitted, the client would enter their billing address, card number, expiration date, and CVV2 number, for example. For the ACH method, it may be advantageous for application 1000 or a server associated with application 1000 to carry out a token small transaction to verify an account. For example, one or two small deposits of a random amount less than one dollar may be deposited into a client's account, and the client may then be required to check their account and report the amounts of the deposits using application 1000. If the random values match, the registration process may be completed, and the client may thereafter begin funding their account in application 1000 using the ACH account thus established.

In one embodiment a POS is used and a client specifies an amount of funds desired to be allocated to their account, and in response, application 1000 generates a barcode, advantageously encoded for security. The client then visits a designated point of sale (POS) location, for example an authorized Lotto vendor location, and displays the barcode thus generated upon display 1004 of device 100. The barcode is scanned by a computer system at the POS location, and information is transmitted by and between a computer system associated with management of application 1000 and the POS vendor, including identification of the client and the desired funding requested. The POS vendor is advised by the managing system regarding an amount to collect from the client, corresponding to the desired allocation, plus fees if applicable. At this point, funds are made available to the client within application 1000, for play. Where the client paid with a credit card or other payment method besides cash, there may be a delay pending payment confirmation before funds are available for play.

Similarly, once a client has won a lottery game associated with a cash award, a barcode may be generated by application 1000 upon display 1004 of the client's device 210, and this barcode may be read by a POS vendor. Again, communication between the POS vendor and the managing system takes place, whereupon the POS vendor may be authorized to pay the client the appropriate cash award in person.

Once a manner of payment is selected, information is entered in screen 1024, as required by the authority providing the selected lottery services, or the client may be temporarily redirected to an application of the selected lottery services, to carry out authorization and or funds transfer to an account associated with application 1000 (screen 1026). Depending on the lottery game selected, all or a portion of the funds transferred may be retained by an entity providing application 1000, and some or all of the funds may be provided to an entity sponsoring or hosting the selected lottery game. In one embodiment if funds are allocated to application 1000, generally, an "auto-renew" option may be provided, to ensure there are funds available to application 1000, as needed for selected play. Overall limits may additionally be selected, to prevent inadvertent excesses.

In one embodiment if pool lay, or group participation, is selected in screen 1018, client game clients may then be selected (screen 1028). A choice of client game clients may be provided based upon a contact list of a client's, for example from a mail application or contact database accessible to the client's device based upon authorization by the client. In one embodiment, the game clients are selected from the client's online social network account.

In one embodiment, when a client accepts an invitation to a Pool, the social network communicates the acceptance to application 1000, for example to a server hosting application 1000, whereby a corresponding lottery game is initiated for the accepting game client. Application 1000 may then advantageously present a notice to the accepting game client, for example by email, or a notification on device 100, that a corresponding lottery game has been initiated in application 1000 on the accepting game client's device 100. Similar notices may be provided to the initiator of the Pool Play lottery game, and or to other acceptors of the lottery game. In one embodiment, each acceptor may make selections relating to the Pool lottery game, for example to pick a team, number, or other designation, select one or more playing card representations or participate in some other manner, for example by playing a lottery game, or rolling representative dice. The collective pool of game clients may play again against each other, or may collectively play on a team against another individual or pool. Results may be communicated by the social networking site in addition to or instead of by application 1000.

Winnings, either in a Pool lottery game or individual lottery game, may be distributed using by allocating real or representative funds to the game client's fund within application 1000, by mailing of a check, or by distribution to a designated bank or credit account. Similarly, losses may be deducted from the client's application 1000 account, or may be deducted from a bank or credit account, for example the account established during setup. In one embodiment, winnings are distributed differently than funds are allocated to play the lottery game.

Once all game clients have been designated, or the lottery game is otherwise ready to be played, or at any point prior to playing the lottery game, a client's geographic location at the commencement of the lottery game is determined (screen 1032), if required by law, or the rules of the lottery game. To carry out a location verification. (or "geolocation"), the client may be prompted to enable or permit activation of a GPS or Geolocation function for application 1000 within device 100, if such is required by the operating system of the device. Alternatively other means of determining a geographic location may be carried out by device 100, as described elsewhere herein. In one embodiment, it is not possible to allocate funds to a lottery game unless the client is within the prescribed geographic location.

Once the GPS or geolocating method is activated, and the client has agreed to share his location, the geolocation technology is used to detect the physical location of device 100. A geolocation lottery services, for example the GOOGLE Maps API, is advantageously used to obtain geographic information pertaining to a coordinate location provided by the geolocating technology within device 100. This information, or the geolocating lottery services, thus enables application 1000 or a server to which application 1000 is connected, to determine if the client is within the prescribed geographic boundaries for playing the selected lottery game. In this manner, for example, application 1000 or its associated server determine compliance with prescribed limits, without a requirement for approval from the gaming host, which may be a governmental or quasi-governmental agency. In another embodiment, the coordinates obtained from the geolocating hardware or software is provided to the gaming host for approval.

In instances where it is determined that a client is outside of an acceptable geographic location, it may still be possible for the client to engage in certain activities, such as providing funding, selecting lottery games, inviting other clients to participate, view winning numbers or values, receive updated jackpot or winning information, play free lottery games, or play second chance lottery games. Upon successful login, for 51 example, a client might check a prize amount for a lottery game, or look up a draw date, for example, so long as such activities are permitted by the gaming authority when the client is outside of the permissible or prescribed geographical location.

In accordance with a further embodiment of the embodiment, a client is notified once the client has moved into the prescribed geographic region. In this manner, a client travelling to the acceptable region can stop travelling at the earliest opportunity. Such notification may be presented in the form of an SMS or other text message, an Email, a pop-up notification, or any other method enabled by device 100. In an additional embodiment, a map or instructions may be displayed upon a screen of device 100, either as requested by the client, or when the client travels within a predetermined distance from the prescribed geographic region. The map or instructions advantageously illustrate a shortest or most convenient route from outside the prescribed region into the region, wherein participation in gaming using application 1000 is permitted. If the client is in a car or vehicle, the client receives driving directions, estimated travel time and distance from the state border. If the client is on foot, walking directions, estimated travel time and distance from a border or boundary of the prescribed region is provided, including for example step-by-step or turn-by-turn directions.

Once funding and an acceptable location have been established, lottery game play may commence. Screen 1034 illustrates one possible embodiment of a lottery game, or collection of lottery games, which may be represented and played using client device 210 or a POS terminal. In the upper portion of screen 1034, a slot style lottery game is illustrated, wherein pressing a "Go" button causes a selection of three random elements. In a lower portion of a screen, a lottery game ticket may be placed within the field of a camera associated with device 100, and a barcode or other indicia upon the ticket may be photographed and interpreted. The interpreted data may be used to initiate a lottery game, or may be used to determine if the associated ticket is a winning ticket in a lottery game. Of course, these are only two examples of many different lottery games which may be played in a gaming application upon a computing device 100, it being impractical to illustrate even a small subset of the many types of lottery games known. The embodiment further contemplates incorporation of lottery games hereinafter developed.

Upon the conclusion of the lottery game, the client may be notified by an SMS or other text message, or by a pop-up message, email or phone call, for example. The notification advantageously includes the lottery game played, and the winning or losing amount, and other useful information, such as a current balance in the client's fund account. Winning or losing amounts may automatically be credited to, or debited from, the client's fund account, ACH account, or other designated account. Alternatively, cash or a prepaid debit card may be collected at a retail location associated with the gaming host.

In some jurisdictions, it may be necessary to collect winnings only at designated payment locations. In these instances, a virtual coupon may be created or made available upon client device 210 by application 1000. In one embodiment, the coupon may only be used or redeemed by the device 100 used to originally play the lottery game or purchase the winning ticket. In one embodiment a POS is used in place of client device 210 at a payment location, for example using WiFi, BluetoothRFID, a visible barcode, or other communication method, to a device at the designated location, triggering a release of funds in the form of cash, debit card, or transfer of funds to an account of the client.

With reference to FIG. 11, in accordance with a further embodiment of the embodiment, a lottery game playable within application 200 includes an obscured screen region 1140 containing obscured data 1142, that is revealed when a client gestures (indicated by arrows "A") to form a wiping or scratching motion over obscured screen region 1140, gradually revealing obscured data 1142 until it becomes visible, for example by changing a contrast of the wiped portions of obscured screen region 1140, thereby revealing the indicia using a software algorithm of application 200. In one embodiment, random winning numbers are assigned, and winning numbers predetermined, by application 200 or associated servers, with the approval of a gaming authority, if applicable.

Accordingly, the obscured screen region metaphorically or virtually represents a "scratch-off ticket", which is typically a paper substrate bearing printed indicia, the indicia over coated with a removable media which may be removed with a coin or other sturdy object, so that the indicia becomes exposed, and may thereby be visualized. Such scratch lottery games are typically sold by state lotteries, and contain a sequence of symbols, letters, or numbers which correspond to a sequence of symbols, letters, or numbers which are regularly published by the lottery game host. Should the revealed sequence on the scratch ticket match the published sequence, the bearer of the ticket may be eligible for a prize. Similarly, once an obscured screen region has been wiped, application 200 may automatically compare the revealed indicia, or may be caused to compare the revealed indicia, for example by a gesture or button press by the client, with a published or predetermined number produced by the lottery game host. If the comparison results in a match, or a partial match should the lottery game rules allow this, the client may be rewarded, for example by the allocation of winnings as described elsewhere herein.

It should be understood that while a context of gaming is illustrated and described herein, involving the transfer of genuine negotiable funds, the embodiment contemplates other rewards, for example points, or published recognition, in addition to or in lieu of a financial reward. Since financial liability for the client is often required in order for gaming legislation to apply, the elimination of such financial liability may cause a waiver of age and geographic restrictions. In this event, a lottery game may be played using application 200 by persons who would otherwise be ineligible due to age or geographic location, or for any other reason.

In accordance with a further embodiment of the embodiment, a client may enter symbols, letters, or numbers corresponding to a winning or losing value in a gaming application, including a real scratch-off ticket, or the virtual scratch-off ticket of application 200. In one embodiment, application 200 captures an image of the real ticket, and analyzes it as described herein with respect to scanning an ID, to extract the winning or losing indicia. In the case of a virtual scratch-off ticket in accordance with the embodiment, application 200 already has the winning or losing values. Thus, a client may enter such values in follow on lottery game, or second chance lottery game, possibly including the award of a prize for a match to a predetermined value.

In another embodiment of the embodiment, values from a winning or losing real or virtual lottery game are entered as part of a lottery game under application 200, wherein the values may unlock one or more doors in a virtual facility, for example a house. Within those doors may be prizes, information, or a penalty. Alternatively, within those doors may be other lottery games. In one embodiment, a door leads to an area containing a pool (e.g. billiards type) table with a number of balls bearing hidden indicia. A client may then select a number of balls to reveal the hidden values on the balls, the selected values being used to generate a new number, which number may then be used in a subsequent lottery game. Alternatively, values generated in another lottery game may be used to select balls, and a new number may then be generated from this group of selected balls. The number of balls selected may advantageously correspond to the number of digits of a popular lottery game supported within application 200. The values derived from play in accordance with this or other embodiments of the embodiment may be used to select or specify lottery tickets in a state lottery, for example. In one embodiment, application 200 includes software created, or virtual representations of some or all of the real world lottery games offered by a state lottery. Funding thus corresponds to the price of the real ticket represented by the virtual ticket, plus a fee if applicable. Advantageously, an email may be sent to the client illustrating a representation of a real world ticket that the virtual ticket represents, together with a transaction receipt, and or barcode.

Figure 20:
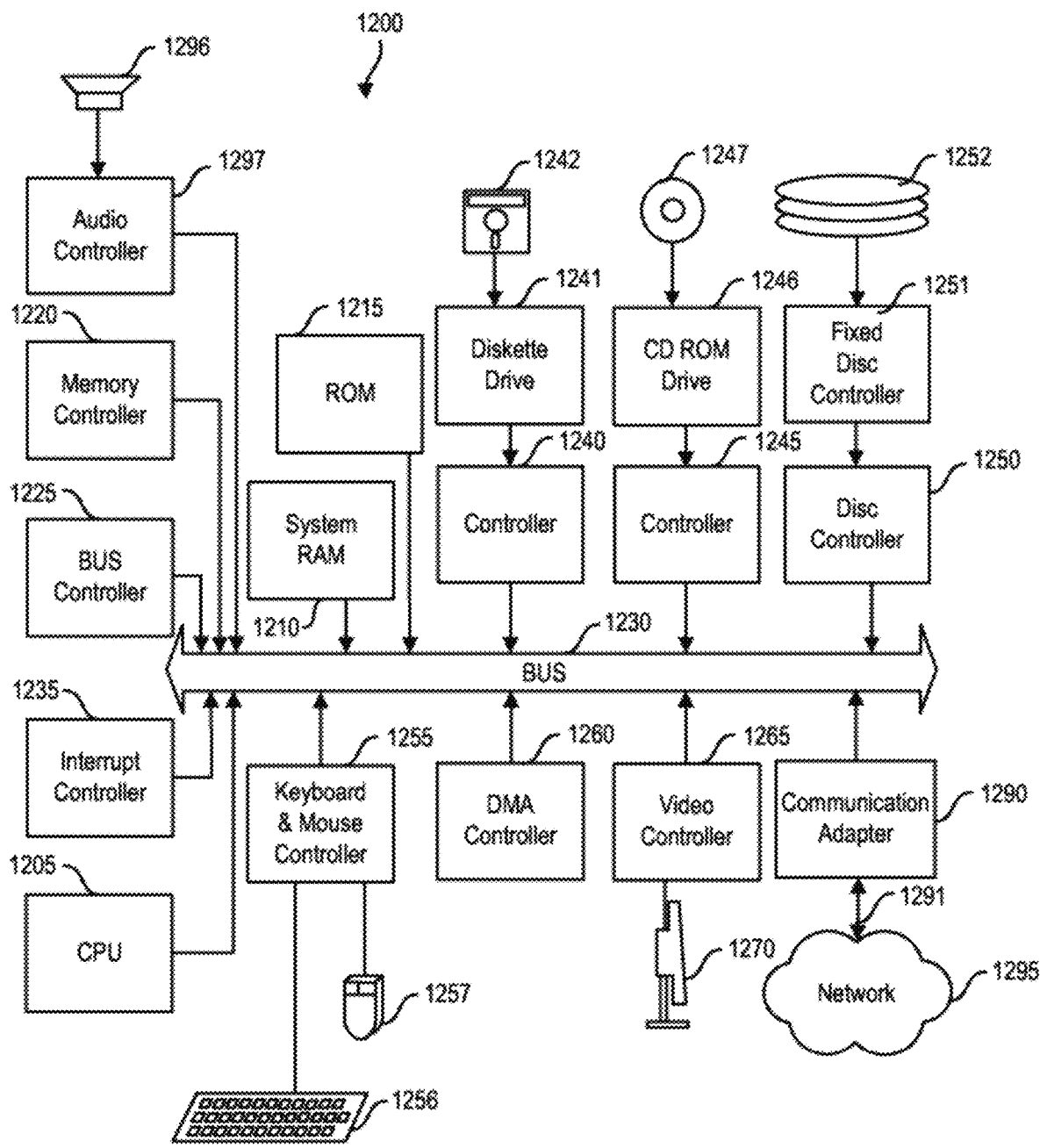
FIG. 20 is a block diagram of an exemplary system for searching one or more databases in accordance with various embodiments of the present invention.

FIG. 20 illustrates one embodiment of a system architecture for a computer system 1200 such as a server, work station or other processor on which the embodiment may be implemented. The exemplary computer system of FIG. 20 is for descriptive purposes only. Although the description may refer to terms commonly used in describing particular computer systems, the description and concepts equally apply to other systems, including systems having architectures dissimilar to FIG. 20.

Computer system 1200 includes at least one central processing unit (CPU) 1205, or server, which may be implemented with a conventional microprocessor, a random access memory (RAM) 1210 for temporary storage of information, and a read only memory (ROM) 1215 for permanent storage of information. A memory controller 1220 is provided for controlling RAM 1210.

A bus 1230 interconnects the components of computer system 1200. A bus controller 1225 is provided for controlling bus 1230. An interrupt controller 1235 is used for receiving and processing various interrupt signals from the system components.

Mass storage may be provided by diskette 1242, CD or DVD ROM 1247, flash or rotating hard disk drive 1252. Data and software, including software 400 of the embodiment, may be exchanged with computer system 1200 via removable media such as diskette 1242 and CD ROM 1247. Diskette 1242 is insertable into diskette drive 1241 which is, in turn, connected to bus 30 by a controller 1240. Similarly, CD ROM 1247 is insertable into CD ROM drive 1246 which is, in turn, connected to bus 1230 by controller 1245. Hard disk 1252 is part of a fixed disk drive 1251 which is connected to bus 1230 by controller 1250. It should be understood that other storage, peripheral, and computer processing means may be developed in the future, which may advantageously be used with the embodiment.

Figure 21:
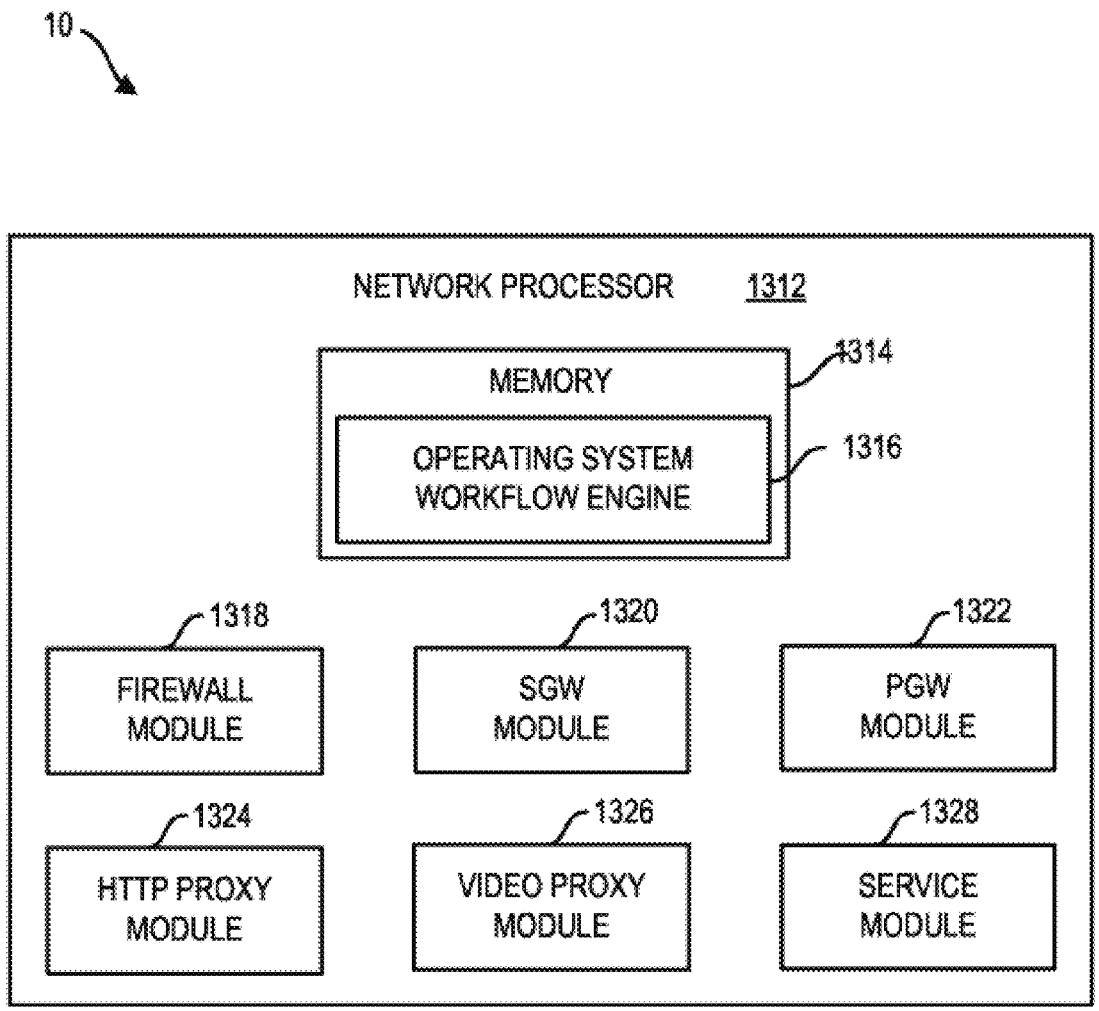
FIG. 21 is a block diagram of an exemplary workflow server.

In one embodiment illustrated in FIG. 21, a workflow server 1310 includes a network processor 1312 and operating system 1314. The operating system 1314 includes a workflow engine 1316. The workflow server 1310 includes a network firewall module 1318, a serving gateway (SGW) module 1320, a packet data network gateway (PGW) module 1322, a HTTP Web proxy module 1324, a video proxy module 1326 and a service module 1328.

The SGW module 1320 routes and forwards user data packets and acts as an anchor for mobility between LTE and other 3GPP technologies.

The PGW module 1322 provides connectivity from user equipment to external packet data networks by being a point of exit and entry of traffic for the user equipment. The PGW module 1322 performs policy enforcement, packet filtering for each user, charging support, lawful interception and packet screening.

The HTTP Web proxy module 1324 acts as an intermediary for requests from clients seeking resources from other servers. The HTTP Web proxy module 1324 provides web caching, web translating and web transcoding.

The video proxy module 1326 provides video caching, video translating and video transcoding. In addition, this module provides related services involving content manipulation such as advertisement insertion, splicing content together or rewriting adaptive bit rate manifest files.

The service module 1328 provides a number of services, such as, for example, Radius/Diameter, Policy Personal Eventing Protocol (PEP), Packet Forwarding, Content Filtering, Session Management, Domain Name System (DNS) Service, Access Control, Packet Inspection, Session Term, IP Transport I/O, a charging function, a policy enforcement function, a traffic steering function, a latency service function, and so forth.

The charging function refers to an ability to selectively charge mobile subscribers and/or content partners based on a per flow basis by applying differentiated billing plans based on flow characteristics such as volume of packets, amount of time the flow is active, and the application associated with the flow as determined by shallow or deep packet inspection of the packet(s) in the flow or by analyzing the flow heuristics (e.g., signature analysis), or other parameters associated with servicing the flow such as time of day.

The policy enforcement function refers to an ability to apply subscriber related QoS and gating policies to a subscriber flow on a per-flow basis, where the flow is determined by shallow or deep packet inspection, or heuristic analysis (e.g., signature analysis) of the flow pattern.

The latency service refers to an ability to measure network round trip latency between any selected subscriber or set of subscribers and the gateway function in the wireless core.

The workflow engine 1316 provides traffic steering to the various modules.

The workflow server 1310 enables wireless carriers to logically develop service flows in an entirely automated fashion to create a flow across all the network elements and functions such as firewall, network gateways, charging gateways, content filtering engines, deep packet inspections engines to orchestrate new services. The term "service orchestration" as used herein refers to execution of the work flow engine 1316, which steers network traffic and executes a collection of functions and their sequence required to instantiate a service workflow, and the multiple capabilities of the workflow server 1310 to instantiate a new carrier defined service. Capabilities such as deep packet inspection, charging, content inspection, and service routing are used as tools and capabilities in the workflow engine 1316 to orchestrate new services.

The capability of service orchestration in the workflow server 1310 reshapes a creation of services in a carrier network. The workflow server 1310 reduces time to market for new services from service conception to service delivery, leading to rapid revenue generation for new services. The workflow server 1310 enables improvement in service quality and delivery. The workflow server 1310 enables capital expenditure cost reduction due to reduced network integration expenses. The workflow server 1310 provides operational expense savings due to minimized need for professional services. The workflow server 1310 enables service creation and development flexibility at Layer 4 through 7 and device parameter and programming simplification.

The development and institution of new services in a wireless carrier environment is a complex and time consuming process. The ability of a mobile subscriber to traverse multiple packet data networks (PDNs) due to the devices ability to roam causes even further complexity to roll out new services. Unlike the Internet universal resources locator (URL) routing concept, which selects the server that hosts the application, access point name (APN) traffic routing principles are more catered toward getting a subscriber to the "network element" (GGSN) that owns the data session and not the application server. The home GGSN does not act like an application server but more like a packet forwarding engine to get the session to the next network entity in the service chain. It terminates the GTP tunnel and then uses Layer 3 transport routing rules to get the sessions to the next network element. The next element can be either one of many elements to deliver, manage, or bill the service. Service orchestration includes Layer 3 routing and rules insertion by each specific network element.

In order to orchestrate a service across all of the respective network elements, the carrier must develop a comprehensive Internet Protocol (IP) routing plan to do next route hopping to get to each element that will have a role in invoking, load balancing, charging, content filtering, firewalling, and billing the service. The engineering process to do this is a very labor intensive, complex network integration, and costly endeavor from both a professional services and time to market perspective.

In general, an access point name (APN) identifies an internet protocol (IP) packet data network (PDN), which a mobile data user wants to communicate with. In addition to identifying a PDN, an APN may also be used to define the type of service, e.g., connection to a wireless application protocol (WAP) server or a connection to a multimedia messaging service (MMS), which is provided by the PDN. Because the APN concept was purposefully designed for carrier network selection and routing and not service application selection, and considering time to market complexities, carriers are looking at alternative approaches for how APNs are used in delivering 4G, 3G and LTE services. A majority of the carriers for both their 3G and 4G infrastructure are considering the use of a single APN to run all service on the mobile device. The introduction of a generic APN reduces the complexity of introducing new services by minimizing the device aspects of the APN provisioning. When the carrier implements a single APN the problems of lengthy provisioning sweeps to rollout new services no longer exist. However, the network traffic steering processes for services takes on a greater degree of complexity if steps are not taken to simplify the network traffic flow. The workflow sever 1310 simplifies the network traffic service flows through a single automated environment.

Before describing service orchestration in the workflow server 1310, we will consider a fairly simplistic analogy of service orchestration in another industry. Let us consider the delivery of a FedEx® parcel from it origination point to its final delivery destination. The first thing that must happen is the FedEx® mail must be addressed by the originator to get to its final destination. This step is analogous to a mobile phone launching the APN with the intent to use, for example, an Internet Browse service. In the case of mail, the addressee, the destination address, city, state, and zip code all play a pivotal role in getting the mail to its final destination with on time delivery. There is nothing done at this point in time to determine what type of parcel it is (e.g., a letter or a box).

In the case of the wireless phone, the APN is the equivalent of addressing the packets from the mobile device for delivery. In the case where carriers use a generic APN, the specific service being requested is not known (e.g., Internet Browse or Video). Going back to the postal example, the automated system in FedEx® looks at the size, weight, delivery destination using bar codes, and sorts the letters from the boxes. It also looks at time delivery commitment intervals and appropriately sorts the parcel. Then using the bar coded label, the parcel is automatically routed to the destination address at each touch point by simply scanning the bar code for destination information. The FedEx® system is an automated rules based system that requires little manual intervention along the delivery path. It recognizes delivery priority, destination, and routing logistics by analyzing the parcel along the various touch points automatically to insure on-time delivery and quality of service to the final destination. These capabilities are needed to automate the carrier's network to facilitate the use of a generic APN to deliver services. However, in the wireless phone example, the network elements are not capable of delivering the same experience because each network element must have a set of rules manually provisioned into it each every time a new service is introduced, whereas the FedEx® system adapts to changes in parcel size, destination, and delivery time at each touch point.

In the workflow server 1310, workflows enable wireless operators to create service flows and include identification of a service flow via a L4-L7 DPI analyzer, a set of functions with corresponding rules and a sequence that is applied to the service flow. Workflows are created to examine packets at multiple layers in the OSI stack (Layers 4-7) and to define a set of rules to inspect any APN service flow. The service flow can be either generated by the wireless subscriber, the operator, or a content partner to route, charge, bill, filter, or to take any other action such as a Diameter or LDAP query to create a new service or modify an existing one. Workflow rules are constructed using data analyzers. These analyzers are names given to the DPI primitives that indicate the layer of the stack and the type of packet that is used to create the analyzer. For example, a data analyzer to trap a MSISDN of mobile at the GTP layer can be named GTP.MSISDN. The end result of the workflow process is service orchestration or simply stated, the instantiation of a new service in the operators network using an automated process.

The workflow process includes the functions of flow partitioning, flow dispatching and flow pipelining.

Flow partitioning refers to an ability to perform deep packet inspection on service flows and screen for the actionable triggers to trap and analyze the data. Examples include:
HTTP to URL disney.com
DNS for GTP.MSISDN=mickey
TCP with DstPort=8
SKYPE with source_user=mickey and destination_user=Minnie Flow dispatching refers to an ability to take specific action on the returned result(s) of flow partitioning, such as route packets to internal content filters or invoke a LDAP query for subscriber information.
Analytics→log to analytics service named "mobile_latency"
Firewall→perform firewall service named "gatekeeper"
Content Filter→perform parental controls named "nanny"
Charging Filter→perform charging control named "prepaid"
Calea Filter→perform lawful intercept named "Calea"
Video→Perform video service named "madhatter"
MSISDN→perform LDAP query Flow pipelining refers to an ability to control order and flow dispatching of packets, including an ability to make branch dependent dynamic decisions with flow decisions occurring at each branch.

Let's construct a sample workflow to orchestrate a service on a generic APN using the following flow partitioning rules and flow dispatch. The construct of the rule is as follows:
Flow Partition→Flow Dispatch The first flow partitioning rule is used to examine the service flow from the mobile device to look for a DNS query from the mobile device to specific URLs. Both rules direct the packets from a flow dispatch perspective to the content filter service. The rules are constructed as follows:
DNS (two rule sets listed below)
DNS.URL=*.com→*.com Content Filter
DNS.URL=*.att→att.net Content Filter The next flow partitioning rule is used to examine the service flow from the mobile at the GTP level to look for an ICMP traffic from a specific mobile IMSI and a specific traffic type of ICMP. The rule then takes the result and flow dispatches it towards a service called "Mobile Latency Analytics Service." The rule is constructed as follows:
ICMP (one rule set listed below)
GTP.IMEI=goofy and ICMP.TYPE=ECHO→Mobile Latency Analytics Service The last flow partitioning rule is used to examine the service flow from the mobile at the HTTP level to determine the URL type and the GTP for a specific device. The HTTP rule directs the traffic toward the .com proxy service and GTP rule directs the traffic toward a service labeled "External Transcoders." The rules are constructed as follows:
HTTP (two rule sets listed below)
Http.URL=*.com→*.com Proxy
GTP.DEVICE=U350→External transcoder Service Using the above set of flow partitioning rules and flow dispatch services, let's use the flow pipelining process to orchestrate a couple of services. An example of a service a wireless operator can create using workflow is a relatively simple but very valuable service to analyze the latency of a given set of mobile devices with a range of International Mobile Equipment Identity (IMEI). An example of this type service is to measure latency for all Apple® IPhone® devices in a certain geographical area (e.g., PGW serving area).
GTP.IMEI=goofy and IP.TYPE=PROTO and ICMP.TYPE=ECHO→Mobile Latency Analytics Service The new service is instantiated across a generic APN and orchestrated to a latency mobile measurement service named Mobile Latency Analytics.

Figure 22:
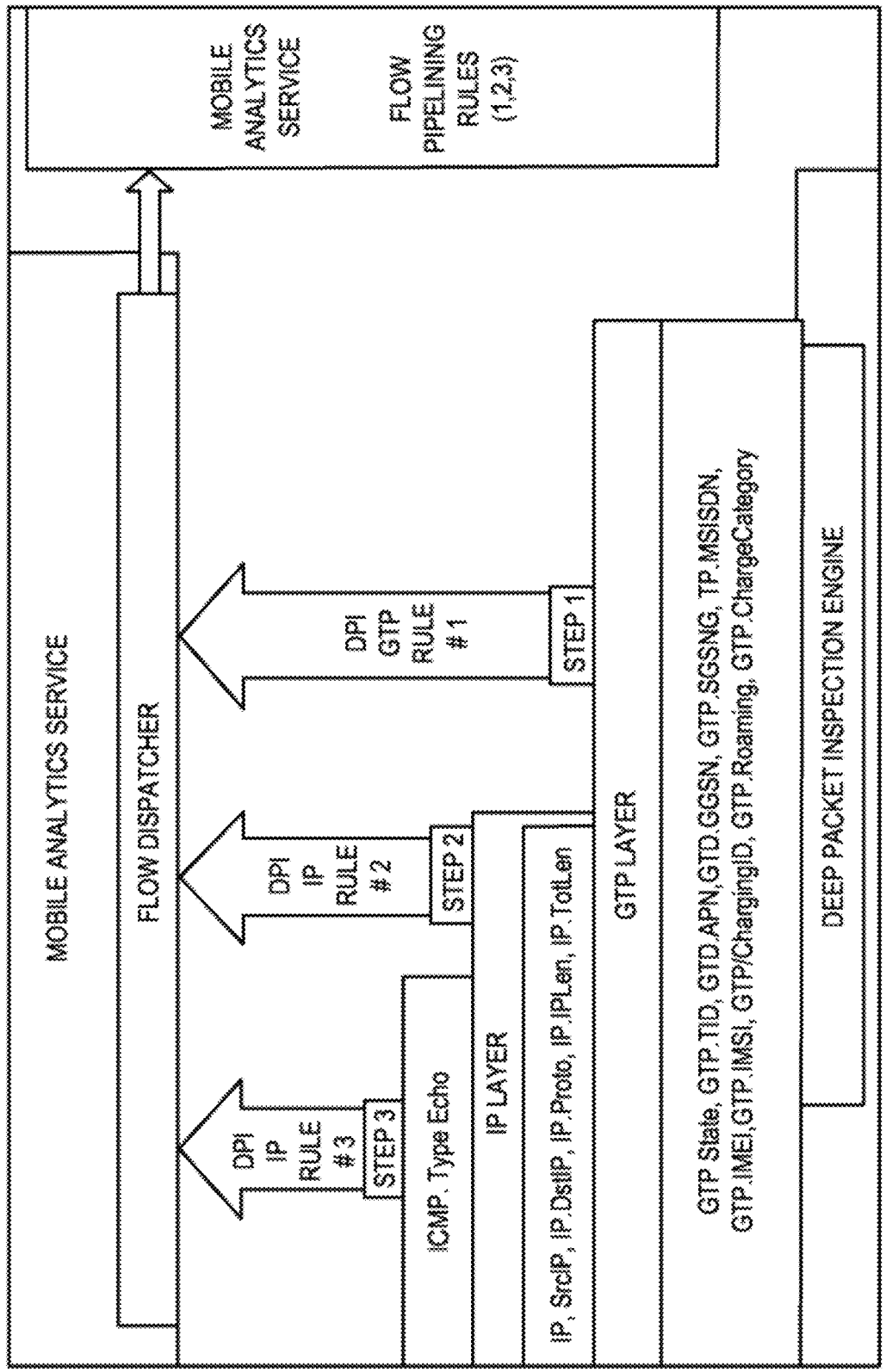
FIG. 22 is an exemplary mobile analytics service workflow.

FIG. 22 illustrates an exemplary mobile analytics service workflow.

Figure 23:
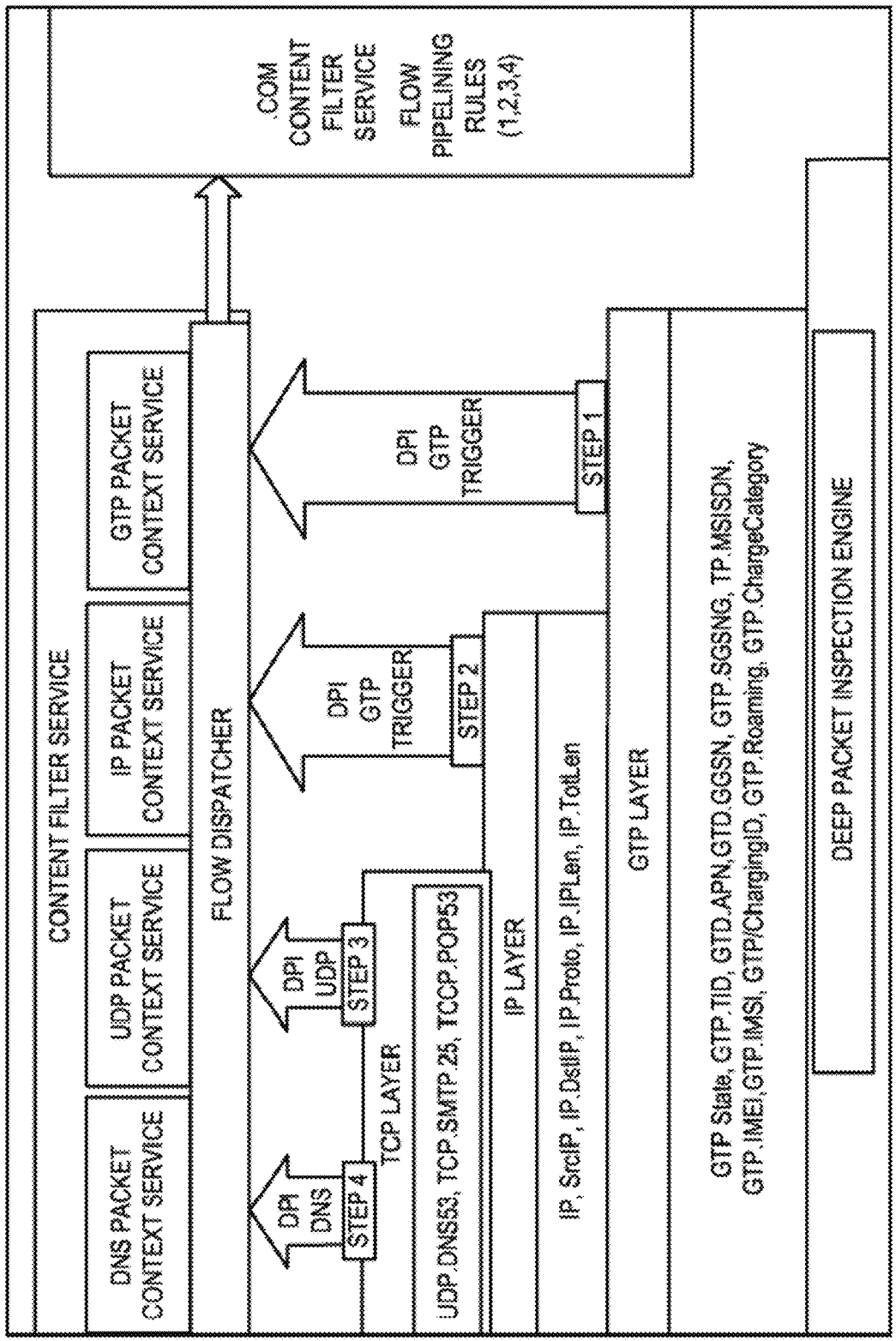
FIG. 23 is an exemplary parental control service workflow.

In another example, a workflow is designed to analyze the traffic flow from a generic APN and steer the traffic to the workflow server 1310 content filter for analysis. In this example, the workflow process goes up the TCP Layer to orchestrate the service. This service example depicts the analysis of a URL and dispatches to the content filter for screening of explicit content. This workflow process creates a simple parental control service. The new service is instantiated using the generic APN to orchestrate a service named parental control. In this case there are four flow partitioning rules, each having a different flow dispatch. The flow pipelining process then makes the dynamic branching decisions necessary to orchestrate the service called parental controls. The rules are listed below.
GTP.TID→GTP Packet Context Service
IP.Proto=UDP→IP Packet Context Service
UDP.Port=DNSPort 53→DNS Packet Context Service
DNS.URL→DNS Packet ContextService FIG. 23 illustrates an exemplary parental control service workflow.

Figure 24:
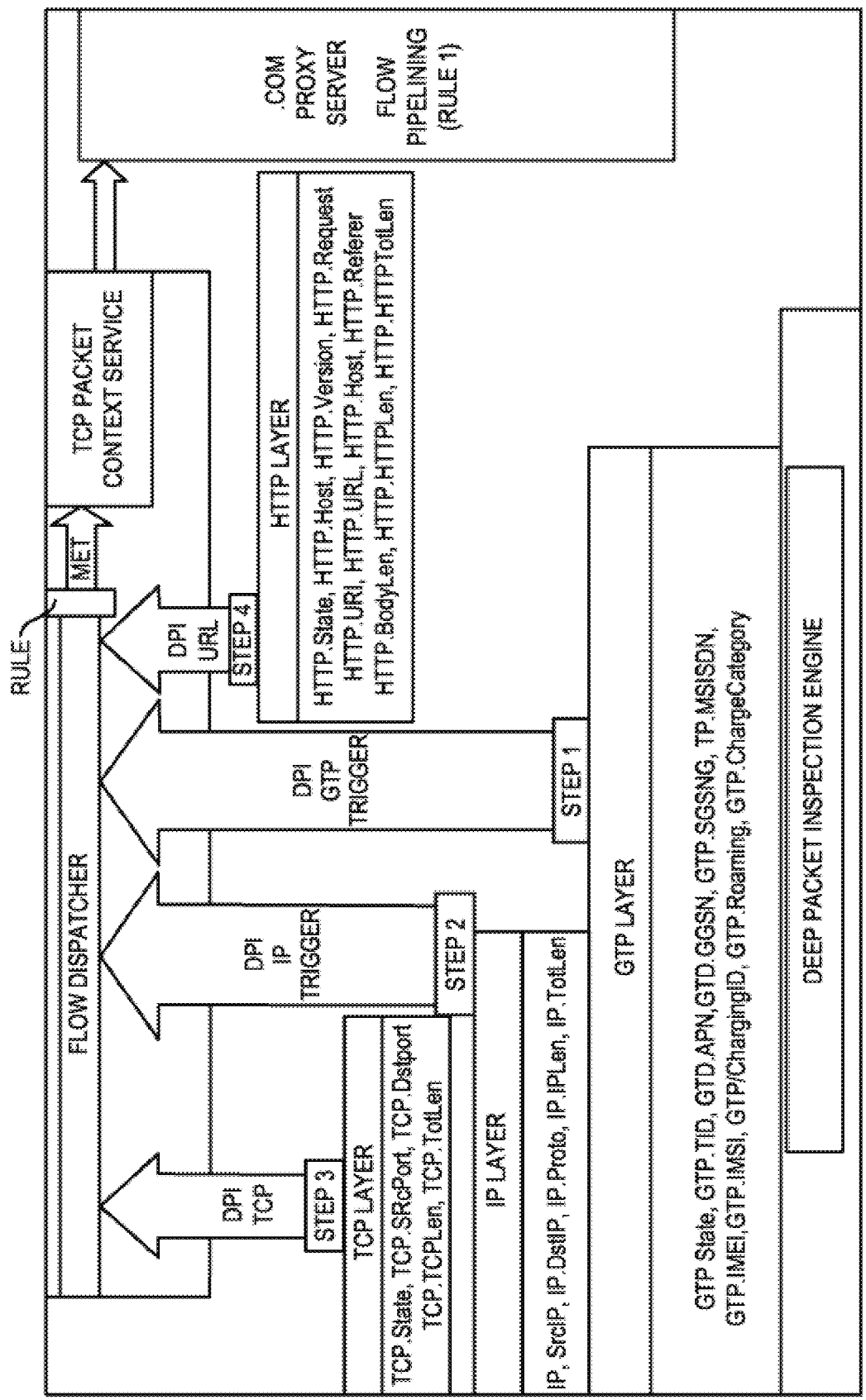
FIG. 24 is an exemplary HTTP service workflow.

In still another example, a work flow is illustrated that analyzes the traffic flow from a generic APN to determine whether to route the traffic to a HTTP proxy. In this example, the work flow process goes up the HTTP layer to orchestrate the service. This service example depicts the analysis of URLs to invoke the .com proxy service on the workflow server 1310. In this case, a single flow partitioning rule and flow dispatch is used to create the service. The rule is listed below.
HTTP.URL=*.com→.com Proxy Service FIG. 24 illustrates an exemplary HTTP proxy service workflow.

The examples above indicate that the workflow process is a very powerful tool that reshapes the manner in which carriers design, provision and implement services in their network. Although the examples given were simplified, the workflow engine 1316 enables the creation of multiple flow partitioning rules and facilitates a flow pipelining process to create services of varying complexity in the carrier network.

In order to facilitate the workflow engine 1316, the following conventions are used.

The service work flow partitioning process should allow packet inspection at Layer 4-7 of the software stack.

A naming convention for the data analyzers for Layer 4 through 7 should be established in order to build a rule to DPI rule and to analyze the data primitive. An example of a data analyzer is GTP.IMEI that serves as the name of the analyzer to trap International Mobile Equipment Identifier (Phone Type) at the GTP layer.

A suite of data analyzers should be established for the data primitives for Layers 4-7. The suit of analyzers should be broad enough at each layer to allow robust service flow creation.

The workflow process should enable creation of multiple Data Analyzers to be established for at each layer.

The service workflow partitioning process should enable a user to input multiple rules using data analyzers from a single or multiple layers of the software stack.

The workflow engine 1316 is the single place to implement service logic and rules for multiple network functions such as firewalls, content filtering, charging, data base queries and other service functions All the functions of the workflow are provisioned from the same user interface screen and there is a single place to workflow engine 1316 to validate the rules provisioned as part of the workflow.

The service workflow partitioning process should enable a user to input rules using the IF, AND, OR, and ELSE syntax to create rules.

The service workflow process should enable rules using the IF, OR, AND Syntax to be chained together to create a "Super Rules" statement.

The service workflow dispatch process should enable the rule result to be dispatched and results collected in unique user defined service context.

The service workflow pipelining process should allow logical ordering of multiple service contexts (service branch results) to create a service flow.

The service workflow pipelining process should enable logical ordering of multiple service contexts (service branch results) to create a service.

Test Mobile System (TEMS) is an Ascom network monitoring and real-time diagnostics suite. The following is a list of TEMS considerations for service flow provisioning in the workflow server 1310.

TEMS should allow an operator to provision a new service workflow using an intuitive and user friendly manner from one single GUI interface.

Service workflows provisioning operators should be agnostics to the protocol level details. TEMS shall present user with various filterable attributes at each Layer (4 to 7), during a work flow provisioning flow. The operator should be agnostic to any protocol level details while selecting filtering criteria to define a work flow rule.

Context sensitive service workflows provisioning. TEMS shall present flow partitioning attributes in a context sensitive matter compared to the other flow partitioning attributes provisioned at different protocol layers for the same service work flow.

What the above means is that if stage 'n+1' of partitioning flow attributes depends on stage 'n' then only a valid set of attributes are shown to the user for selection during a service workflow provisioning.

Tabular display of all the service workflows. TEMS shall display all the service workflows provisioned per node (or per network) in a tabular fashion.

Modification of existing service workflows. TEMS shall allow operator to modify an existing work flow by letting them add, modify or delete any rules from an existing service workflows. Operator shall be notified of the impacts to the existing service workflow modifications.

Ordering rules within a service workflow. TEMS shall allow an operator to define or change the order in which different partition rules shall be executed or dispatched.

Defining relationship (AND/OR) between different rules with in a service workflow. TEMS should allow an operator to define a relationship (without the need to type in anything) of ANDing or ORing between any set of rules.

Defining relationship (AND/OR) between different rules with in a service workflow. TEMS should allow an operator to define a relationship (without the need to type in anything) of ANDing or ORing between any set of rules.

Combine different service workflows. TEMS should allow one of more existing service work flows to be combined to merge to form new service workflows.

Service workflows history and audits. TEMS should present to the operator a complete audit trail of the service work flows creation, modification or deletion.

Validation of service workflows during its creation or modification. Before a service work flow is created or modified on a network element, a validation rule runs on the node to make sure that the new service work flow being provisioned is not conflicting with any existing service workflow. An appropriate error message shall be presented to the user in the case of a validation failure. The newly created rules shall be checked within or outside the work flow context to make sure there are no conflicts.

Collecting analytics on service workflows. TEMS should allow operators to enable/disable analytics on any service workflows. The attributes for the analytics to be collected for any service workflow shall be pre-defined. Operator shall be able to add, delete or modify from the default analytics template for any service workflows.

Customer association with service workflows. TEMS should allow operators to associate service workflows with an end customer.

Operator shall be able to define and configure workflows to handle different overload conditions. For example, in a case of an overload, if CPU usage on a particular card is more than the high threshold mark then for a particular kind of traffic (HTTO, Video), the workflow server 10 acts as a pass through. This pass through is enabled or disabled on the workflow server 10 by configuring workflows. The Operator can configure the following rules:
 a. Application.Type=Http OR Application.Type=Video Streaming [Flow Partitioning Rule]
  i. Ssm.cpu-usage>cpu-high-threshold (e.g. 95%) [Overload Condition 'State']
  ii. Delete NPU rule to forward the packet to the CSM card. This enables pass through for any http video request [Action 1]
  iii. Non Service Impacting vs. Service Impacting [Action 2].
  iv. No Charging (pass through case) vs. still maintain Charging information for the subscriber [Action 3].
 b. Application.Type=Http OR Application.Type=Video Streaming [Flow Partitioning Rule]
  i. Ssm.cpu-usage<={cpu-high-threshold-5% of cpu-high-threshold (e.g. 95%)} [Overload Condition 'State']
  ii. Add NPU rule to forward the packet to the CSM card i.e. no pass through [Action 1].
  iii. Non Service Impacting vs. Service Impacting [Action 2].
  iv. No Charging vs. still maintain Charging information for the subscriber [Action 3].

Operator should be able to configure actions for the load distribution use case where CPU threshold on a particular card is more than the low threshold mark but smaller than the high threshold mark. We want operator to be notified (warning alarm) so that they can plan/budget the CSM capacity on the workflow server 10. Operator can configure the following rules:
 a. Application.Type=Http OR Application.Type=Video Streaming [Flow Partitioning Rule]
  i. Ssm.cpu-usage<cpu-high-threshold (e.g. 95%) and Ssm.cpu-usage>cpu-low-threshold (e.g. 75%) [Overload Condition 'State']
  ii. Raise a warning alarm to TEMS and indicate the full CSM capacity approaching condition to the operator [Action 1].
  iii. If this condition happens multiple times within a configured time interval (e.g., 1 day) then the alarm condition could be raised to a Major one [Action 2].
 b. Application.Type=HTTP OR Application.Type=Video Streaming [Flow Partitioning Rule]
  i. Ssm.cpu-usage<=<={cpu-low-threshold-5% of cpu-low-threshold (e.g. 75%)} [Overload Condition 'State']
  ii. Clear the alarm condition [Action 1].

A user interface flow for provisioning a service workflow can be a three to four step process (launched all from the same graphical user interface (GUI) screen) where each step collects different information from the end user. The stages and the type of information to be collected at each stage are described below.

1. (Step-1) Flow Partitioning
 a. User is presented a screen with a drop down menu item indicating an option to select Layer-4 to Layer-7 flow partitioning. Depending on the selected layer, attributes specific to that layer are shown with a check box allowing users to select the attributes they want for the flow partition. Eg:-HTTP.URL, GTP.TID, IP.Proto, UDP.Port, DNS.URL etc.

Flow Partitioning Rule Examples
 HTTP.URL=http://www.nytimes.com
 HTTP.Referer begins with http://www.nytimes.com
 DNS.QueryName finishes with nytimes.com
 HTTP.URL contains nytimes
 IP.TotLen<1000
 IP.TotLen>1000
 DNS.QueryName !finishesWith nytimes.com 2. (Step-2) Flow Dispatching
 a. A next screen presents to the end user a pre-defined set of 'Services' where the results of flow partitioning shall be dispatched to. The list of services can include, but are limited to, analytics like Mobile Latency, firewall like 'gatekeeper', Content Filter, CALEA Filter, Video or MSISDN services.

An example of a transaction for charging can be configured as follows:
 HTTP.URL finishes with .mp3 and HTTP.State=RESP_OK (indicates and MP3 file was downloaded).

Actions on the above can be defined as:
Drop Packet
 Send packet to service with value (should be able to include things like charging values, i.e., HTTP.TotLen)

Redirect to URL (should be able to build URL dynamically from flow partitioning.
3. (Step-3) Flow Pipelining
 a. A next screen presents to the user the order in which he/she wants to the dispatched flows to be applied.
4. (Step-4) Workflow Analytics
 a. Based on the type of the service work flow, this screen can present to the end user a pre-defined set of analytics parameter that can be collected for a particular workflow or it could present a dynamic list of parameters that user can select to be collected as part of the service workflow analytics.

Figure 25:
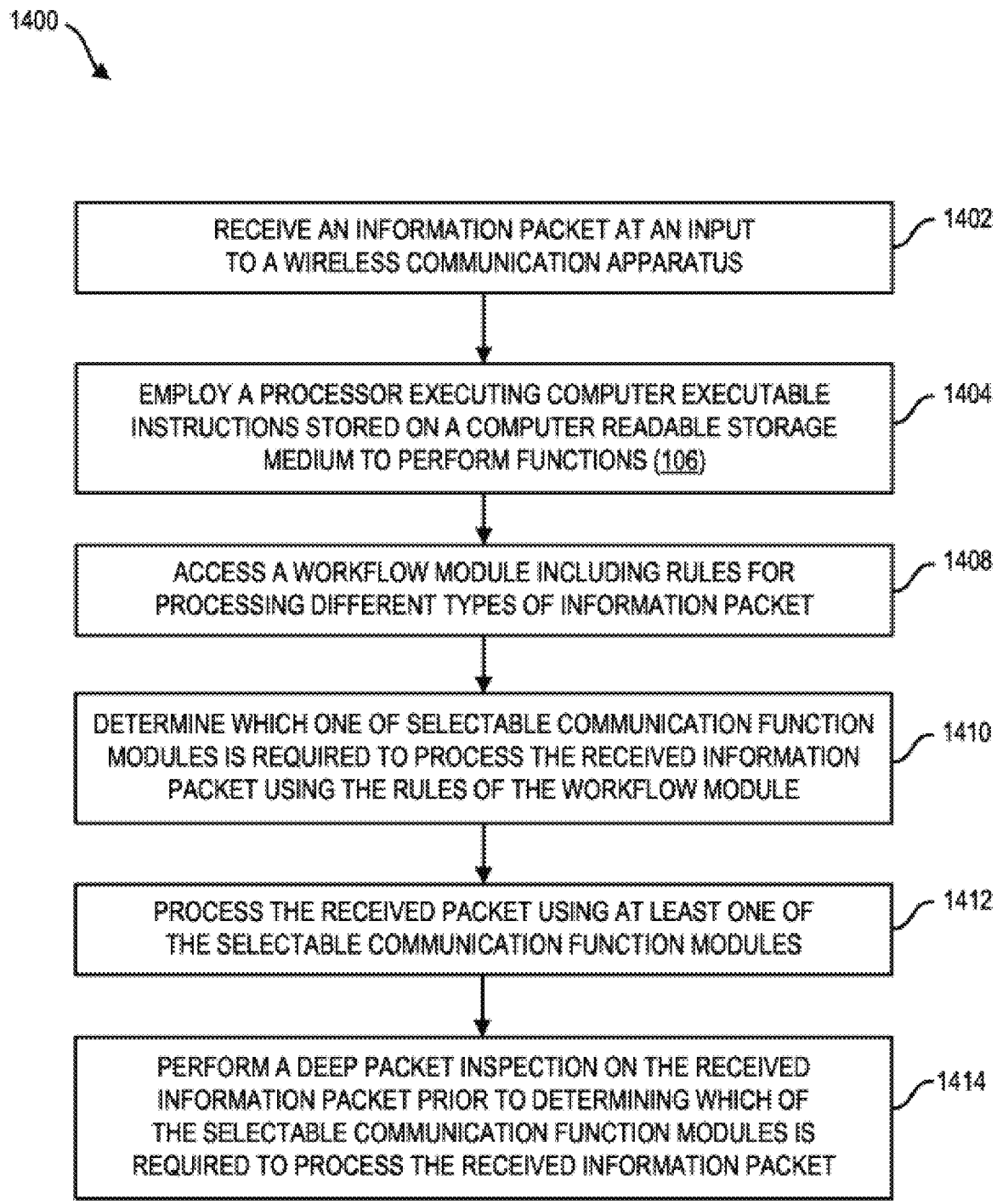
FIG. 25 is a flow diagram.
Figure 26A:
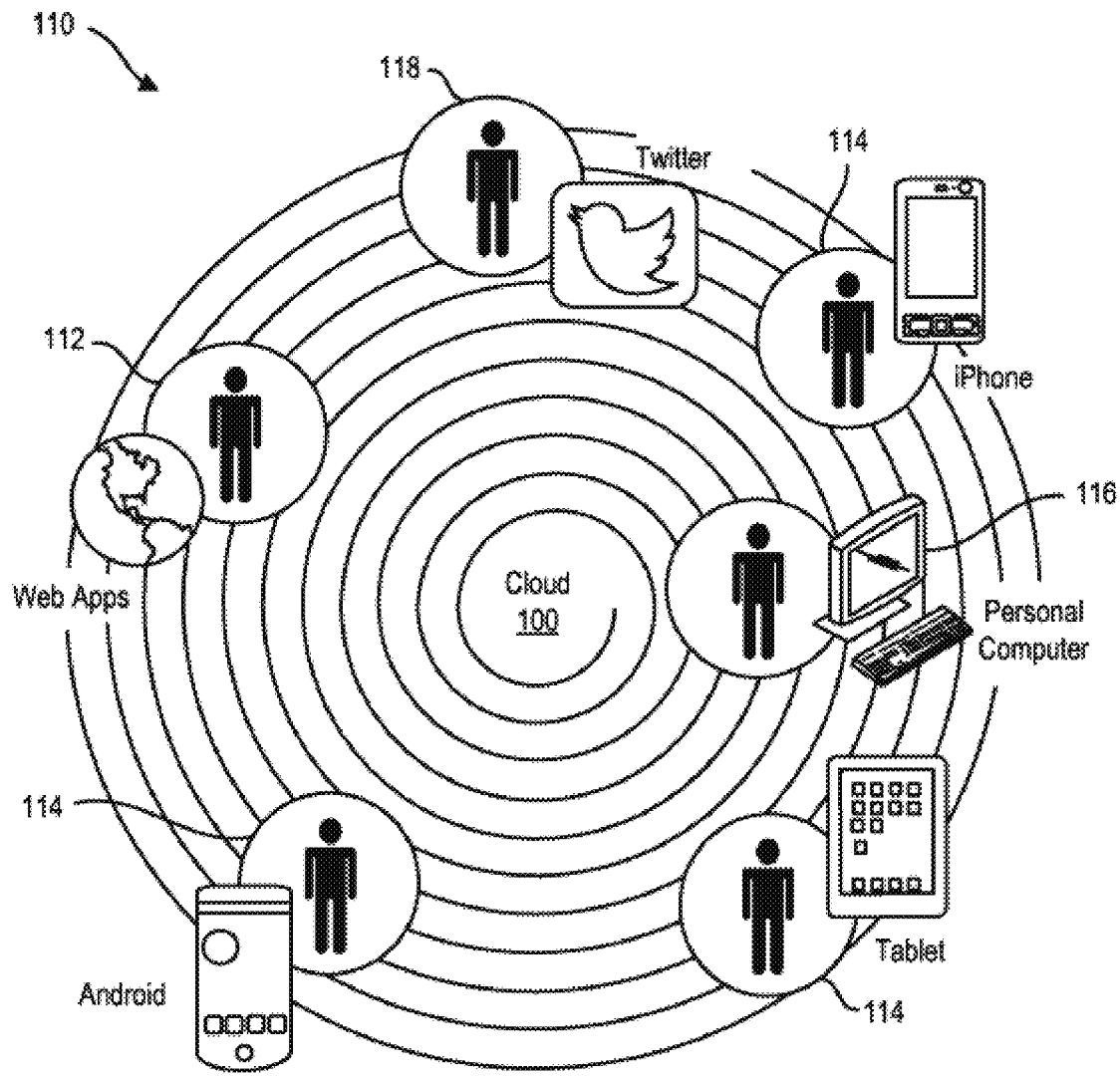
FIG. 26A illustrates one embodiment of devices in a cloud infrastructure that can be utilized with the present invention.
Figure 26B:
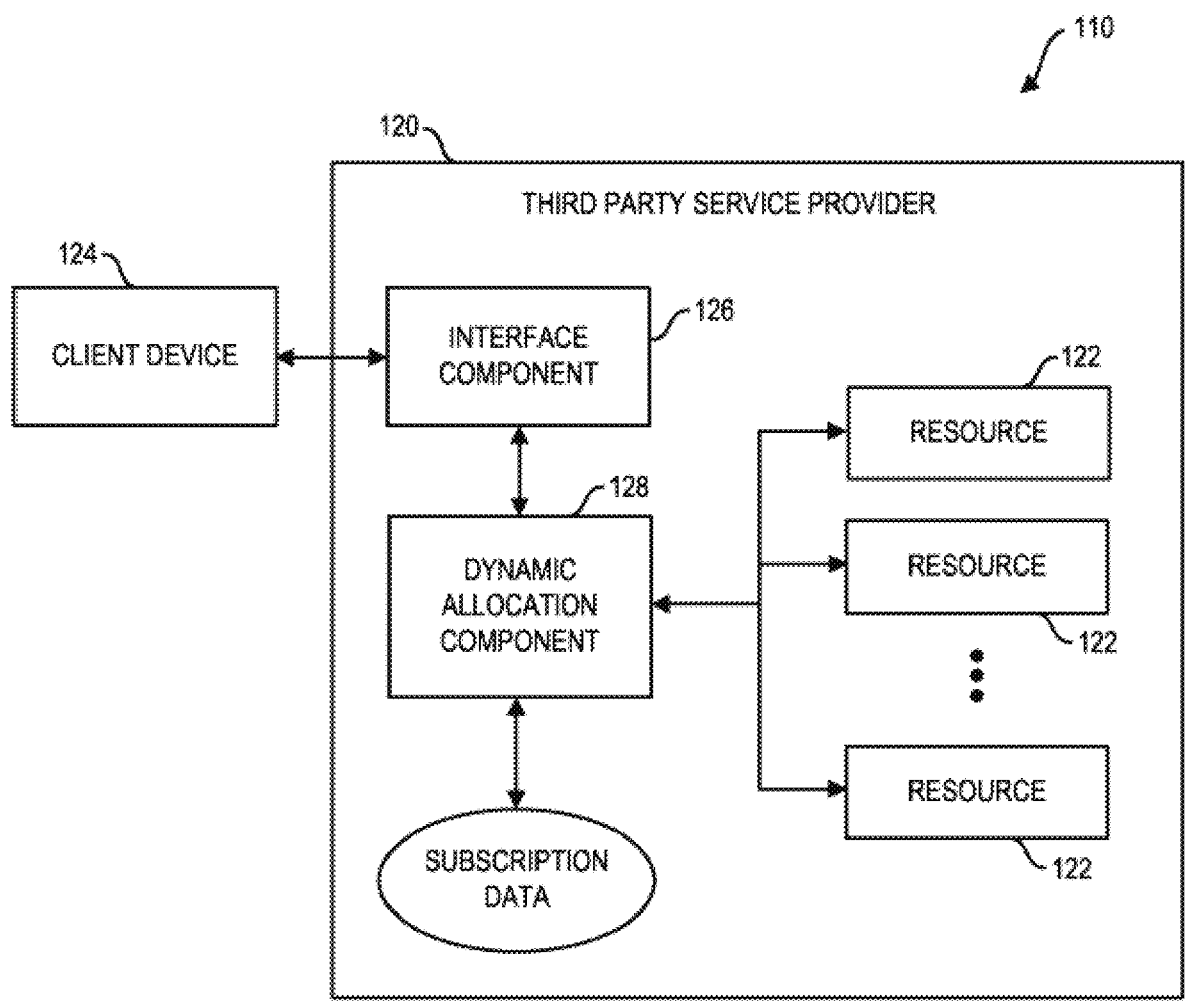
FIG. 26B illustrates one embodiment of a cloud infrastructure that can be utilized with the present invention.
Figure 26C:
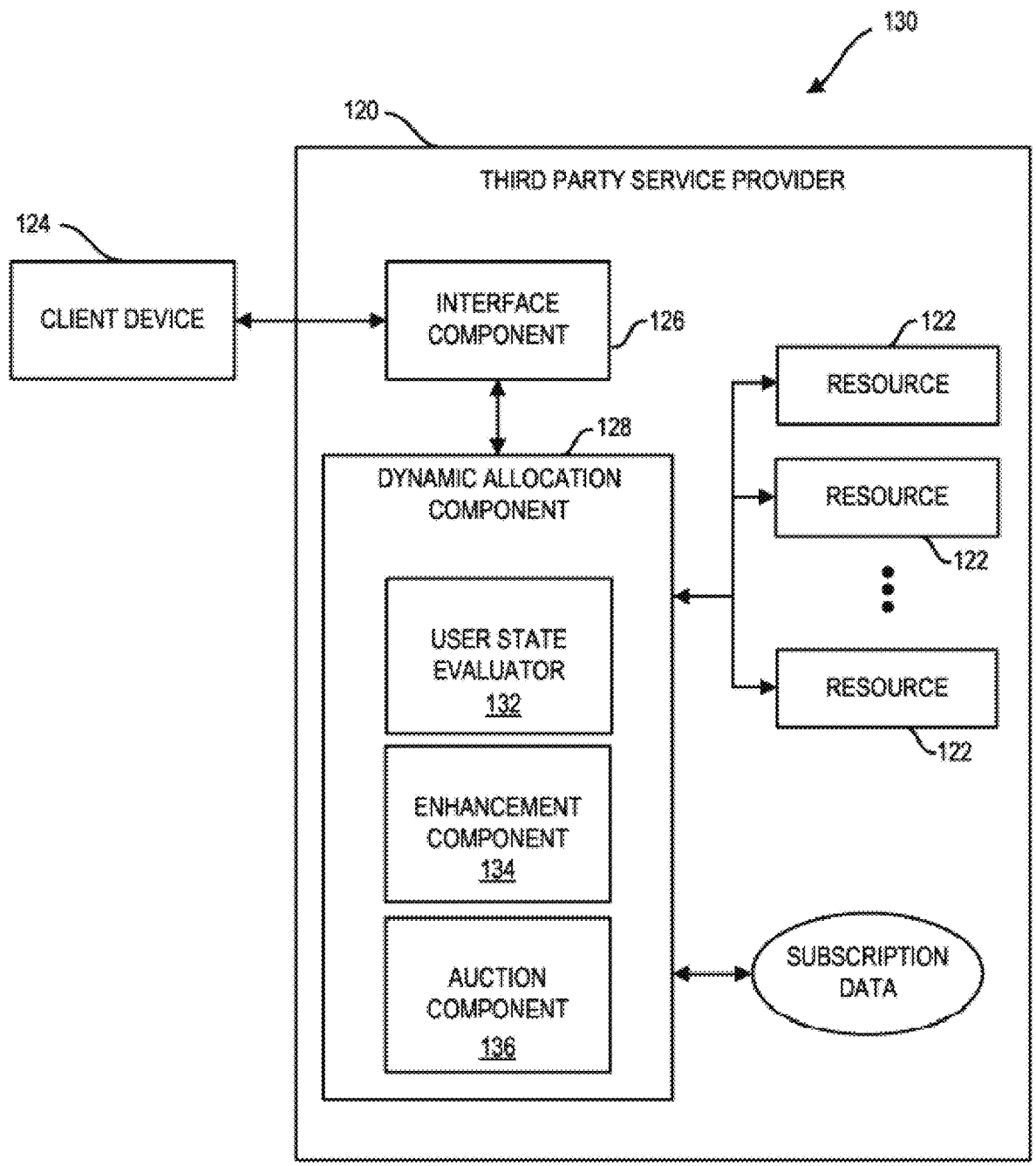
FIG. 26C illustrates another embodiment of a cloud infrastructure that can be utilized with the present invention.
Figure 26D:
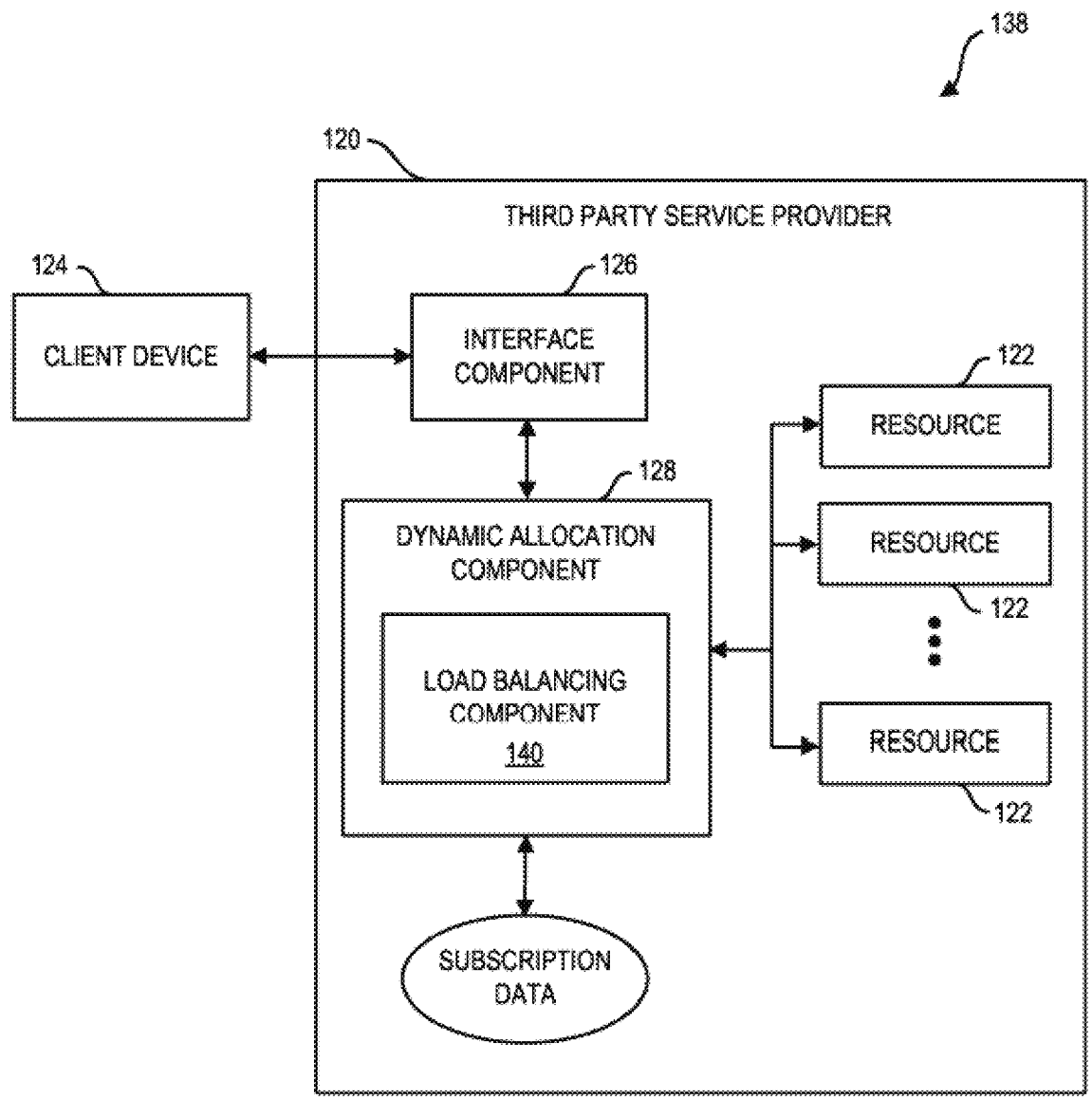
FIG. 26D illustrates yet another embodiment of a cloud infrastructure that can be utilized with the present invention.
Figure 26E:
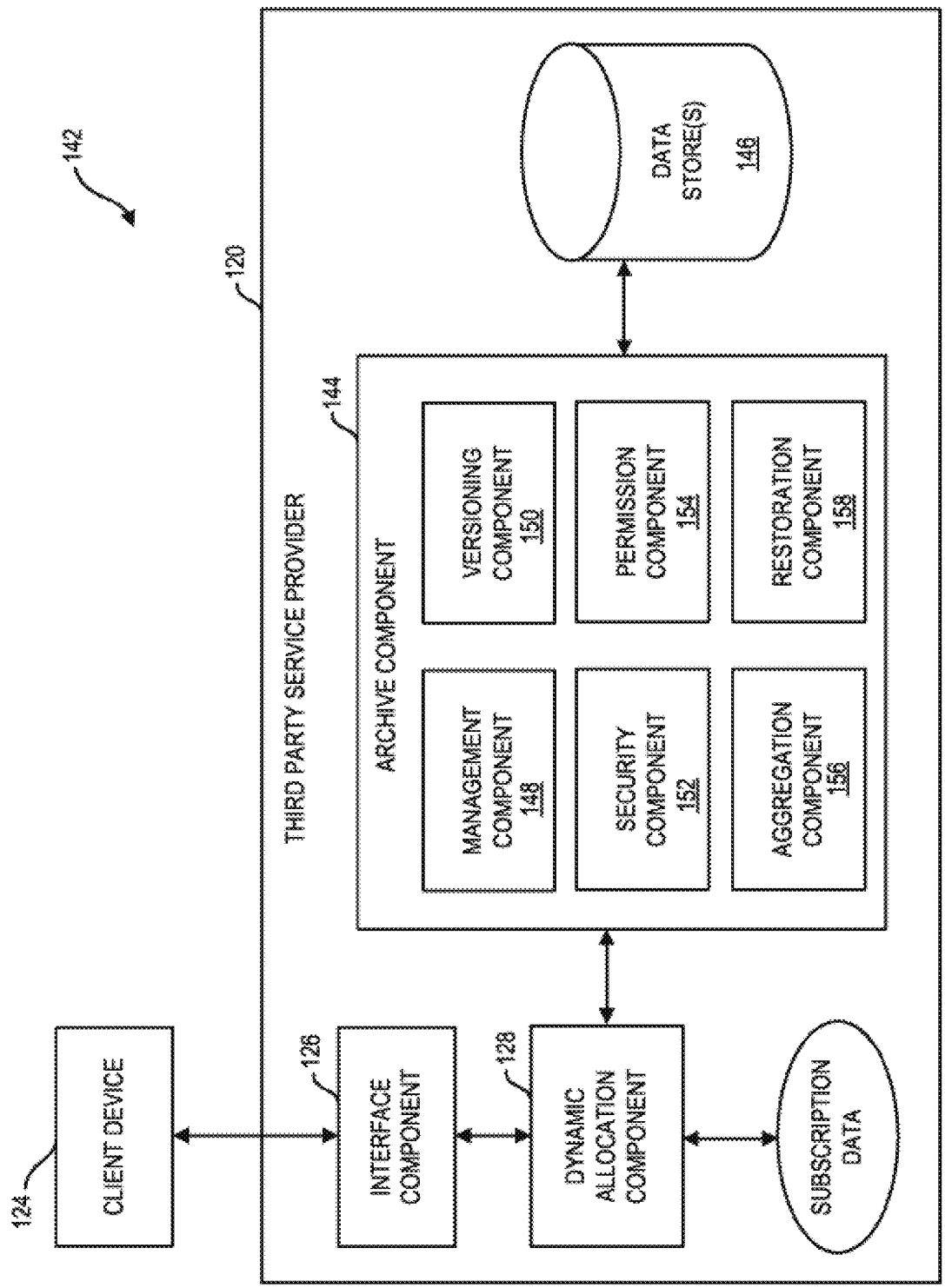
FIG. 26E illustrates an alternative embodiment of a cloud infrastructure that can be utilized with the present invention.

As shown in FIG. 25, a workflow process 100 includes receiving (102) an information packet at an input to a wireless communication apparatus.

The workflow process 1410 employs (1404) a processor executing computer executable instructions stored on a computer readable storage medium to perform functions (1406).

The functions (1406) include accessing (1408) a workflow module including rules for processing different types of information packets, determining (110) which one of selectable communication function modules is required to process the received information packet using the rules of the workflow module, and processing (1412) the received packet using at least one of the selectable communication function modules.

The workflow process 1400 may include performing (1414) a deep packet inspection on the received information packet prior to determining which of the selectable communication function modules is required to process the received information packet.

Processing (1412) the received packets may include using the workflow module to coordinate the selectable communication function modules. All information flows through the workflow module to the selectable communication function modules and no information flows directly between the selectable communication function modules.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices, magnetic disks, e.g., internal hard disks or removable disks. magneto optical disks. and CD ROM and DVD-ROM disks. The processor and the memory can be supplemented by, or incorporated in special purpose logic circuitry.

Fraud Detection

In one embodiment the single platform performs fraud detection. In various embodiments fraud detection can be determined by one or more of: does the dollar value of transactions from a single lottery participant exceed $X per financial account in a selected time period, which as a non-limiting example can be has the lottery participant's financial account been used with the lottery participant more than 3 times in the past hour. Has the lottery participant's financial account been involved with transactions exceeding a certain amount in a selected period of time. Has the lottery participant's financial account been involved with more than a selected amount in one month. Has the lottery owner's address been specified more than a selected number of times. Has the lottery participant's IP address been involved with more than a certain number of transaction, and the like.

Gifting

In one embodiment a gift ticket purchase process is provided. A recipient is selected from a client's contact list. A game is then selected for a gift. A number of tickets are added to a client's shopping cart along with a personal note to the message. One or more messages are sent to the client. These messages may consist of email, in-app inbox messages, in-app notifications; text messages push notifications and the like. It can also include video or images.

Fractional Shares

In one embodiment the single platform enables a single ticket to be co-owned by multiple owners. The single platform allows a lottery participant to buy a fractional ownership of an individual ticket as lottery participants. As non-limiting examples this can be a purchase of 10, 20, 30, 40, 50, 60, 70, 80, 90 or 100% of a ticket. In one embodiment the single platform matches buyers, who can be in the same or multiple jurisdictions/territories, with fractional shares of tickets of different denominations so that all tickets are sold 100%. This functionality when used with scratcher tickets creates shared scratcher tickets that for the first time can be shared games.

For fractional tickets that win, the single platform calculates winnings of individual fractional owners and distributes winnings back to the owner's lottery wallet based upon their ownership percentage of the winning ticket. As a non-limiting example, if a lottery participant buys 10% of a $100 fractional scratcher and that ticket wins with a payout is $10MM, then that lottery participant's 10% share of the jackpot, based up his fractional ownership, is $1M.

Private Public Groups

In one embodiment the single platform enables ticket buyers to play collectively in groups. The single platform then manages all aspects of group creation, group naming, group messaging, ownership and distribution of winning based upon individual ownership percentages.

The single platform enables two types of groups, private and public. Private groups are small non-public groups that are "invite only" and focused on friends playing with friends. Public groups are larger and open to all single platform lottery participants. Group Creation Process:

In one embodiment a group creation process is used. A leader (monarch) first selects a game to be played and first selects participants to be included into the group. A minimum buy-in amount or recommended buy-in is then selected as is the game type. An "Open" game allows group participants to purchase as many tickets as they want while a "Fixed" game allows group participants to buy a fixed amount. In a Fixed game, all participants are equal owners. In an Open game, ownership is determined on a prorated basis based upon the number of tickets purchase by each group participant.

A group monarch can create a personal message that is then sent in invitees to the group. As non-limiting examples, single platform messages to group participants can be sent via SMS, social network, email, via the single platform and the like.

Group participants are required to accept invitations to participate in the group. Groups can play multiple games and drawing and continue to exist even if not actively playing a game.

Groups can play draw or scratcher games and participate asynchronous games that are enabled by the platform. Groups can also be made up with participants from multiple jurisdictions that are playing multi jurisdictional games such as Powerball and MegaMillions.

In one embodiment a lottery ticket gift acceptance process includes having the recipient of the gift go to the ticket management screen, and to the ticket cluster, consisting of one or more tickets, gifted to the recipient by a single lottery ticket purchaser. The recipient selects the "ACCEPT" button control to indicate agreement on taking ownership of the lottery tickets. The system then transfers ticket ownership to the recipient. Once owned by the recipient, this ticket may be re-gifted to someone else or added to a group or shared. If a ticket is not accepted prior to the drawing, the ownership of the ticket remains with the lottery ticket giver and therefore gifted tickets will always have an owner. A gifted ticket must be accepted by a recipient in order for the ownership to be transferred. If the gift is not accepted the gift is reverted back to the giver. Prior to acceptance, a gifted ticket that has not been accepted is in a "PENDING" state.

For gifted tickets that win, the single platform calculates winnings and distributes back to the owner's lottery wallet, be it the recipient or giver.

Lottery Wallet

In one embodiment a client wants to load its lottery wallet with "X" amount cash and gives the retailer the cash or a credit card. The retailer cash register or credit card machine has previously been integrated with the System. Upon entering the receipt of said cash, "X", the register system obtains a tracking method code representing the receipt of "X" dollars. This tracking method code includes but is not limited to a QR code or the like. The tracking code is delivered to the customer via a receipt or display. The customer scans the tracking method code. The monies receives are then deposited in the Wallet on that customer's client device.

In another embodiment, having given the retailer the money to be deposited in their lottery wallet, the customer then presents a tracking method code or the like to the retailer. The retailer scans this code into the System and the money is deposited into the customer's lottery wallet. Any monies spent from that customer's lottery wallet that were deposited there as a result of scanning the tracking method code, are then attributed to the retailer that received the money. The retailer can earn its commission on transactions that occur using the monies received at their retail location that were deposited in the customer's lottery wallet. When there are multiple retailer transactions at multiple retailer locations the first retailer receives first credit first, the second retailer receives second credit and the like.

In one embodiment the system provides means for retailers to sell lottery-products including but not limited to notifications of jackpot amount, notifications of current ticket status, enabling cash disbursements, expedited ticket sales with a lottery game client device prefigured without the need for specifying the details of the transactions that are often required along with interaction with a retailer clerk, discounts, couponing, and the like.

In one embodiment the system is a mobile lottery-product store. This is tied to the platform's single platform.

In one embodiment a tracking method code item is a ticket, as well as other things including but not limiting to, advertising, and the like. In one embodiment it is lottery wallet.

In one embodiment the system enables people to purchase scratchers/lottery tickets with their lottery wallet. This can be achieved by loading the Mido lottery wallet with funds and using said funds and purchase scratchers/lottery tickets and the like.

The lottery product has a serial number (S.N.) and the system has a digital representation of the scratcher or the lottery-product ticket. Instead of interacting with paper the client is able to use its client device for the interaction.

Lottery Ticket Selling Period

A lottery ticket selling period is provided for systems and methods with multiple legal game providers. A single platform 10 can be used. The system can be configured to pre-purchase lottery tickets such that it can offer these tickets for resale to its customers after the formal closing time for a particular draw.

Lottery Participant Interface

In one embodiment the single platform provides unique lottery participant interface elements with a selection of tickets, recipients and buying process. It can also extend to heterogeneous systems and applications. These interface elements include but are not limited to:

(i) Sliding Recipient Selector—allows the lottery participant to determine who they will buy tickets for (1) them, (2) groups (3) a gift or (4) share.

(ii) Combo Buttons—allows lottery participants to select any combination of keys to get to their desired total number of tickets added to the lottery participant's shopping cart. To buy five (5) tickets, select +5 button once or hit +1 button five times, to buy seven (7) tickets, select +5 and +2 button, to select thirteen (13) tickets select +10 button once and +1 button three times. A user is afforded multiple options to select numbers using any combination of the one (1), two (2), five (5) and ten (10) buttons (iii) Shopping Cart—'s shopping cart allows lottery participant to combine different games, different tickets and different who buying for selection in an integrated cart. All purchases in the shopping cart are paid by funds in the lottery wallet disclosed herein; and (iv) Wheel—is a signature rotating UI element unique to that manages presentation and selection of tickets, games and groups. Information is rotated for access and selection and then flips animation present for additional functionality for a selected item.

The application of the module to the interface implies making a functional alteration to the interface. Such a functional alteration gives the characteristic look and feel of the requested lottery services client device, including but not limited to a client device. This is aside from providing the desired content.

The functional alteration can include any of the following:
Adding a new lottery game.
Adding a new lottery game delivery protocol.
Adding a new page (e.g., including content items and emphasizing that a client is part of a special offer or discount).
Adding different lottery content bundles that include multiple lottery content items.
Setting or changing colors, fonts, icons, formatting and page layout
Changing various presentation related parameters.
Using externally obtained parameters.
Changes to the lottery services on the basis of external data can include dynamic adaptation of the lottery services to changing conditions. These dynamic changes can optionally include any of:
Matching the output format and presentation to the lottery game.
Filtering of lottery game content.
Selection of the language.
Dynamic flow and
Adjustment of delivery protocol based on the lottery game type and/or jurisdiction.

In one embodiment the single platform 10 interface provides a directory for locating a lottery game. With the single platform 10 the directory can be automatically updated whenever a new lottery game is added since it simply has to detect the addition of a new model and find out the name, a standard function of any file manager.

In one embodiment the single platform 10 provides a presentation for providing an output of the lottery services to client device. The presentation can be altered as necessary for individual lottery games or overall when a lottery game is added, removed or altered.

Cloud Infrastructure.

FIGS. 26 (A)-(E) illustrate one embodiment of a cloud infrastructure that can be used with single platform 10. As a non-limiting example, the cloud encompasses client devices, POS applications, and the like. In one embodiment every component forms part of the cloud which comprises servers, applications and clients as defined above.

The cloud based system facilitates adjusting utilization and/or allocation of hardware resource(s) to remote clients. The system includes a third party lottery services provider, that is provided by the methods used with the present invention, that can concurrently lottery services requests from several clients without user perception of degraded computing performance as compared to conventional techniques where computational tasks can be performed upon a client or a server within a proprietary intranet. The third party lottery services provider (e.g., "cloud") supports a collection of hardware and/or software resources. The hardware and/or software resources can be maintained by an off-premises party, and the resources can be accessed and utilized by identified users over Network System. Resources provided by the third party lottery services provider can be centrally located and/or distributed at various geographic locations. For example, the third party lottery services provider can include any number of data center machines that provide resources. The data center machines can be utilized for storing/retrieving data, effectuating computational tasks, rendering graphical outputs, routing data, and so forth.

According to an illustration, the third party lottery services provider can provide any number of resources such as data storage lottery services, computational lottery services, word processing lottery services, electronic mail lottery services, presentation lottery services, spreadsheet lottery services, gaming lottery services, web syndication lottery services (e.g., subscribing to a RSS feed), and any other lottery services or applications that are conventionally associated with personal computers and/or local servers. Further, utilization of any number of third party lottery services providers similar to the third party lottery services provider is contemplated. According to an illustration, disparate third party lottery services providers can be maintained by differing off-premise parties and a user can employ, concurrently, at different times, and the like, all or a subset of the third party lottery services providers.

By leveraging resources supported by the third party lottery services provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third party lottery services provider utilizing redundant resources. In one embodiment if a subset of the resources are being updated or replaced, the remainder of the resources can be utilized to lottery services requests from users. According to this example, the resources can be modular in nature, and thus, resources can be added, removed, tested, modified, etc. while the remainder of the resources can support servicing user requests. Moreover, hardware resources supported by the third party lottery services provider can encounter fewer constraints with respect to storage, processing power, security, bandwidth, redundancy, graphical display rendering capabilities, etc. as compared to conventional hardware associated with clients and servers within proprietary intranets.

Resources can be shared amongst a plurality of client devices subscribing to the third party lottery services provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third party lottery services provider, while access can be denied to remaining portions of the data store(s) (e.g., the data store(s) can selectively mask memory based upon user/device identity, permissions, and the like). It is contemplated that any additional types of resources can likewise be shared.

The third party lottery services provider can further include an interface component that can receive input(s)

from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g. employing the client device) can issue commands via the interface component.

In one embodiment, the third party lottery services provider includes a dynamic allocation component that apportions resources, which as a non-limiting example can be hardware resources supported by the third party lottery services provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third party lottery services provider that supports any number of resources (e.g., hardware, software, and firmware) that can be employed by the client device and/or disparate client device(s) not shown. The third party lottery services provider further comprises the interface component that receives resource utilization requests, including but not limited to requests to effectuate operations utilizing resources supported by the third party lottery services provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party lottery services provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

In one embodiment a system employs load balancing to optimize utilization of resources. The system includes the third party lottery services provider that communicates with the client device (and/or any disparate client device(s) and/or disparate third party lottery services provider(s)). The third party lottery services provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party lottery services provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third party lottery services provider. The third party lottery services provider can include the interface component that enables communicating with the client device. Further, the third party lottery services provider comprises the dynamic allocation component that can apportion data retention resources, for example. Moreover, the third party lottery services provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)). The management component can enforce and maintain these bindings.

Additionally or alternatively, the management component can allow for sharing data retained in the data store(s) with disparate users and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third party lottery services provider. Further, the restoration component can playback the recording.

In one embodiment the cloud includes one or more CPU's that are elastic and scalable.

In one embodiment the single platform 10 via the cloud dynamically scales to the overall system that includes a single platform 10 in communication with the. The load of the system can include a scalable database. In one embodiment the single platform 10 via the cloud includes routers that route data, and is a distributed system with a core business logic system surrounded by mini business logic systems that can be the.

In one embodiment the single platform 10 via the cloud includes one or more receivers, a central server with the CPU. In one embodiment, the CPU includes a processor, which can be a microprocessor, read only memory used to store instructions that the processor can fetch in executing its program, a random access memory (RAM) used by the processor to store information and a master dock. The microprocessor is controlled by the master clock that provides a master timing signal used to sequence the microprocessor through its internal states in its execution of each processed instruction. In one embodiment, the microprocessor, and especially the CPU, is a low power device, such as CMOS, as is the necessary logic used to implement the processor design. The single platform 10 via the cloud can store information about the lottery game client's activity in memory.

This memory can be external to the CPU but can reside in the RAM. The memory can be nonvolatile such as battery backed RAM or electrically erasable programmable read only memory (EEPROM. Conditioning electronics can be included with a filter, scale and the like to determine the presence of certain conditions. This conditioning essentially cleans the signal up for processing by the CPU and in some cases pre-processes the information. These signals are then passed to interface electronics, which converts the analog voltage or currents to binary ones and zeroes understood by the CPU 120. The telemetry system can also provide for intelligence in the signal processing, such as achieved by the CPU in evaluating historical data.

The single platform 10 via the cloud can optionally include one or more displays. The single platform 10 via the cloud is typically in communication with a plurality of client devices. The back-end receives information from the client device and Network System relating to lottery play, purchase, sharing, gifting, and the like.

In one embodiment the single platform 10 via the cloud includes a Real-Time Location System (RTLS) and Real-Time Sensing System (RTSS) with a variety of different technologies including but not limited to RF technology. The RF technology can include active and/or passive RFID sensors and an RF wireless array system as one or more receivers. The RF technology in the RTLS and RTSS can include UWB technology (e.g., IEEE 802.15), WLAN technology (e.g., IEEE 802.11), SAW RFID positioning system technology, GPS technology, and the like.

In one embodiment the single platform 10 via the cloud communicates directly with client device of lottery game clients. In another embodiment one or more intermediately base stations that communicate between the lottery game client device and the single platform 10 via the cloud are used. As a non-limiting example the single platform 10 via the cloud can employ RF technologies such as UWB, ZigBee, WI-Fi, GPS data systems and the like.

The single platform 10 via the cloud can include a database of mobile lottery game client ID's, one or more central servers with the CPU. The single platform 10 via the cloud receives information from lottery game client device, base stations, System Networks and then processes this information. The single platform 10 via the cloud can optionally include one or more displays.

In one embodiment the single platform 10 via the cloud includes Artificial Intelligence (AI) or Machine Learning-grade algorithms for processing information received from the lottery game client. Non-limiting examples of AI algorithms include Classifiers, Expert systems, case based reasoning, Bayesian Network Systems, and Behavior based AI, Neural networks, Fuzzy systems, Evolutionary computation, hybrid intelligent systems and classifiers. In one embodiment a fuzzy system is used to match names. As non-limiting example, AI, fuzzy systems and Bayesian Network Systems can be utilized to detect fraud.

Classifiers are functions that can be tuned according to examples. A wide range of classifiers are available, each with its strengths and weaknesses. The most widely used classifiers are neural networks, support vector machines, k-nearest neighbor algorithms, Gaussian mixture models, naive Bayes classifiers, and decision trees. Expert systems apply reasoning capabilities to reach a conclusion. An expert system can process large amounts of known information and provide conclusions based on them.

A case-based reasoning system stores a set of problems and answers in an organized data structure called cases. A case based reasoning system upon being presented with a problem finds a case in its knowledge base that is most closely related to the new problem and presents its solutions as an output with suitable modifications. A behavior based AI is a modular method of building AI systems by hand. Neural networks are trainable systems with very strong pattern recognition capabilities.

Fuzzy systems provide techniques for reasoning under uncertainty and have been widely used in modern industrial and client product control systems. An Evolutionary Computation applies biologically inspired concepts such as populations, mutation and survival of the fittest to generate increasingly better solutions to the problem. These methods most notably divide into evolutionary algorithms (e.g., genetic algorithms) and swarm intelligence (e.g., ant algorithms). Hybrid intelligent systems are any combinations of the above. It is understood that any other algorithm, AI or otherwise, can also be used. Examples of suitable algorithms that can be used with the embodiments of the present invention are disclosed in, EP 1371004 A4, EP 1367534 A2, US 201202. The single platform 10 via the cloud is in the communication with lottery game client device and Network Systems.

In one embodiment the single platform 10 via the cloud executes case-based reasoning system stores a set of problems and answers in an organized data structure called cases. A case based reasoning system upon being presented with a problem finds a case in its knowledge base that is most closely related to the new problem and presents its solutions as an output with suitable modifications. A behavior based AI is a modular method of building AI systems by hand. Neural networks are trainable systems with very strong pattern recognition capabilities.

Fuzzy systems provide techniques for reasoning under uncertainty and have been widely used in modern industrial and client product control systems. An Evolutionary Computation applies biologically inspired concepts such as populations, mutation and survival of the fittest to generate increasingly better solutions to the problem. These methods most notably divide into evolutionary algorithms (e.g., genetic algorithms) and swarm intelligence (e.g., ant algorithms). Hybrid intelligent systems are any combinations of the above. It is understood that any other algorithm, AI or otherwise, can also be used. Examples of suitable algorithms that can be used with the embodiments of the present invention are disclosed in, EP 1371004 A4, EP 1367534 A2, US 20120226639 and US 20120225719, all incorporated fully herein by reference.

In one embodiment the single platform 10 via the cloud includes ID circuitry for lottery game client identification purposes. As a non-limiting example, the ID circuitry can include unique ID storage, a pathway system to route signals to through the circuitry, a cluster that processes information, and a control system, to orchestrate the communication between different systems. All of these systems can be implemented in hardware, software or a combination thereof.

The single platform 10 via the cloud can include hardware and software used for identifying the type of client device, lottery game client activities, performance and reference information.

The client device 210 is used for lottery game client activity and other information received from the client device can be recorded in standard relational databases SQL server, and/or other formats and can be exported in real-time.

In one embodiment the platform performs a random number generation during selection process, and input mechanism for number selection. In one embodiment, the input mechanism can be at the client device, Network Systems, flat-file transmission, from a third person selling lottery tickets that enters the tickets into the single platform 10 via the cloud. In one embodiment the single platform 10 via the cloud processes lottery results of the games. The results can be displayed at the client device. The verifications done at the platform as does, takes the total won and adds it to their Mido digital lottery wallet, the third thing helps the lottery game client organize, actionable items, responsible for displaying to the lottery game client in an actionable manner, in real time, what they need to do, some of those actions are adding tickets to a group, gifting, and the like. It takes the tickets which have had some actions performed on them and transmits this to the server at the single platform, the single platform 10 via the cloud is then responsible for validating the person that is taking the action, the items on which the action is taken, and executing on the items. The platform organizes tickets by the given game that is played on a given date and whether the ticket is owned as a group, are gifts, or owned individually.

From a state, jurisdiction or partner perspective an API or a portal interface is provided where a state/jurisdiction can view data relative to their tenancy on the system, customer and accounting data, create games relative to their region, suspend games, set spending limits on a daily, weekly, monthly basis and view user and buying metrics across time frames and other parameters relevant to the state.

In one embodiment the single platform 10 via the cloud interfaces with a point of sales "POS" device or system and can become integrated with the retailer's POS system. In one embodiment the cloud provides the integration to the retailer's cash or credit registering system.

In one embodiment of an integration a code is used in their cash registering system to track lottery based transactions and interactions. As non-limiting examples, suitable tracking method codes include but are not limited to, a SKU, QR, Universal Product Code (UPC), International Article Number (EAN), Global Trade Item Number (GTIN), Australian Product Number (APN) and the like.

In one embodiment a lottery game client desires to purchase one or more tickets. A lottery-product ticket tracking method code is provided and the lottery game client automatically pays for the tickets. The purchase shows up on the lottery game client's client device 210 via a receipt which has a unique system generated receipt number attached to it. In one embodiment the lottery game client enters the receipt number to its client device. In another embodiment the client device itself is a tracking method code number and a clerk scans the phone. A barcode is provided on the client device that is entered into the retailer's system. The single platform 10 via the cloud has software that adds it through the single platform. The client device tracking method code and the transaction as a pair are sent to the single platform.

Mobile Device

Figure 27:
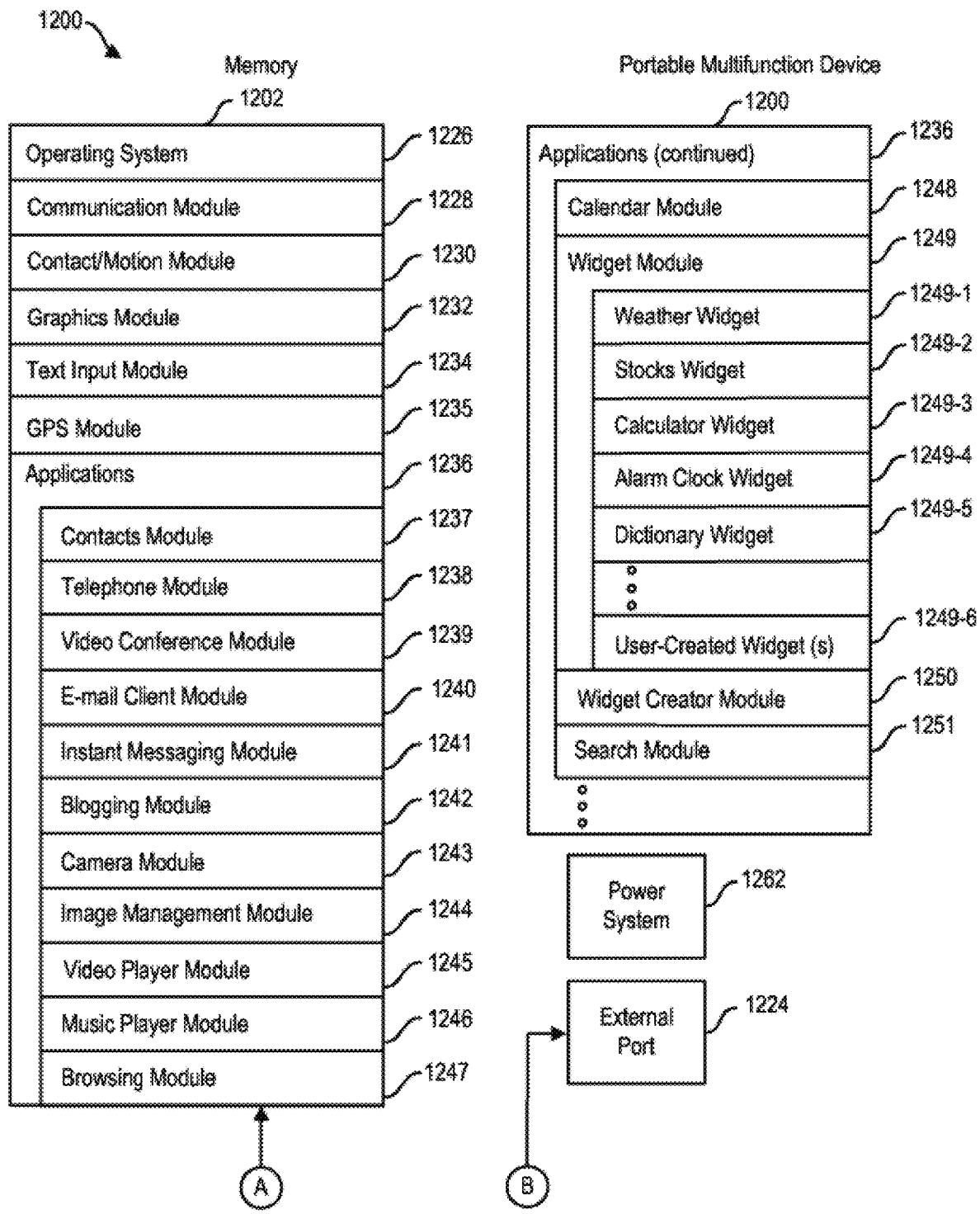
FIG. 27 illustrates one embodiment of a mobile device that can be used with the present invention.
Figure 28:
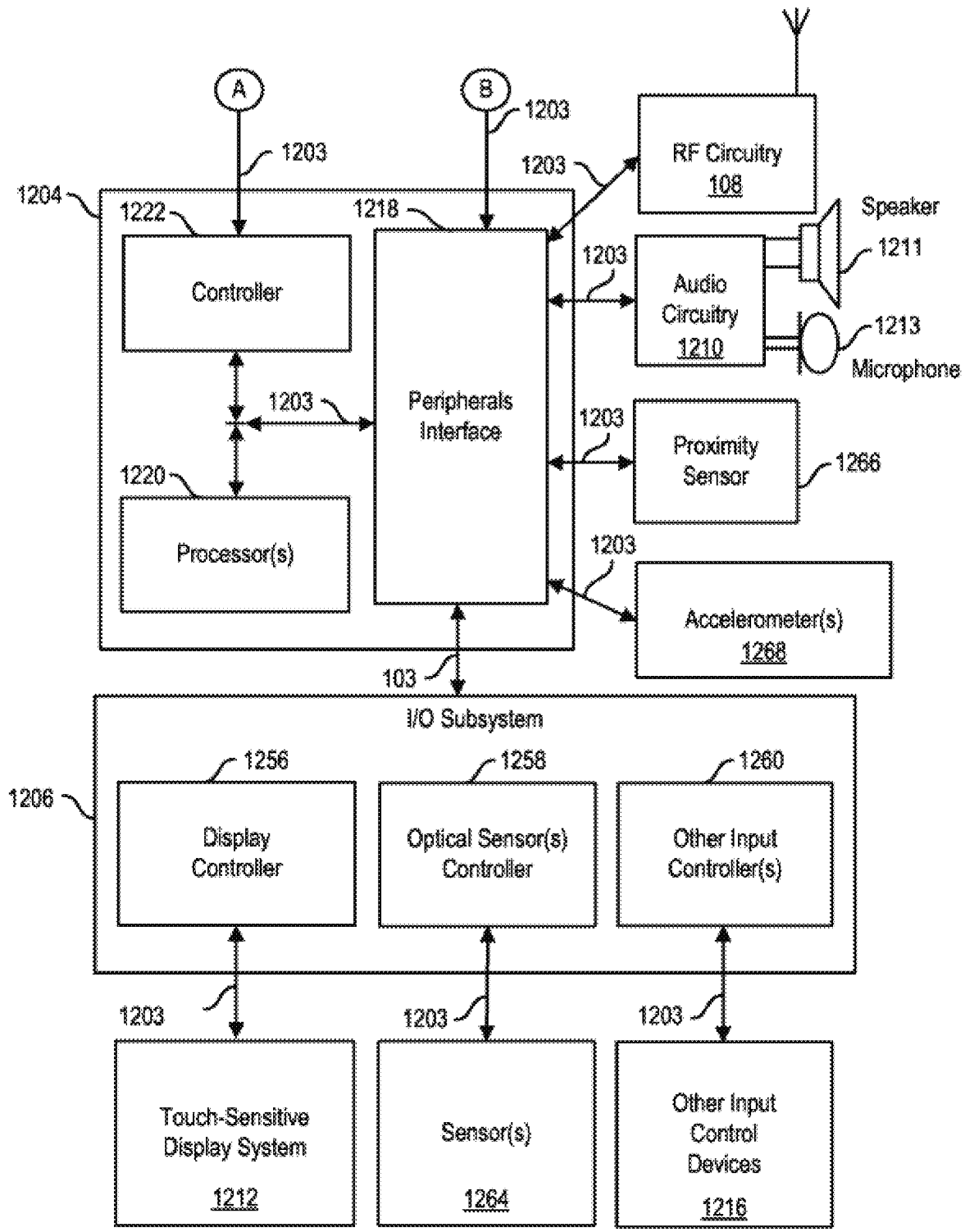
FIG. 28 illustrates another embodiment of a mobile device that can be used with the present invention.
Figure 29:
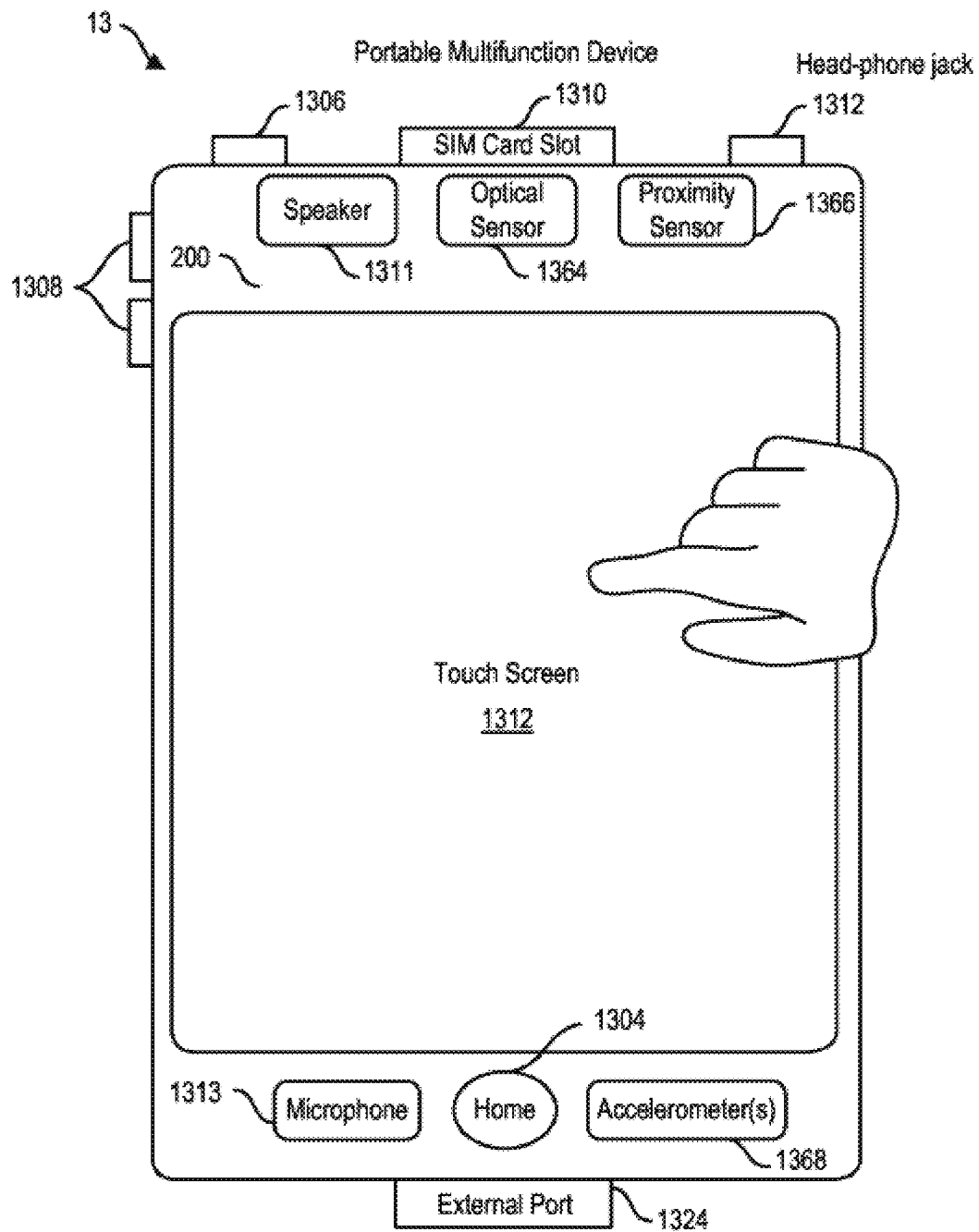
FIG. 29 illustrates yet another embodiment of a mobile device that can be used with the present invention.

Referring to FIGS. 27 through 29, the mobile device can include a display that can be a touch sensitive display. The touch-sensitive display is sometimes called a "touch screen" for convenience, and can also be known as or called a touch-sensitive display system. The mobile device can include a memory (which can include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile device can include one or more optical sensors. These components can communicate over one or more communication buses or signal lines.

It should be appreciated that the mobile device is only one example of a portable multifunction mobile device, and that the mobile device can have more or fewer components than shown, can combine two or more components, or a can have a different configuration or arrangement of the components.

The various components can be implemented in hardware, software or a combination of hardware and software, including one or more signal processing and/or application specific integrated circuits.

Memory can include high-speed random access memory and can also include non-volatile memory, such as one or more magnetic disk storage devices, flash memory devices, or other non-volatile solid-state memory devices. Access to memory by other components of the mobile device, such as the CPU and the peripherals interface, can be controlled by the memory controller.

The peripherals interface couples the input and output peripherals of the device to the CPU and memory. The one or more processors run or execute various software programs and/or sets of instructions stored in memory to perform various functions for the mobile device and to process data.

In some embodiments, the peripherals interface, the CPU, and the memory controller can be implemented on a single chip, such as a chip. In some other embodiments, they can be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry can include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry can communicate with Network Systems and other devices by wireless communication.

The wireless communication can use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SEMPLE), and/or Instant Messaging and Presence Lottery services (IMPS)), and/or Short Message Lottery services (SMS)), or any other suitable communication protocol, including communication protocols not yet developed as of the filing date of this document.

The audio circuitry, the speaker, and the microphone provide an audio interface between a lottery game client and the mobile device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data can be retrieved from and/or transmitted to memory and/or the Network Systems circuitry by the peripherals interface. In some embodiments, the audio circuitry also includes a headset jack. The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile device, such as the touch screen and other input/control devices, to the peripherals interface. The I/O subsystem can include a display controller and one or more input controllers for other input or control devices. The one or more input controllers receive/send electrical signals from/to other input or control devices. The other input/control devices can include physical buttons (e.g., push buttons, rocker buttons, etc.), dials, slider switches, and joysticks, click wheels, and so forth. In some alternate embodiments, input controller(s) can be coupled to any (or none) of the following: a keyboard, infrared port, USB port, and a pointer device such as a mouse. The one or more buttons can include an up/down button for volume control of the speaker and/or the microphone. The one or more buttons can include a push button. A quick press of the push button can disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button can turn power to the mobile device on or off. The lottery game client can be able to customize a functionality of one or more of the buttons. The touch screen is used to implement virtual or soft buttons and one or more soft keyboards.

The touch-sensitive touch screen provides an input interface and an output interface between the device and a lottery game client. The display controller receives and/or sends electrical signals from/to the touch screen. The touch screen displays visual output to the lottery game client. The visual output can include graphics, text, icons, video, and any combination thereof (collectively termed "graphics"). In some embodiments, some or all of the visual output can correspond to lottery game client-interface objects, further details of which are described below.

A touch screen has a touch-sensitive surface, sensor or set of sensors that accepts input from the lottery game client based on haptic and/or tactile contact. The touch screen and the display controller (along with any associated modules and/or sets of instructions in memory) detect contact (and any movement or breaking of the contact) on the touch screen and converts the detected contact into interaction with lottery game client-interface objects (e.g., one or more soft keys, icons, web pages or images) that are displayed on the touch screen. In one embodiment, a point of contact between a touch screen and the lottery game client corresponds to a finger of the lottery game client.

The touch screen can use LCD (liquid crystal display) technology, or LPD (light emitting polymer display) technology, although other display technologies can be used in other embodiments. The touch screen and the display controller can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen can be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile device, whereas touch sensitive tablets do not provide visual output.

A touch-sensitive display in some embodiments of the touch screen can be as described in the following applications: (1) U.S. patent application Ser. No. 11/381,313, "Multipoint Touch Surface Controller," filed Can 12, 2006. (2) U.S. patent application Ser. No. 10/840,862, "Multipoint Touchscreen," filed Can 6, 2004. (3) U.S. patent application Ser. No. 10/903,964, "Gestures For Touch Sensitive Input Devices," filed Jul. 30, 2004. (4) U.S. patent application Ser. No. 11/048,264, "Gestures For Touch Sensitive Input Devices," filed Jan. 31, 2005. (5) U.S. patent application Ser. No. 11/038,590, "Mode-Based Graphical Lottery game client Interfaces For Touch Sensitive Input Devices," filed Jan. 18, 2005. (6) U.S. patent application Ser. No. 11/228,758, "Virtual Input Device Placement On A Touch Screen Lottery game client Interface," filed Sep. 16, 2005. (7) U.S. patent application Ser. No. 11/228,700, "Operation Of A Computer With A Touch Screen Interface," filed Sep. 16, 2005. (8) U.S. patent application Ser. No. 11/228,737, "Activating Virtual Keys Of A Touch-Screen Virtual Keyboard," filed Sep. 16, 2005. and (9) U.S. patent application Ser. No. 11/367,749, "Multi-Functional Handheld Device," filed Mar. 3, 2006. All of these applications are incorporated by reference herein in their entirety.

The touch screen can have a resolution in excess of 1000 dpi. In one embodiment, the touch screen has a resolution of approximately 1060 dpi. The lottery game client can make contact with the touch screen using any suitable object or appendage, such as a stylus, a finger, and so forth. In some embodiments, the lottery game client interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the lottery game client.

In some embodiments, in addition to the touch screen, the mobile device can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch screen or an extension of the touch-sensitive surface formed by the touch screen.

In some embodiments, the mobile device can include a physical or virtual click wheel as an input control device. A lottery game client can navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel can also be used to select one or more of the displayed icons. For example, the lottery game client can press down on at least a portion of the click wheel or an associated button. Lottery game client commands and navigation commands provided by the lottery game client via the click wheel can be processed by an input controller as well as one or more of the modules and/or sets of instructions in memory. For a virtual click wheel, the click wheel and click wheel controller can be part of the touch screen and the display controller, respectively. For a virtual click wheel, the click wheel can be either an opaque or semi transparent object that appears and disappears on the touch screen display in response to lottery game client interaction with the device. In some embodiments, a virtual click wheel is displayed on the touch screen of a portable multifunction device and operated by lottery game client contact with the touch screen.

The mobile device also includes a power system for powering the various components. The power system can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile device can also include one or more sensors, including not limited to optical sensors. An optical sensor is coupled to an optical sensor controller in I/O subsystem. The optical sensor can include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module). The optical sensor can capture still images or video. In some embodiments, an optical sensor is located on the back of the mobile device, opposite the touch screen display on the front of the device so that the touch screen display can be used as a viewfinder for either still and/or video image acquisition. In some embodiments, an optical sensor is located on the front of the device so that the lottery game client's image can be obtained for videoconferencing while the lottery game client views the other video conference game clients on the touch screen display. In some embodiments, the position of the optical sensor can be changed by the lottery game client (e.g., by rotating the lens and the sensor in the device housing) so that a single optical sensor can be used along with the touch screen display for both video conferencing and still and/or video image acquisition.

The mobile device can also include one or more proximity sensors. In one embodiment, the proximity sensor is coupled to the peripherals interface. Alternately, the proximity sensor can be coupled to an input controller in the I/O subsystem. The proximity sensor can perform as described in U.S. patent application Ser. No. 11/241,839, "Proximity Detector In Handheld Device," filed Sep. 30, 2005. Ser. No. 11/240,788, "Proximity Detector In Handheld Device," filed Sep. 30, 2005. Ser. No. 13/096,386, "Using Ambient Light Sensor To Augment Proximity Sensor Output". Ser. No. 13/096,386, "Automated Response To And Sensing Of Lottery game client Activity In Portable Devices," filed Oct. 24, 2006. and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the lottery game client's ear (e.g., when the lottery game client is making a phone call). In some embodiments, the proximity sensor keeps the screen off when the device is in the lottery game client's pocket, purse, or other dark area to prevent unnecessary battery drainage when the device is a locked state.

In some embodiments, the software components stored in memory can include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System. In some embodiments, the external port is a multi-pin (e.g., 30-pin) connector that is the same as, or similar to and/or compatible with the 30-pin connector used on iPod (trademark of Apple Computer, Inc.) devices.

The contact/motion module can detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that can be stored in memory include other word processing applications, JAVA-enabled applications, encryption, digital rights management, voice recognition, and voice replication.

In conjunction with touch screen, display controller, contact module, graphics module, and text input module, a contacts module can be used to manage an address book or contact list, including: adding name(s) to the address book, deleting name(s) from the address book, associating telephone number(s), email address(es), physical address(es) or other information with a name, associating an image with a name, categorizing and sorting names, providing telephone numbers or e-mail addresses to initiate and/or facilitate communications by telephone, video conference, e-mail, or IM and so forth.

In one embodiment system 10 includes a decentralized and distributed digital ledger record transactions for the lottery transactions, where each of a lottery transaction can include a lottery element. In one embodiment the digital ledger is configured to use smart contracts. In one embodiment the smart contracts provide from at least one of: management, collection and distribution of payments and winnings clients, their assignees, and to lottery transaction winners. In one embodiment the digital ledger is configured to provide evidence of ownership of a lottery transaction.

In one embodiment the digital ledger is configured to provide a record of a lottery transaction. In one embodiment the digital ledger is configured to provide for auditing of a lottery transaction. In one embodiment the digital ledger is configured to provide a validation of a lottery transaction element. In one embodiment the digital ledger is configured to provide a validation of a lottery transaction element.

In one embodiment the digital ledger is configured to provide a fraud reduction of a lottery transaction. In one embodiment the digital ledger is configured to provide a random number generator for at least a portion of a lottery transaction.

In one embodiment system 10 provides the ability to run independent new regional, global or multi jurisdictional lotteries that leverage virtual distributed machines as the runtime environment for smart contracts that are written to the digital ledger. This enables the creation of custom recurring lotteries and system 10 manages games and outcomes, collects and distributes payments and winnings to all participating governments, states, legal game providers, affiliates, partners and players.

In one embodiment a blockchain is used and provided. As a non-limiting example the blockchain is a distributed database is used to maintain a continuously growing list of records, called blocks. Blockchain can include and is not limited to Bitcoin Blockchain, Ripple Network, NXT and Ethereum and paid for with any variety of cryptocurrencies that may include bitcoin, Ether, XRP, NXT, NEM and LightCoin. As non-limiting examples a blockchain can be one or more of: https://blockgeeks.com/guides/what-is-ethereum/; https://blockgeeks.com/guides/blockchain-glossary-from-a-z/; https://blockgeeks.com/guides/blockchain-wiki/, and the like.

In one embodiment system 10 provides that a digital lottery transaction element, including but not limited to a ticket, is assigned a unique meta data identifier. As a non-limiting example this unique meta data identifier is attached to a lottery transaction element, including a digital ticket, system 10 side chain that leverages a public BitCoin blockchain that is used as the global public ledger for all Bitcoin transactions. As a non-limiting example system provides that lottery transaction elements, including but not limited to digital tickets benefit from the Bitcoin blockchain, a global public ledger without having to recreate an independent blockchain. In one embodiment system 10 uses this side chain to assign to each lottery transaction element, such as a ticket, a unique digital identifier that cannot be altered or manipulated by anyone including system 10.

In one embodiment each block in a blockchain contains a timestamp and a link to a previous block. In one embodiment the blockchain is managed by a peer-to-peer network, Network System, collectively adhering to a protocol for validating new blocks. In one embodiment once recorded, the data in any given block cannot be altered retroactively without the alteration of all subsequent blocks and the collusion of the network. In one embodiment the blockchain can serve as "an open, distributed ledger that can record transactions between two parties efficiently and in a verifiable and permanent way. The ledger itself can also be programmed to trigger transactions automatically.

In one embodiment the blockchain facilitates secure online transactions for lottery transactions. In one embodiment the blockchain is a decentralized and includes a distributed digital ledger that is used to record transactions across many computers so that the record cannot be altered retroactively without the alteration of all subsequent blocks and the collusion of Network System. As a non-limiting example this allows a verification and audit of lottery transactions. In one embodiment the blockchain removes the characteristic of infinite reproducibility from a digital asset. It confirms that each unit of value was transferred only once, solving the long-standing problem of double spending. As a non-limiting example the blockchain can be a value-exchange protocol. In one embodiment the blockchain can assign title rights because it provides a record that compels offer and acceptance.

In one embodiment the blockchain provides a validation for authenticity and ownership of a lottery transaction ticket or other type of ownership receipt. As a non-limiting example the metadata that is written to the blockchain is assigned to each ticket. In one embodiment a unique digital identifier for the ticket is provided that cannot be altered or manipulated by anyone due to the blockchain immutable In one embodiment a blockchain database includes two kinds of records: transactions and blocks.

Lottery meta data is specific game and wager related data that may include but is not limited to dates tickets bought, numbers played, draw and ownership information, locational information and or scanned images of a paper ticket.

This information can be written directly to the blockchain in a variety of methods including but not limited to: lottery meta data directly to the blockchain (the metadata can be encrypted or plain text or combination of both); lottery meta directly to a side chain with the Merkle root summary posted to the blockchain. As non-limiting examples the blocks hold batches of valid transactions that are hashed and encoded into a Merkle tree. (cost reducing); digital signature of the lottery meta data posted to the blockchain while the Lottery meta data is distributed via non-blockchain technology.

As non-limiting examples the blocks hold batches of valid transactions that are digitally signed and metadata stored outside blockchain (cost reducing).

In one embodiment separate blocks can be validated concurrently, creating a temporary fork. In one embodiment in addition to a secure hash based history, the blockchain has a specified algorithm for scoring different versions of the history so that one with a higher value can be selected over others. In one embodiment blocks not selected for inclusion in the chain are called orphan blocks.

In one embodiment the blockchain stores data across Network System and eliminates the risks of data being held centrally. As a non-limiting example the blockchain is de-centralized and can use ad-hoc message passing and distributed networking. In one embodiment a portion of Network System lacks centralized points of vulnerability that computer hackers can exploit or any central point of failure. In one embodiment blockchain security methods include but are not limited to the use of public-key cryptography.

In one embodiment a public key, that as a non-limiting example can be a long, random-looking string of numbers, is an address on the blockchain. Value tokens sent across Network System are recorded as belonging to that address. In one embodiment a private key can be used that is similar to a password that gives the client the ability to move or transfer the assets to satisfy a smart contract or to serve as payment.

In one embodiment a blockchain supports smart contracts can be enabled to run an entire lottery with smart contracts that accept individual wagers by individual users to send a transaction with tokens of value with win lose outcomes determined by the distributed blockchain network or based upon external events outside of the blockchain's control. Distributions of winnings would be governed by smart contracts and enforced automatically delivering winnings to all users who have valid smart contracts that were placed prior wagering deadline as defined by the blockchain and smart works.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A system for processing a lottery game, comprising:
at least one platform;
a digital ledger;
at least one network processor in a workflow server;
a workflow module comprising at least one set of workflow instructions; and
at least one computer readable storage medium storing computer executable instructions;
wherein the digital ledger is operable to record a plurality of lottery transactions from a plurality of different jurisdictions, wherein each of the plurality of lottery transactions includes a lottery transaction element;
wherein the at least one network processor is operable to process the plurality of lottery transactions from the plurality of different jurisdictions as lottery game packets;
wherein the at least one platform is operable to selectively present and enable each of the plurality of lottery transactions depending on a location of at least one participant of the lottery game and the plurality of different jurisdictions;
wherein the at least one platform is operable to send at least one notification to the at least one participant of the lottery game based on the location of the at least one participant; and
wherein the at least one notification includes the plurality of lottery transactions available in the one of the plurality of different jurisdictions.

2. The system of claim 1, wherein the digital ledger is operable to include at least one smart contract.

3. The system of claim 2, wherein the at least one smart contract is operable to distribute winnings of the lottery game to the at least one participant of the lottery game.

4. The system of claim 1, wherein the digital ledger is operable to audit a lottery transaction.

5. The system of claim 1, wherein the digital ledger is operable to validate a lottery transaction element.

6. The system of claim 1, wherein the lottery transaction element is a ticket and/or a digital transaction element.

7. The system of claim 1, wherein the at least one platform is operable to determine the location of the at least one participant of the lottery game using Global Positioning System (GPS) information or geo-fencing information.

8. The system of claim 1, wherein the at least one notification is automatically generated once the at least one participant moves into one of the plurality of different jurisdictions.

9. The system of claim 1, wherein the digital ledger is configured to confirm that each unit of value of a lottery transaction is transferred only once.

10. The system of claim 1, wherein the digital ledger is configured to assign title rights to a lottery transaction.

11. The system of claim 1, wherein the digital ledger is operable to provide a record of an offer of the lottery transaction.

12. The system of claim 1, wherein the at least one platform is operable to route each of the plurality of lottery transactions to a general account depending on the location, the plurality of different jurisdictions, and information about the lottery game packets.

13. The system of claim 1, wherein the lottery game is selected from at least one of:
an allotment by chance, bet, chance, draw, drawing, gamble, game of chance, lot, raffle, sweepstake and wager.

14. The system of claim 1, wherein the platform is operable to accept cryptocurrency.

15. The system of claim 1, wherein the digital ledger is operable to manage the identity of the at least one participant of the lottery game.

16. A system for processing a lottery game, comprising:
at least one platform;
a digital ledger;
at least one network processor in a workflow server;
a deep packet inspection module;
a workflow module comprising at least one set of workflow instructions; and
at least one computer readable storage medium storing computer executable instructions;
wherein the digital ledger is operable to record a plurality of lottery transactions from a plurality of different jurisdictions, wherein each of the plurality of lottery transactions includes a lottery transaction element;
wherein the at least one network processor is operable to process the plurality of lottery transactions from the plurality of different jurisdictions in lottery game packets;
wherein the deep packet inspection module is operable to inspect the lottery game packets and provide information about the lottery game packet to the workflow module;
wherein the at least one platform is operable to send at least one notification to at least one participant of the lottery game based on the location of the at least one participant; and
wherein the at least one notification includes at least one of the plurality of lottery transactions available in the one of the plurality of different jurisdictions.

17. The system of claim 16, wherein the at least one notification is automatically generated once the at least one participant moves into one of the plurality of different jurisdictions.

18. A method for processing a lottery game, comprising:
a digital ledger recording a plurality of lottery transactions from a plurality of different jurisdictions, wherein each of the plurality of lottery transactions includes a lottery transaction element;
at least one network processor processing the plurality of lottery transactions from the plurality of different jurisdictions as lottery game packets;
at least one platform selectively presenting and enabling each of the plurality of lottery transactions depending on a location of at least one participant of the lottery game and the plurality of different jurisdictions;
wherein the at least one platform is operable to send at least one notification to the at least one participant of the lottery game based on the location of the at least one participant; and
wherein the at least one notification includes the plurality of lottery transactions available in the one of the plurality of different jurisdictions.

19. The method of claim 18, wherein the at least one notification is automatically generated once the at least one participant moves into one of the plurality of different jurisdictions.

20. The method of claim 18, further comprising the at least one platform routing each of the plurality of lottery transactions to a general account depending on the location, the plurality of different jurisdictions, and information about the lottery game packets.

* * * * *